(12) United States Patent
Karito

(10) Patent No.: US 7,474,441 B2
(45) Date of Patent: Jan. 6, 2009

(54) IMAGE PROCESSING DEVICE, METHOD, PROGRAM AND RECORDING MEDIUM RECORDING THE PROGRAM

(75) Inventor: Nobuhiro Karito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 859 days.

(21) Appl. No.: 10/742,633

(22) Filed: Dec. 19, 2003

(65) Prior Publication Data
US 2004/0174569 A1 Sep. 9, 2004

(30) Foreign Application Priority Data

| Jan. 9, 2003 | (JP) | ............................... 2003-002975 |
| Apr. 8, 2003 | (JP) | ............................... 2003-104348 |
| May 30, 2003 | (JP) | ............................... 2003-154202 |

(51) Int. Cl.
H04N 1/405 (2006.01)
H04N 1/407 (2006.01)
H04N 1/409 (2006.01)

(52) U.S. Cl. .................... 358/3.01; 358/3.03; 358/3.26; 382/288

(58) Field of Classification Search ................ 358/3.01, 358/3.03, 3.06, 3.26, 534; 382/232, 237, 382/251, 288
See application file for complete search history.

(56) References Cited

U.S. PATENT DOCUMENTS 4,578,713 A 3/1986 Tsao et al.

6,628,427 B1 9/2003 Aoki

FOREIGN PATENT DOCUMENTS

| JP | 06-062253 | | 3/1994 |
| JP | 7-210672 | | 8/1995 |
| JP | 11-027528 | | 1/1999 |
| JP | 11027528 A | * | 1/1999 |
| JP | 11-313209 | | 11/1999 |

OTHER PUBLICATIONS

Patent Abstracts for Japanese Laid-open Patent Publication No. 06-062253 dated Mar. 4, 1994 (1 page).
Patent Abstracts for Japanese Patent Publication No. 11-027528 dated Jan. 29, 1999 (1 page).
"Digital Halftone Proessor Based On Correlative Density Assignment of Adjacent Pixels—CAPIX" I.I.E.E.J. Journal, vol. 17, No. 5, 1988.
European Search Report dated Mar. 21, 2005, 3 pages.

\* cited by examiner

Primary Examiner—Thomas D Lee
(74) Attorney, Agent, or Firm—Osha•Liang LLP

(57) ABSTRACT

When the image data having a predetermined gradation value for each pixel is input, and the image data is searched from the initial pixel and the total of the gradation values of the pixels, including the searched pixels, becomes a predetermined threshold value or more, a dot is generated at the center of the gravity position as a quantized pixel group. In the searching, an unprocessed pixel closest to the center of gravity position, including this pixel, is selected. If there are a plurality of unprocessed pixels, selection is performed at random. For the pixel selection, a pixel closest to the center position computed from the positional coordinates may be selected, rather than the center of gravity. Also a dot may be generated at the center position of the quantized pixel group.

8 Claims, 43 Drawing Sheets

FIG. 5A

|     | n  | n+1 | n+2 | n+3 |
|-----|----|----|----|----|
| m   | 50 | 50 | 50 | 50 |
| m+1 | 50 | 50 | 50 | 50 |
| m+2 | 50 | 65 | 50 | 55 |

FIG. 5B

|     | n  | n+1 | n+2 | n+3 |
|-----|----|----|----|----|
| m   | 50 | 50 | 50 | 50 |
| m+1 | 50 | 50 | 50 | 50 |
| m+2 | 50 | 65 | 50 | 55 |

FIG. 5C

|     | n | n+1 | n+2 | n+3 |
|-----|---|----|----|----|
| m   |   |    | 50 | 50 |
| m+1 |   | 255 | 50 | 50 |
| m+2 | 50 | 10 | 50 | 55 |

RETURN DATA

FIG. 5D

|     | n | n+1 | n+2 | n+3 |
|-----|---|----|----|----|
| m   |   |    |    |    |
| m+1 |   | 255 |    | 255 |
| m+2 | 50 | 10 | 50 |    |

RETURN DATA

FIG. 6A

|  | n | n+1 | n+2 | n+3 |
|---|---|---|---|---|
| m | 205 | 205 | 205 | 205 |
| m+1 | 205 | 205 | 205 | 205 |
| m+2 | 205 | 190 | 205 | 200 |

|  | n | n+1 | n+2 | n+3 |
|---|---|---|---|---|
| m | 50 | 50 | 50 | 50 |
| m+1 | 50 | 50 | 50 | 50 |
| m+2 | 50 | 65 | 50 | 55 |

WHITE DENSITY

|  | n | n+1 | n+2 | n+3 |
|---|---|---|---|---|
| m |  |  | 205 | 205 |
| m+1 |  | O | 205 | 205 |
| m+2 | 205 | 245 | 205 | 200 |

RETURN DATA

|   | n | n+1 | n+2 | n+3 |
|---|---|---|---|---|
| m | 50 | 50 | 50 | 50 |
| m+1 | 50 | 50 | 50 | 50 |
| m+2 | 50 | 65 | 50 | 55 |

FIG. 8B

|   | n | n+1 | n+2 | n+3 |
|---|---|---|---|---|
| m | 50 | 50 | 50 | 50 |
| m+1 | 50 | 50 | 50 | 50 |
| m+2 | 50 | 65 | 50 | 55 |

FIG. 8C

|   | n | n+1 | n+2 | n+3 |
|---|---|---|---|---|
| m | 50 | 50 | 50 | 50 |
| m+1 | 50 | 50 | 50 | 50 |
| m+2 | 50 | 65 | 50 | 55 |

RETURN DATA

RETURN DATA

FIG. 11A

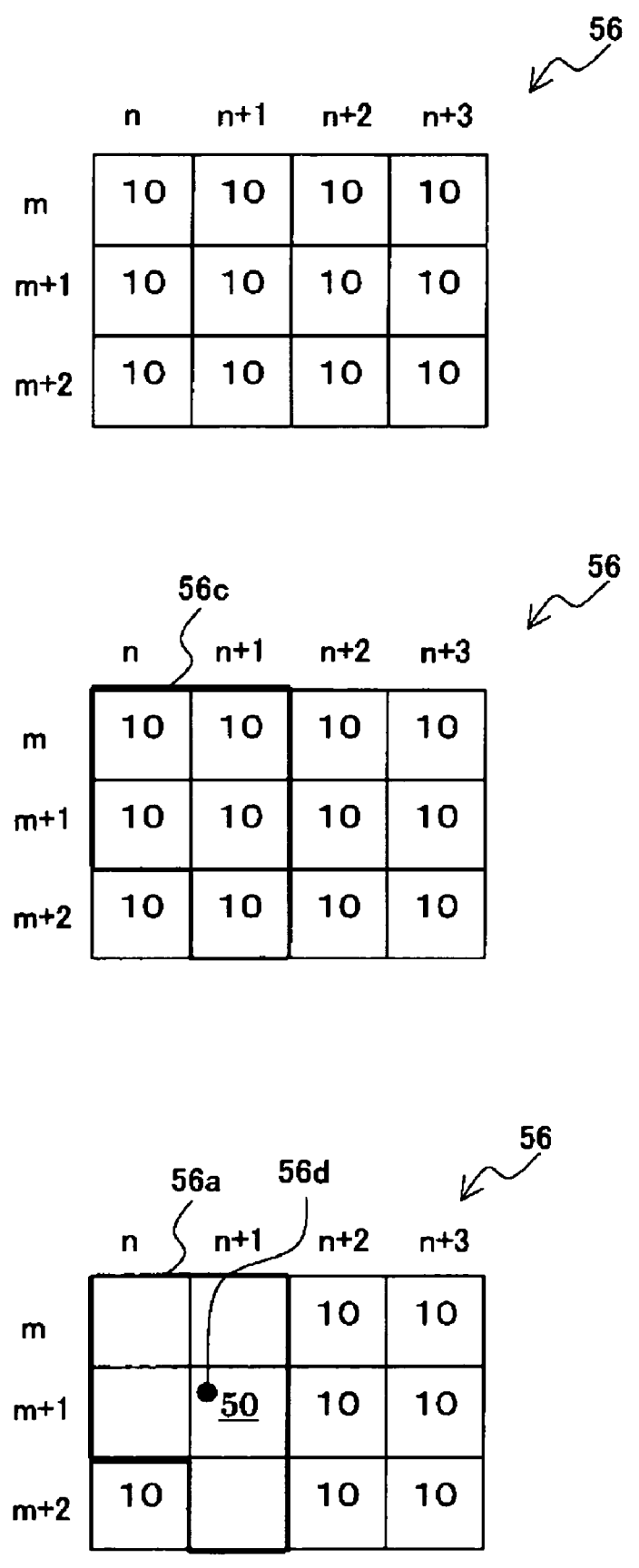

|  | n | n+1 | n+2 | n+3 |
|---|---|---|---|---|
| m | 10 | 10 | 10 | 10 |
| m+1 | 10 | 10 | 10 | 10 |
| m+2 | 10 | 10 | 10 | 10 |

FIG. 11B

|  | n | n+1 | n+2 | n+3 |
|---|---|---|---|---|
| m | 10 | 10 | 10 | 10 |
| m+1 | 10 | 10 | 10 | 10 |
| m+2 | 10 | 10 | 10 | 10 |

FIG. 11C

|  | n | n+1 | n+2 | n+3 |
|---|---|---|---|---|
| m |  |  | 10 | 10 |
| m+1 |  | 50 | 10 | 10 |
| m+2 | 10 |  | 10 | 10 |

FIG. 12A

|   | n | n+1 | n+2 | n+3 |
|---|---|---|---|---|
| m | 50 | 50 | 50 | 50 |
| m+1 | 50 | 50 | 50 | 50 |
| m+2 | 50 | 55 | 50 | 50 |

56c points to column n+1. 56 labels the grid.

FIG. 12B

|   | n | n+1 | n+2 | n+3 |
|---|---|---|---|---|
| m |   |   | 50 | 50 |
| m+1 |   | 255 | 50 | 50 |
| m+2 | 50 |   | 50 | 50 |

56a points to column n+1. 56d points to 255.

FIG. 12C

|   | n | n+1 | n+2 | n+3 |
|---|---|---|---|---|
| m |   | 85 | 50 | 50 |
| m+1 | 85 |   | 50 | 50 |
| m+2 | 50 | 85 | 50 | 50 |

56a points to column n+1. 56d points to the center cell.

FIG. 13

|  | n | n+1 | n+2 | n+3 | n+4 |
|---|---|---|---|---|---|
| m |  |  |  |  |  |
| m+1 |  |  | 50 |  |  |
| m+2 |  | 50 | $\frac{255}{50}$ | 50 |  |
| m+3 |  |  | 65 |  |  |
| m+4 |  |  |  |  |  |

FIG. 30A

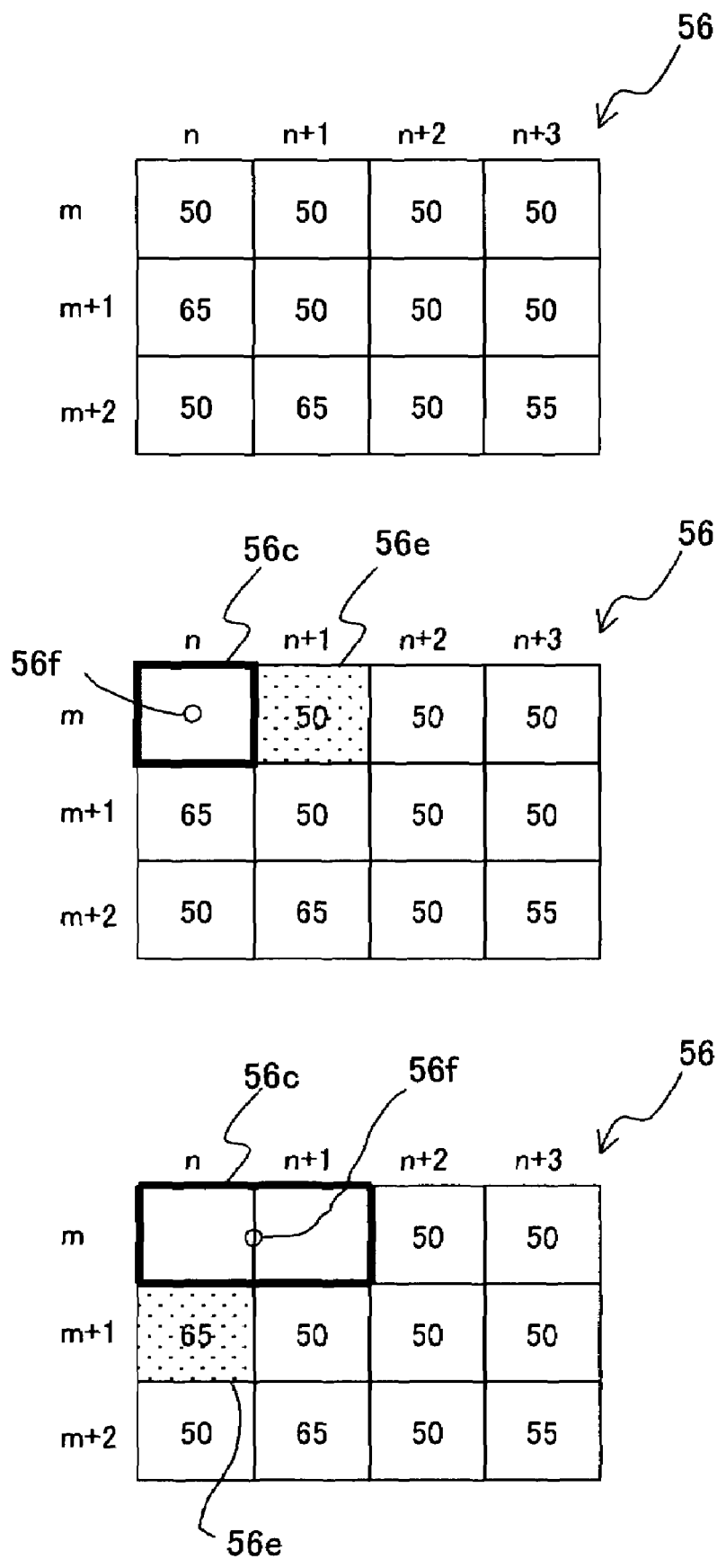

|   | n | n+1 | n+2 | n+3 |
|---|---|---|---|---|
| m | 50 | 50 | 50 | 50 |
| m+1 | 65 | 50 | 50 | 50 |
| m+2 | 50 | 65 | 50 | 55 |

FIG. 30B

|   | n | n+1 | n+2 | n+3 |
|---|---|---|---|---|
| m |  | 50 | 50 | 50 |
| m+1 | 65 | 50 | 50 | 50 |
| m+2 | 50 | 65 | 50 | 55 |

FIG. 30C

|   | n | n+1 | n+2 | n+3 |
|---|---|---|---|---|
| m |  |  | 50 | 50 |
| m+1 | 65 | 50 | 50 | 50 |
| m+2 | 50 | 65 | 50 | 55 |

FIG. 33A

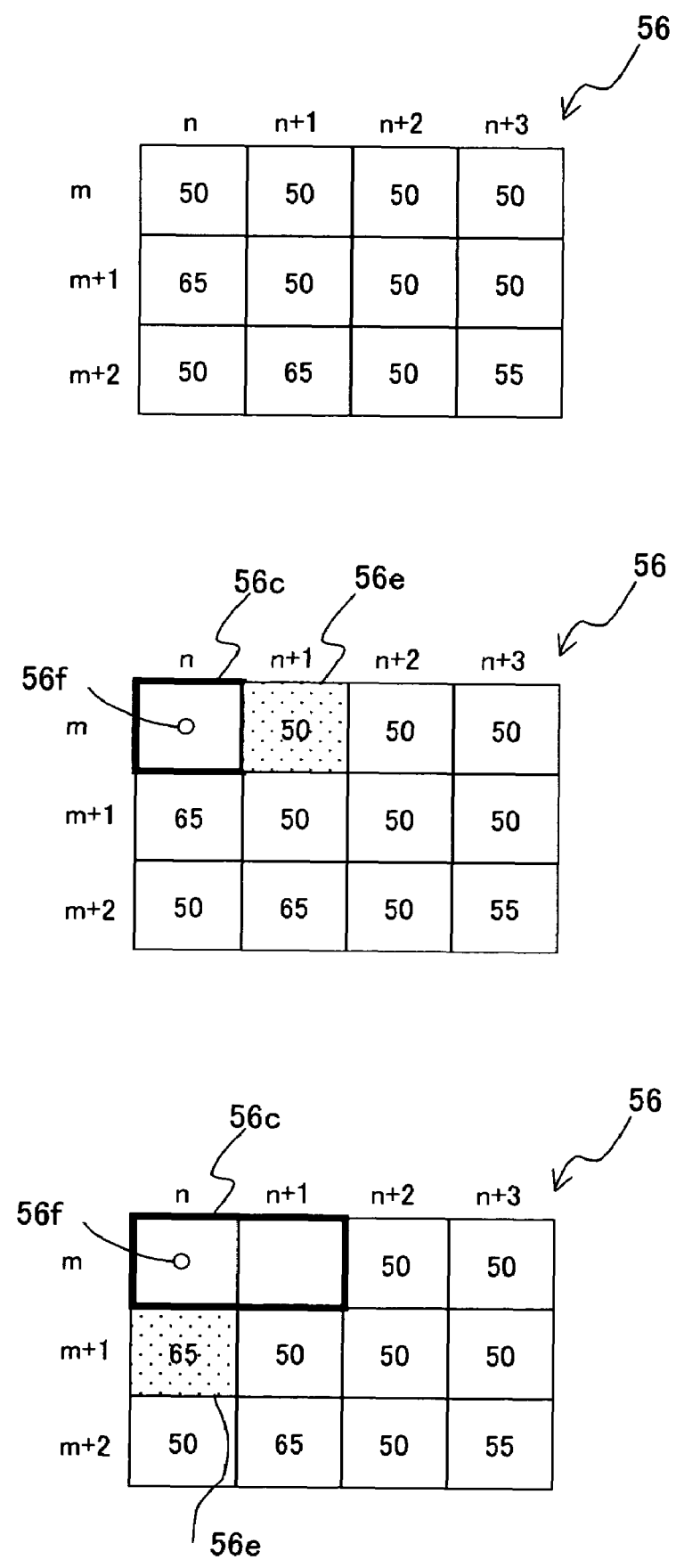

|  | n | n+1 | n+2 | n+3 |
|---|---|---|---|---|
| m | 50 | 50 | 50 | 50 |
| m+1 | 65 | 50 | 50 | 50 |
| m+2 | 50 | 65 | 50 | 55 |

FIG. 33B

|  | n | n+1 | n+2 | n+3 |
|---|---|---|---|---|
| m | | 50 | 50 | 50 |
| m+1 | 65 | 50 | 50 | 50 |
| m+2 | 50 | 65 | 50 | 55 |

FIG. 33C

|  | n | n+1 | n+2 | n+3 |
|---|---|---|---|---|
| m | | | 50 | 50 |
| m+1 | 65 | 50 | 50 | 50 |
| m+2 | 50 | 65 | 50 | 55 |

RETURN DATA

FIG. 45A

|   |   |   |
|---|---|---|
| 9 | 3 | 7 |
| 5 | 1 | 4 |
| 6 | 2 | 8 |

FIG. 45B

|   |   |   |
|---|---|---|
| 6 | 2 | 9 |
| 4 | 1 | 5 |
| 8 | 3 | 7 |

IMAGE PROCESSING DEVICE, METHOD, PROGRAM AND RECORDING MEDIUM RECORDING THE PROGRAM

BACKGROUND OF THE INVENTION

1. Field of the Invention

The present invention relates to processing for quantizing the image data of pixels.

2. Description of the Related Art

Quantizing gradation image data has been performed conventionally. For example, gradation image data with 256 grayscale is binarized. In this case, error is high if the gradation image data is simply binarized using a threshold value. For example, it is assumed that the gradation image data is 0 to 255 and the threshold value is 128. In this case, if the data (density) of a pixel is 50, which is less than the threshold value, 0 is the result after binarization. This means that the error generated is 50 (=50−0).

Therefore an error diffusion method is used for dispersing the error which occurs at quantization into peripheral pixels. In the error diffusion method, the error which occurs at quantization is added to the data of the pixels at the right, below, lower left and lower right of this pixel, for example. An overview of the error diffusion method is stated, for example, in Japanese Patent Application Laid-Open No. H6-62253 (FIG. 30, FIG. 316, FIG. 32).

Another technology disclosed is generating cells by searching input pixels using a predetermined table until the gradation value of the image data which was input reaches the threshold value, and generating a dot at the center position of the cell (e.g. Japanese Patent Application Laid-Open No. H11-27528 (FIG. 4, FIG. 6).

In an image quantized by the error diffusion method, however, an image quality problem may be generated. For example, if pixels in an area where the dot density is low, such as an area near the highlight of the gradation image data, are simply binarized sequentially from the left side to the right side of the screen in the row sequence, error propagates to the pixels at the right, and dots which are generated as a result may connect like a chain. Such a chain-type specific pattern is called a "worm". Also in an area where the dot density is low, such as an area near the highlight, the generation of dots may delay in the main scanning direction and the sub-scanning direction of the error diffusion method. In other words, at the top side of the paper where the area near the highlight is printed, the gradation values of the pixels do not easily reach the threshold value even if the error is propagated, and an area where no dots exist may be generated. Also after processing a specific gradation area, the data (density) outside this area may be distorted. In other words, in an area where the edges switch (boundary area between a part printed in black and a part printed in white during monochrome printing), the error propagated before switching continuously propagates after switching, which may result in the distortion of the generation of dots.

SUMMARY OF THE INVENTION

With the foregoing in view, it is a first object of the present invention to acquire output dots with high image quality, without generating a worm, delay of dot generation, and data distortion outside the area, which are the problems of the error diffusion method.

The above image quality problems are because in the error diffusion method the data (density) of each pixel after the error diffusion does not match the distribution of the data (density) near each pixel before the error diffusion.

Therefore it is a second object of the present invention to match the image data of the pixels with the data distribution of the image when the image data is quantized.

In the above mentioned Japanese Patent Application Laid-Open No. H11-27528, cells are searched using a predetermined table. However, when pixels are actually searched at the left side based on the table, it is highly probable that the pixels have already been processed, and the generated cell becomes a distorted form (e.g. a triangle). Even if a dot is formed at the center of a cell with such a form, the dot may be formed overlapping with a dot of an adjacent cell at a certain part, where output dots cluster.

Therefore it is a third object of the present invention to acquire a visually pleasant print output by improving the dispersion of dots.

It is a fourth object of the present invention to decrease the calculation amount of processing for acquiring a visually pleasant print output and increase the processing efficiency of the entire device.

To achieve the above objects, the present invention is an image processor, comprising pixel group generation means for generating a pixel group by selecting pixels until the total of a gradation image data value for each pixel becomes a threshold value or more, pixel group center of gravity determination means for determining the position of the center of gravity of the pixel group generated by the pixel group generation means, and quantized image data providing means for providing quantized image data to the pixels positioned at the center of gravity determined by the pixel group center of gravity determination means, wherein the pixel group generation means generates the pixel group by continuously selecting pixels closest to the center of gravity determined by the pixel group center of gravity determination means until the total of the gradation image data value for each pixel becomes the threshold value or more. By this, the dispersion of dots improves with the distance between the generated dots uniform, and a pleasant print output can be acquired.

The present invention is the above mentioned image processing device wherein the pixel group generation means randomly selects pixels which are selected when there are a plurality of pixels which are closest to the center of gravity determined by the pixel group center of gravity determination means. By this, the generation of periodic patterns can be suppressed.

To achieve the above objects, the present invention is an image processing device, comprising pixel group generation means for generating a pixel group by selecting pixels until the total of the gradation image data value for each pixel becomes a threshold value or more, pixel group center of gravity determination means for determining the position of the center of gravity of the pixel group generated by the pixel group generation means, and quantized image data providing means for providing quantized image data to the pixel positioned at the center of gravity determined by the pixel group center of gravity determination means, wherein the pixel group generation means continues selecting pixels closest to the center of gravity determined by the pixel group center of gravity determination means until the total of the gradation image data value for each pixel becomes the threshold value or more, and when the total of the gradation image data values in the selected pixel group exceeds the threshold value, the exceeded amount of the gradation image data value is returned to the pixel selected last by the pixel group generation means. By this, the exceeded amount of the gradation values is returned to the pixel where the threshold value is exceeded, so dots matching the gradation values of the input image can be created.

To achieve the above objects, the present invention is an image processing method comprising a pixel group generation step of generating a pixel group by selecting pixels until the total of the gradation image data value for each pixel becomes a threshold value or more, a pixel group center of gravity determination step of determining the position of the center of gravity of the pixel group generated in the pixel group generation step, and a quantized image data providing step of providing quantized image data to the pixels positioned at the center of gravity determined in the pixel group center of gravity determination step, wherein the pixel group generation step generates the pixel group by continuously selecting pixels closest to the center of gravity determined in the pixel group center of gravity determination means until the total of the gradation image data value for each pixel becomes the threshold value or more.

To achieve the above objects, the present invention is a program for having a computer execute a pixel group generation processing for generating a pixel group by selecting pixels until the total of the gradation image data value for each pixel becomes a threshold value or more, a pixel group center of gravity determination processing for determining the position of the center of gravity of the pixel group generated by the pixel group generation processing, and a quantized image data providing processing for providing quantized image data to the pixels positioned at the center of gravity determined by the pixel group center of gravity determination means, wherein the pixel group generation processing generates the pixel group by continuously selecting pixels closest to the center of gravity determined by the pixel group center of gravity determination processing until the total of the gradation image data value for each pixel becomes the threshold value or more.

To achieve the above objects, the present invention is a recording medium storing a program for having a computer execute a pixel group generation processing for generating a pixel group by selecting pixels until the total of the gradation image data value for each pixel becomes a threshold value or more, a pixel group center of gravity determination processing for determining the position of the center of gravity of the pixel group generated by the pixel group generation processing, and a quantized image data providing processing for providing quantized image data to the pixels positioned at the center of gravity determined by the pixel group center of gravity determination means, wherein the pixel group generation processing generates the pixel group by continuously selecting pixels closest to the center of gravity determined by the pixel group center of gravity determination processing until the total of the gradation image data value for each pixel becomes the threshold value or more.

To achieve the above objects, the present invention is an image processing device, comprising pixel group generation means for generating a pixel group by selecting pixels until the total of the gradation image data value for each pixel becomes a threshold value or more based on a first reference point for pixel selection, pixel group reference point determination means for determining a second reference point of the pixel group generated by the pixel group generation means, and quantized image data providing means for providing quantized image data to the pixel positioned at the second reference point determined by the pixel group reference point determination means, wherein the pixel group generation means updates the first reference point and selects pixels based on this first reference point. By this, a pleasant print output can be acquired and the processing efficiency of the entire image processing device can be further improved with less calculation amount compared with the case of selecting unprocessed pixels by computing the center of gravity position.

The present invention is the above mentioned image processing device, wherein the pixel group generation means updates the first reference point each time the pixel is selected. By this, it is possible that the pixel group to be generated is created with a more circular shape compared with the case of fixing the first reference point, therefore the distance between dots is maintained to be uniform and a pleasant print object can be acquired.

The present invention is the above mentioned image processing device, wherein the pixel group generation means updates the first reference point each time a pixel is selected for a predetermined number of times. By this, the processing efficiency of the entire device can be improved with less calculation amount compared with the case of updating the first reference point each time.

The present invention is the above mentioned image processing device, wherein the pixel group generation means updates the first reference point each time when the total of the gradation image data of the selected pixels becomes a predetermined value. By this, the pixel group grows to be a more circular shape and a pleasant print dot output can be acquired, and the calculation amount can be decreased compared with the case of computing the center of gravity position each time.

The present invention is the above mentioned image processing device, wherein the first reference point is a center position computed from the position of the selected pixel. By this, computation, including computing the gradation value of each pixel, is unnecessary, and the calculation amount can be decreased.

The present invention is the above mentioned image processing device, wherein the second reference point is the center of gravity position computed from the position of the pixels of the pixel group and the gradation image data value. By this, dots accurately matching the input gradation values of the pixel group can be generated and a pleasant print output can be acquired.

The present invention is the above mentioned image processing device, wherein the first reference point is the center position computed from the position of the selected pixel, and the second reference point is the center position computed from the positions of the pixels of the pixel group. By this, for both the reference point for pixel selection and the reference point for generating dots, computation, including computing the gradation value, becomes unnecessary, so the processing efficiency of the entire device can be increased with less calculation amount.

The present invention is the above mentioned image processing device wherein the pixel group generation means refers to a table storing the relative positions from the first reference point, and selects pixels in the sequence of being stored in the table until the total of the gradation image data value for each pixel becomes the threshold value or more. By this, pixels are selected merely by referring to the table based on the first reference point, so computing to select a pixel based on the first reference point becomes unnecessary, and the calculation amount can be decreased.

To achieve the above objects, the present invention is an image processing method, comprising a pixel group generation step of generating a pixel group by selecting pixels until the total of the gradation image data value for each pixel becomes a threshold value or more based on a first reference point for pixel selection, a pixel group reference point determination step of determining a second reference point of the pixel group generated in the pixel group generation step, and a quantized image data providing step of providing quantized image data to the pixel positioned at the second reference point determined in the pixel group reference point determination step, wherein the pixel group generation step updates the first reference point and selects pixels based on this first reference point. By this, a pleasant print output can be acquired and an image processing method with less calculation amount can be provided compared with the case of selecting unprocessed pixels by computing the center of gravity position.

To achieve the above objects, the present invention is a program for having a computer execute a pixel group generation processing for generating a pixel group by selecting pixels until the total of the gradation image data value for each pixel becomes a threshold value or more based on a first reference point for pixel selection, a pixel group reference point determination processing for determining a second reference point of the pixel group generated by the pixel group generation processing, and a quantized image data providing processing for providing quantized image data to the pixels positioned at the second reference point determined by the pixel group reference point determination processing, wherein the pixel group generation processing updates the first reference point and selects a pixel based on the first reference point. By this, a pleasant print output can be acquired, and a program which improves the processing efficiency of the entire image processing device with less calculation amount can be provided compared with the case of selecting unprocessed pixels by computing the center of gravity position.

To achieve the above objects, the present invention is a recording medium storing a program for having a computer execute a pixel group generation processing for generating a pixel group by selecting pixels until the total of the gradation image data value for each pixel becomes a threshold value or more based on a first reference point for pixel selection, a pixel group reference point determination processing for determining a second reference point of the pixel group generated by the pixel group generation processing, and a quantized image data providing processing for providing quantized image data to the pixel positioned at the second reference point determined by the pixel group reference point determination processing, wherein the pixel group generation processing updates the first reference point and selects a pixel based on the first reference point. By this, a pleasant print output can be acquired, and a recording medium storing a program which improves the processing efficiency of the entire image processing device with less calculation amount can be provided compared with the case of selecting unprocessed pixels by computing the center of gravity position.

BRIEF DESCRIPTION OF THE DRAWINGS

FIGS. 5A, 5B, 5C, 5D are diagrams depicting a method of determining the position of the center of gravity $56d$, which indicates a method of determining the position of the center of gravity $56d$ when the total of the gradation image data value of each pixel of the quantizing pixel group $56c$ is less than the threshold value (FIG. 5A), and a method of determining the position of the center of gravity $56d$ when the total of the gradation image data value of each pixel of the quantizing pixel group $56c$ is the threshold value or more (FIG. 5B to 5D);

FIGS. 6A, 6B, 6C are diagrams depicting an example when the white density is used as the gradation image data, where FIG. 6A shows black density, FIG. 6B shows conversion into white density, and FIG. 6C shows black density gradation image data which was returned after quantized image data is provided;

FIGS. 8A, 8B, 8C are diagrams depicting initial scanning (FIG. 8A), normal scanning (FIG. 8B), and the determination of the center of gravity $65d$ (FIG. 8C);

FIG. 10A shows the status before normal scanning and FIG. 10B shows the status after normal scanning;

FIGS. 11A, 11B, 11C are diagrams depicting a variant form concerning the threshold value, where FIG. 11A shows an example of the gradation image data 56, FIG. 11B shows the quantizing pixel group $56c$ after the threshold value is changed, and FIG. 11C shows providing quantized image data after the threshold value is changed;

FIGS. 12A, 12B, 12C are diagrams depicting a variant form of providing quantized data to a plurality of pixels in a quantized pixel group $56a$, where FIG. 12A shows a quantizing pixel group $56c$, FIG. 12B shows providing quantized image data in the present embodiment, and FIG. 12C shows providing the quantized data to a plurality of pixels;

FIG. 13 is a diagram depicting an example when the center of gravity of the two quantized pixel groups match;

FIGS. 30A, 30B, 30C are diagrams depicting the concept of constructing a cell based on the reference point of pixel selection;

FIGS. 33A, 33B, 33C are diagrams depicting the concept of constructing a cell based on the reference point of pixel selection;

FIGS. 45A, 45B are diagrams depicting examples of the table for selecting an unprocessed pixel.

DESCRIPTION OF THE PREFERRED EMBODIMENTS

Embodiments of the present invention will now be described with reference to the accompanying drawings.

First Embodiment

Figure 1:
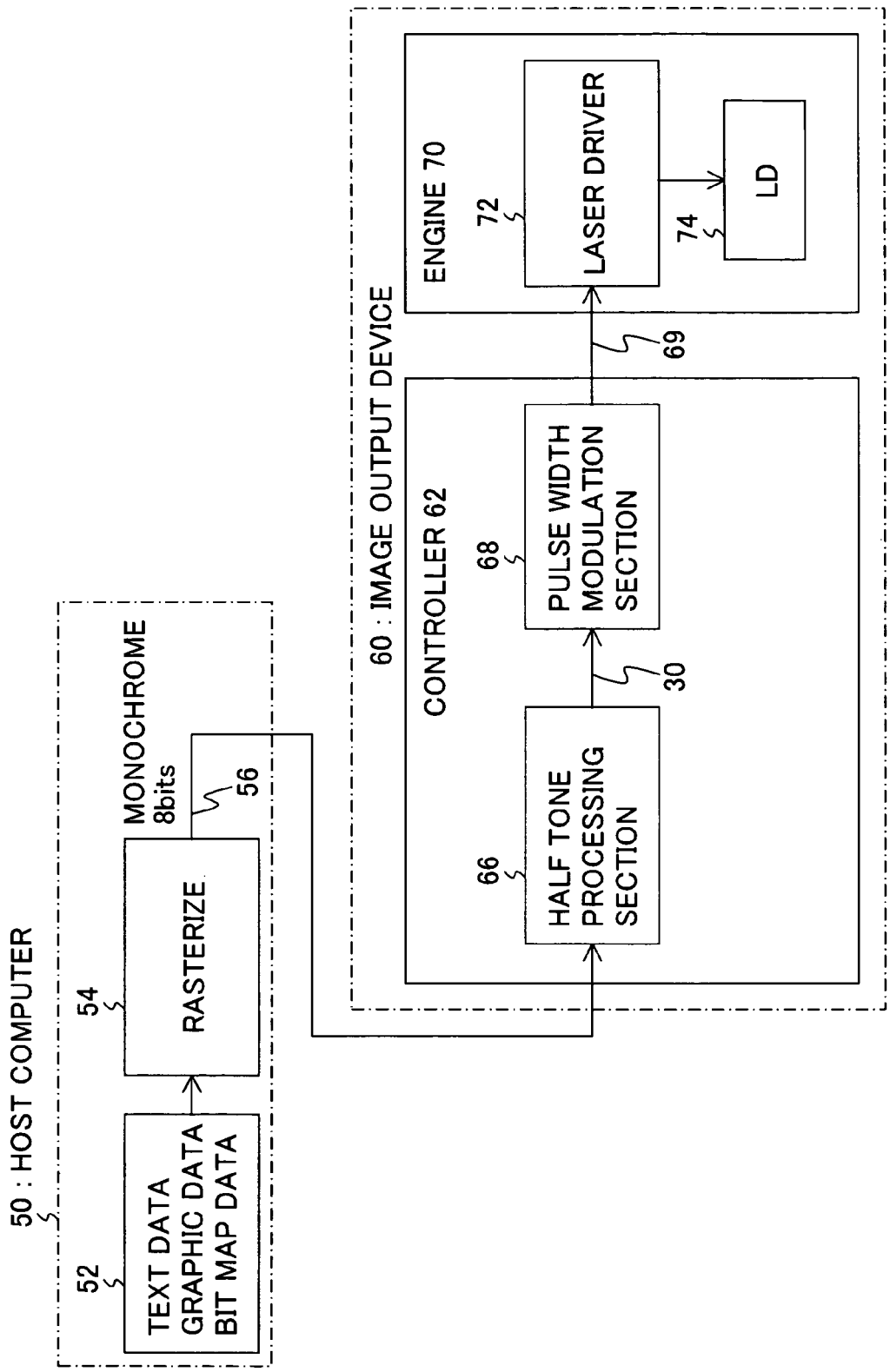
FIG. 1 is a block diagram depicting the image output system according to the present invention which is applied to a monochrome input image.

FIG. 1 is a block diagram depicting an image output system according to the present invention when it is applied to a monochrome input image. In this example, the gradation image data 56 (monochrome in FIG. 1) is generated in the host computer 50 and is sent to the image output device 60, such as a page printer. The image output device 60, such as a page printer, reproduces the monochrome image based on the provided image data 56. The image output device 60 is comprised of a controller 62, which performs image processing and supplies the laser driving data 69 to the engine 70, and the engine, which regenerates images according to the laser driving data 69.

The host computer 50 generates text data, graphic data and bit map data using application programs 52 such as word processors and graphic tools. Each data generated by these application programs 52 is rasterized by the driver 54 for the image output device, which is installed in the host computer 50 and is converted into gradation image data 56, which is comprised of the monochrome data for each pixel or dot. The gradation image data 56 is an aggregate of gradation image data values where each pixel has 8-bit values, 0 to 255, for example.

The image output device 60 also has a microprocessor, which is not illustrated, and the controller 62, which has a half tone processing section 66 and a pulse width modulation section 68, is constructed by the microprocessor and the installed control program. The half tone processing section 66 receives the gradation image data 56 and generates quantized image data 30. The configuration of the half tone processing section 66 will be described later. The quantized image data 30 is sent to the pulse width modulation section 68. The pulse width modulation section 68 generates the driving data 69 which has data on whether a laser driving pulse exists or not for each dot.

The laser driver 72 in the engine 70 drives the laser diode 74 for image drawing based on the driving data 69. The engine 70 includes a photosensitive drum, transfer belt, and drive section thereof, which are omitted in FIG. 1.

The image processing device according to the embodiment of the present invention corresponds to the half tone processing section 66 which converts the gradation image data 56 into quantized image data 30.

Figure 2:
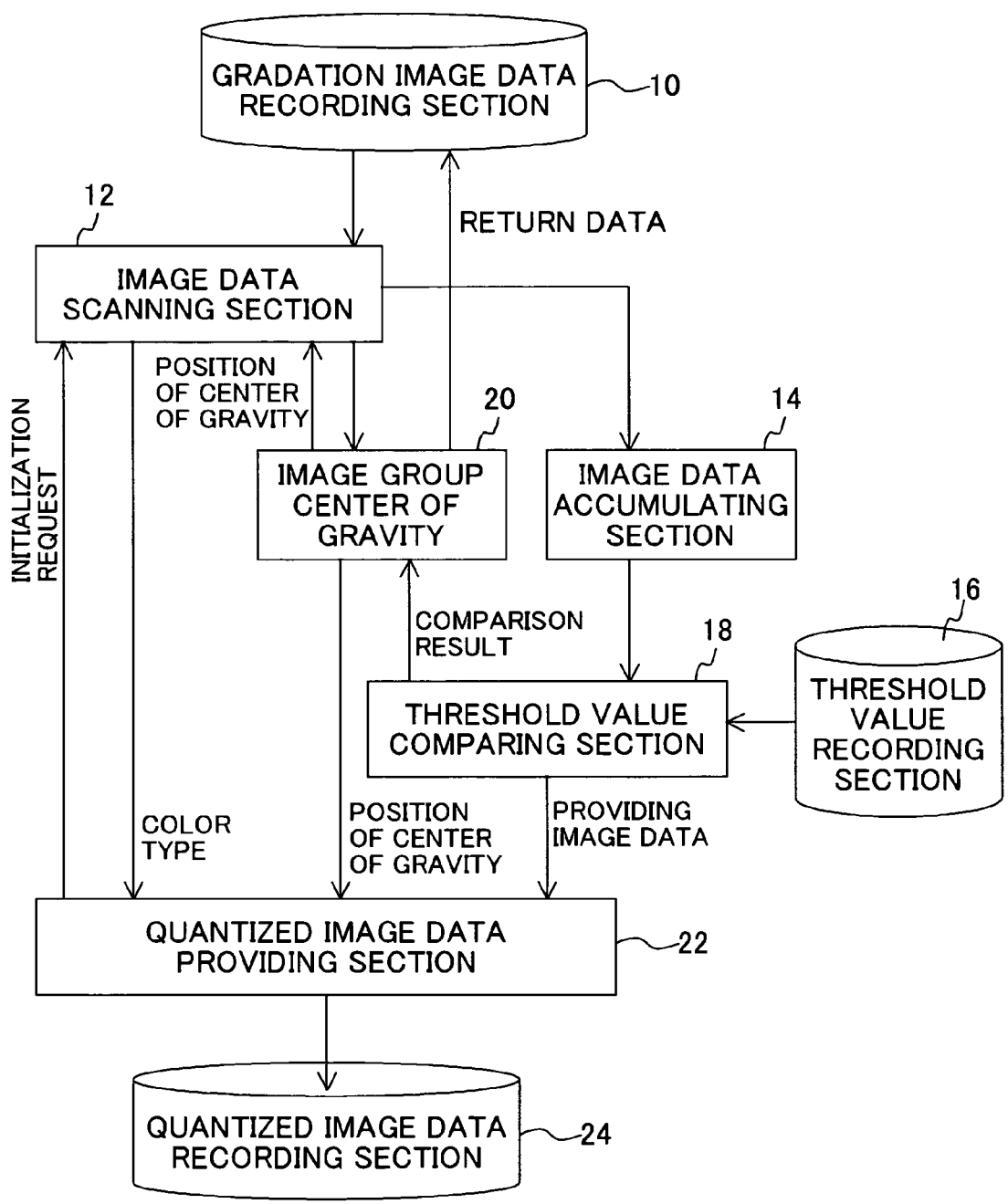
FIG. 2 is a block diagram depicting the configuration of the image processing device according to an embodiment of the present invention.

FIG. 2 is a block diagram depicting the configuration of the image processing device according to an embodiment of the present invention. The image processing device comprises a gradation image data recording section 10, image data scanning section (pixel group generation means) 12, image data accumulating section 14, threshold value recording section 16, threshold value comparing section 18, image group center of gravity determination section 20, quantized image data providing section 22 and quantized image data recording section 24.

The gradation image data recording section 10 receives gradation image data 56 which is output from the host computer 50, and records it. The gradation image data 56 has an 8-bit value (0 to 255) for each pixel, for example. This value indicates the density of black, for example.

The data scanning section (pixel group generation means) 12 scans the gradation image data 56. The scanning method of the gradation image data will be described with reference to FIG. 3.

Figure 3A:
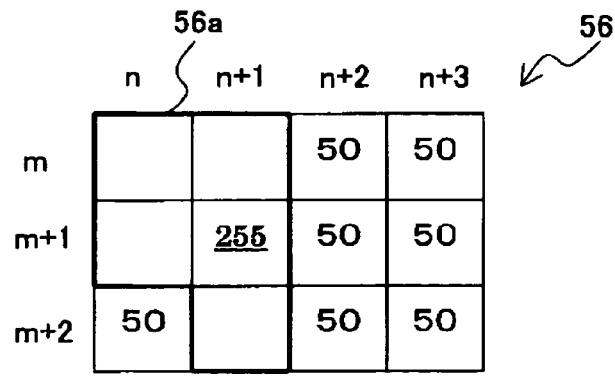
FIGS. 3A, 3B, 3C are diagrams depicting the scanning method of the gradation image data 56, indicating the gradation image data 56 (FIG. 3A), initial scanning (FIG. 3B), and normal scanning (FIG. 3C)

FIG. 3A shows the gradation image data 56 recorded in the gradation image data recording section 10. FIG. 3A shows the gradation image data where pixels are in the range of m to m+2 rows and n to n+3 columns. Hereafter a pixel will be written as (n, m). The pixel (n, m) indicates a pixel at the m-th row and the n-th column. Of the gradation image data, it is assumed that the quantized pixel group 56a (pixel (n, m), (n+1, m), (n, m+1), (n+1, m+1), and (n+2, m+1)), have been quantized, and the quantized image data value "255" is provided to the pixel (n+1, m+1). There are two types of scanning methods, and initial scanning is executed when the quantizing pixel group 56c does not exist, and normal scanning is executed when the quantizing pixel group 56c does exist.

Figure 3B:
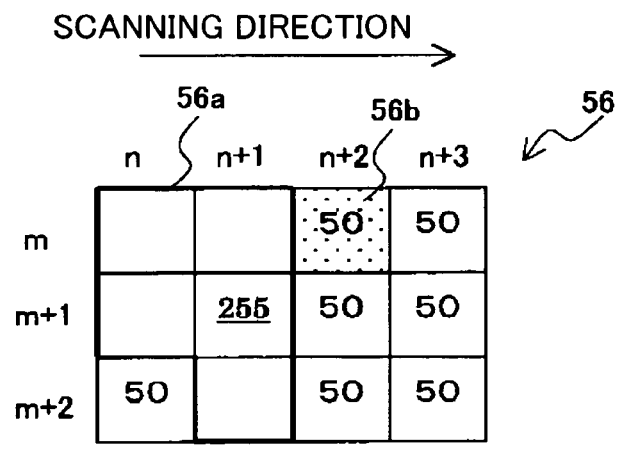

The method for initial scanning will be described with reference to FIG. 3B. In the initial scanning, the scanning target is a pixel at the most left in the highest row in the pixels excluding the quantized pixel group 56a. The main scanning direction is from left to right. In FIG. 3B, the highest row is the row m, and the pixel (n+2, m) which is at the most left in this row is the initial scanning target pixel 56b, which is the scanning target in the initial scanning. The initial scanning target pixel 56b constitutes the quantizing pixel group 56c.

The method for normal scanning will be described with reference to FIG. 3C. The center of gravity 56d of the quantizing pixel group 56c (pixel (n+2, m), (n+3, m)) is at the mid-point of the border line of the pixel (n+2, m) and pixel (n+3, m), since the gradation image data values of the pixel (n+2, m) and the pixel (n+3, m) are the same. In the normal scanning, the scanning target is the pixel closest to the center of gravity 56d (excluding the quantized pixel group 56a). Since the next pixel is searched from the center of gravity 56d, the quantized pixel group 56a is generated in a circular shape, and even if a dot is created at the center of gravity 56d thereof, adjacent dots maintain a uniform distance. By such a dispersion of dots, a visually pleasant print output can be acquired.

Figure 3C:
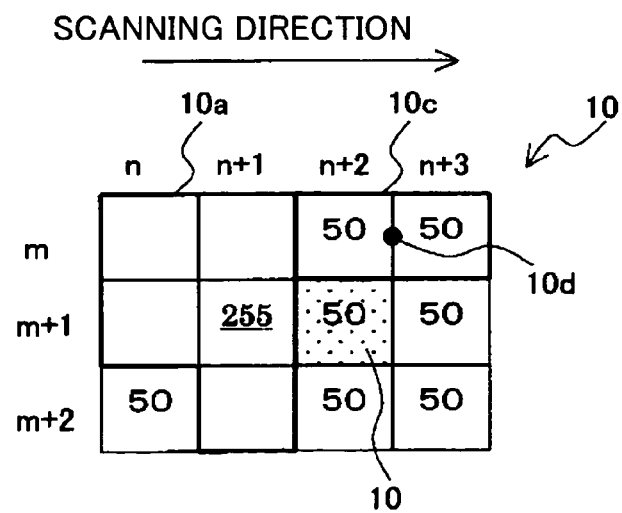
Figure 4A:
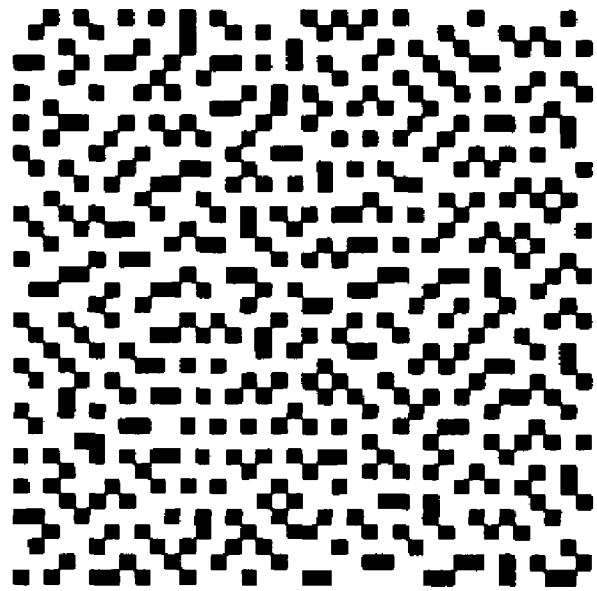
FIGS. 4A, 4B are diagrams depicting an example of print output when a pixel is selected at random (FIG. 4A), and an example of print output when pixels are selected in the fixing sequence (FIG. 4B)
Figure 4B:
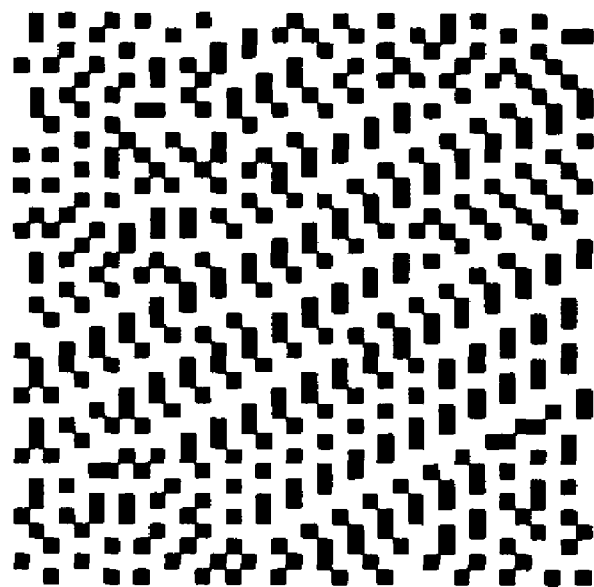

In FIG. 3C, the pixels closest to the center of gravity 56d are the pixel (n+2, m+1) and the pixel (n+3, m+1). If there is a plurality of pixels which are closest to the center of gravity 56d, as in this case, it is preferable to select the scanning target at random. If the scanning target is selected not at random but in the sequence of fixing, the form of the quantized pixel group 56a tends to be a specific form, and if a dot is created at the center of gravity 56d thereof, the positions of the dots in the entire image become periodic, and a periodic pattern is generated in the print output. Such a periodic pattern tends to be recognized by sight, which makes the image of the print output unnatural. If the scanning target is selected at random, on the other hand, the form of the quantized pixel group 56a to be generated does not become specific, and even if a dot is created at the center of gravity 56d thereof, the above mentioned periodic pattern is not generated, and a visually pleasant print output is acquired. FIG. 4A shows an example of the print output when the scanning target pixels are selected at random, and FIG. 4B shows an example of the print output when the pixels are selected not at random but in the sequence of fixing using a table, for example. As FIG. 4B shows, if the pixels are selected in the sequence of fixing, dots are created in a specific sequence from the lower left to the upper right of the print portion, which generates a periodic pattern, and this pattern is recognized by sight, and makes the print output unnatural. If the pixels are selected at random, as shown in FIG. 4A, on the other hand, the periodic pattern is not generated, and a visually pleasant print output can be acquired.

In the case of the example in FIG. 3C, the pixel (n+2, m+1) is selected as the normal scanning target pixel 56e, which is a scanning target of normal scanning. After the normal scanning target pixel 56e becomes a part of the quantizing pixel group 56c, the next normal scanning is executed.

When the initial scanning is executed, the quantizing pixel group 56c is generated, so thereafter normal scanning is repeatedly executed. The normal scanning target pixel 56e is incorporated into the quantizing pixel group 56c. However, when the total of the gradation image data value of each pixel in the quantizing pixel group 56c becomes a threshold value (e.g. 255) or more, the quantizing pixel group 56c becomes the quantized pixel group 56a. In other words, the quantizing pixel group 56c is a set of pixels which became the scanning target before becoming the quantized pixel group 56a. When the quantizing pixel group 56c becomes the quantized pixel group 56a, initial scanning is executed again.

The image data scanning section 12 outputs the gradation image data value of each pixel of the quantizing pixel group 56c to the image data accumulation section 14. The image data scanning section 12 also outputs the position and the gradation image data value of each pixel of the quantizing pixel group 56c to the pixel group center of gravity determination section 20.

The image data accumulation section 14 receives the gradation image data values of the quantizing pixel group 56c from the image data scanning section 12, determines the total, and outputs the total. In the case of the example of FIG. 3C, the total of the gradation image data values of the quantizing pixel group 56c (pixel (n+2, m), n+3, m)) is 50+50=100.

The threshold value recording section 16 records the threshold value to be compared with the total of the gradation image data value of each pixel of the quantizing pixel group 56c. The threshold value is 255, for example.

The threshold value comparison section 18 compares the output of the image data accumulation section 14 with the threshold value read from the threshold value recording section 16. And the threshold value comparison section 18 sends the comparison result (whether the total of the gradation image data value of each pixel of the quantizing pixel group 56c is less than the threshold value or the threshold value or more) to the pixel group center of gravity determination section 20. The threshold value comparison section 18 also requests the quantized image data providing section 22 to provide the quantized image data if the total of the gradation image data value of each pixel of the quantizing pixel group 56c is the threshold value or more.

The pixel group center of gravity determination section determines the position of the center of gravity 56d of the quantizing pixel group 56c. The position of the center of gravity 56d is sent to the image data scanning section 12. The determination method for the position of the center of gravity 56d will be described with reference to FIG. 5. The determination method for the position of the center of gravity 56d differs depending on the comparison result of the threshold value comparison section 18.

The determination method for the position of the center of gravity 56d, in the case when the total of the gradation image data value of each pixel of the quantizing pixel group 56c is less than the threshold value in the comparison result, will be described with reference to FIG. 5A. The total of the data value of each pixel of the quantizing pixel group 56c is 50+50+50+50=200, which is less than the threshold value (=255). In this case, the position of the center of gravity 56d is determined regarding that the data aggregates at the center of each pixel of the quantizing pixel group 56c. In the case of FIG. 5A, the data value of each pixel of the quantizing pixel group 56c (pixel (n, m), (n+1, m), (n, m+1), and (n+1, m+1)) is all equal, so the position of the center of gravity 56d is at the lower right corner of the pixel (n, m).

The determination method for the position of the center of gravity 56d, in the case when the total of the gradation image data value of each pixel of the quantizing pixel group 56c is the threshold value or more in the comparison result, will be described with reference to FIG. 5B. The total of the data value of each pixel of the quantizing pixel group 56c is 50+50+50+50+65=265, which is more than the threshold value (=255). In this case, the amount of the gradation image data value exceeding the threshold value is ignored. In the case of the example in FIG. 5B, only the value 10 out of the data value of the pixel (n+1, m+2) is ignored, and the position of the center of gravity 56d is determined regarding the data value of the pixel (n+1, m+2) as 55 (=65−10). The position of the center of gravity 56d is slightly more to the lower right side than the center of gravity 56d in FIG. 5A, which is in the pixel (n+1, m+1).

The ignored gradation image data value "10" (return data) is returned to the pixel (n+1, m+2) (see FIG. 5C). In other words, the gradation image data value "10" remains in the pixel (n+1, m+2). The pixel (n+1, m+2) can also be a composing element of another quantizing pixel group 56c. In other words, the gradation image data value "10" of the pixel (n+1, m+2) is not incorporated into the quantized pixel group 56a, but becomes a search target from the center of gravity as the quantizing pixel group 56c when search starts from the initial pixel again. Since the return data value is returned to the original pixel (n+1, m+2) in this way, dots are created accurately matching the dot distribution of the gradation values of the pixels which are input, compared with the case of propagating error with returning the return data value to a pixel other than the quantized pixel group 56a. The gradation image data values of the pixels (n, m), (n+1, m), (n, m+1) and (n+1, m+1) were not ignored, so these gradation image data values do not remain.

If the total of the gradation image data value of each pixel of the quantizing pixel group 56c is the threshold value or more in the comparison result, the position of the center of gravity 56d is sent to the quantized image data providing section 22.

The determination method for the position of the center of gravity 56d, in the case when the total of the gradation image data value of each pixel of the quantizing pixel group 56c is more than the threshold value in the comparison result, was described with reference to FIG. 5B, but the total of the gradation image data value of each pixel of the quantizing pixel group 56c may be equal to the threshold value in some cases. For example, in FIG. 5A to 5C, the total of the gradation image data values of the pixels (n+2, m), (n+3, m), (n+2, m+1), (n+3, m+1), and (n+3, m+2) is 255 (=threshold value). In this case, as FIG. 5D (right half) shows, the center of gravity 56d is in the pixel (n+3, m+1). And the return data is not generated.

When the quantized image data providing request is received from the threshold value comparison section 18, the quantized image data providing section 22 provides the quantized image data, which is equal to the threshold value, to the pixel positioned at the center of gravity 56d sent from the pixel group center of gravity determination section 20. With reference to FIG. 5C, the quantized image data providing section 22 provides the quantized image data "255", which is equal to the threshold value, to the pixel (n+1, m+1) positioned at the center of gravity 56d of the quantized pixel group 56a. In FIG. 5C, the quantized pixel group 56a exists because the quantized image data "255" has already been provided. When the quantized image data is provided, the quantized image data providing section 22 sends an initialization request to the image data scanning section 12, that is, requests initial scanning to the image data scanning section 12. By this, the image data scanning section 12 executes initial scanning again.

Now the providing of quantized image data will be described. Generally a printer cannot print distinguishing 256 grayscales of density for each pixel. For example, a printer can print either white (density of black is 0) or black (density of black is 255) for each pixel. So for the quantized pixel group 56a, quantized image data "255", which is equal to the threshold value, is provided to the pixel where the center of gravity thereof positions. In other words, a black dot is printed at the pixel where the center of gravity positions. The shape of the dot is arbitrary. Circular, for example, is used, but another shape is acceptable. It is preferable, however, that the center of gravity of the dot positions in the pixel where the dot positions.

FIG. 6A to 6C shows an example when the white density is used as the gradation image data. With reference to FIG. 6A, a gradation image data value which indicates a relatively dark black, such as black density "205", is recorded in each pixel. In this status, the total of the gradation image data value of each pixel of the quantizing pixel group 56c becomes the threshold value or more very quickly.

So as FIG. 6B shows, the black density is converted into white density, that is, white density=255−black density. The conversion into white density is executed for the pixels around the initial scanning target pixel 56b, for example, by the image data scanning section 12 (corresponds to the white density conversion means). It is preferable to execute the conversion into white density when the gradation image data value of the initial scanning target pixel 56b exceeds the medium degree of density (e.g. 127≈255/2). In FIG. 6B, the total of data value of each pixel in the quantizing pixel group 56c (pixels (n, m), (n+1, m), (n, m+1), (n+1, m+1)) is less than the threshold value. If these pixels remain with black density (see FIG. 6A), only the total of the data value of the pixels (n, m) and (n+1, m) (410=205+205) already exceeds the threshold value of (225).

As FIG. 6C shows, the return data is 245, and the provided quantized image data is 0. If this is converted into white density, the return data becomes 10, and the provided quantized image data becomes 255, which corresponds to FIG. 5C.

When the quantized image data 0 is provided, a black dot is printed for the pixels around the pixel to which [the quantized image data 0] is provided, and the dot is not printed for the pixel to which the quantized image data 0 is provided.

The quantized image data recording section 24 records the quantized image data provided by the quantized image data providing section 22. The recording content of the quantized image data recording section 24 is output as the quantized image data 30.

Figure 7:
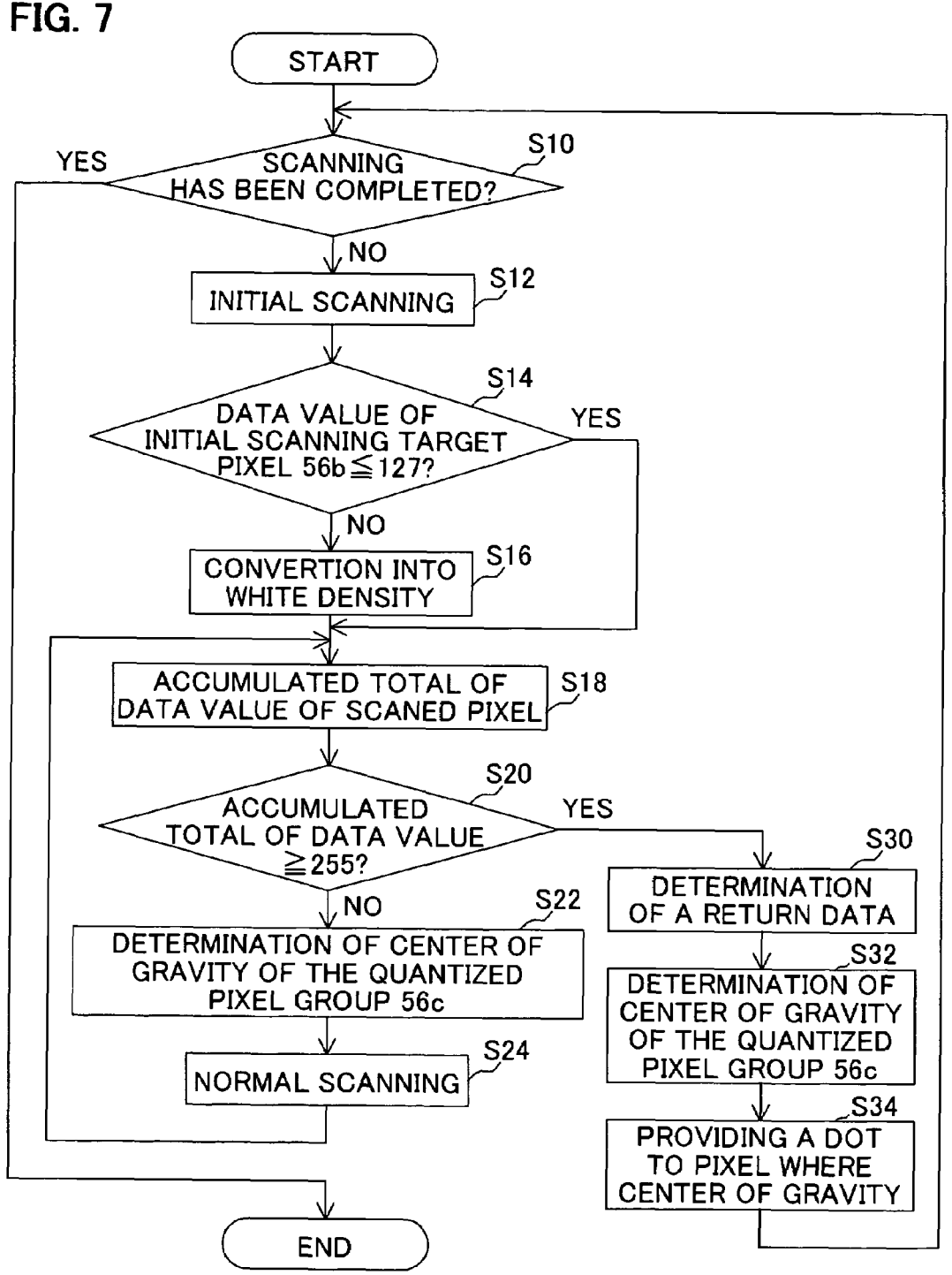
FIG. 7 is a flow chart depicting the operation of an embodiment of the present invention.

Now the operation of an embodiment of the present invention will be described with reference to the flow chart in FIG. 7, and to FIGS. 8 and 9.

At first, the image data scanning section 12 reads the gradation image data 56 from the gradation image data recording section 10, and judges whether unscanned pixels exist (S10). If there are no unscanned pixels, that is if scanning has been completed (Yes in S10), processing ends. If unscanned pixels exist, that is if scanning has not been completed (No is S10), the image data scanning section 12 executes initial scanning (S12). In other words, the initial scanning target pixel 56b is determined. If there is the gradation image data 56 as shown in FIG. 8A, for example, the pixel (n, m) becomes the initial scanning target pixel 56b.

Then the image data scanning section 12 determines whether the gradation image data value recorded in the initial scanning target pixel 56b is 127 or less (S14). If the gradation image data value exceeds 127 (No in S14), the image data scanning section 12 converts the gradation image data value in each pixel of the gradation image data 56 into white density (S16) (see FIGS. 6A and 6B). Then the gradation image data value of the scanned pixel is sent to the image data accumulation section 14. If the gradation image data value is 127 or less (Yes in S14), the image data scanning section 12 sends the gradation image data value of the scanned pixel to the image data accumulation section 14. In the example in FIG.

8A, the gradation image data value recorded in the initial scanning target pixel 56b is 50, so conversion into white density is not executed.

When the gradation image data value of the scanned pixel is received from the image data scanning section 12, the image data accumulation section 14 calculates the accumulated total of the data value (S18). The accumulated total of the data value is sent to the threshold value comparison section 18. The threshold value comparison section 18 compares the accumulated total of the data value with the threshold value (=255) read from the threshold recording section 16. And whether the accumulated total of the data value is the threshold value (=255) or more (S20) is judged. The result of the judgment is sent to the image group center of gravity determination section 20. This is because the operation of the pixel group center of gravity determination section 20 differs depending on the result of the judgment.

If the accumulated total of the data value is less than the threshold value (No in S20), the pixel which was scanned last is incorporated into the quantizing pixel group 56c. Then the pixel group center of gravity determination section 20 determines the center of gravity of the quantizing pixel group 56c (S22). The pixel group center of gravity determination section 20 receives the position and the gradation image data value of each pixel of the quantizing pixel group 56c from the image data scanning section 12 before determining the center of gravity of the quantizing pixel group 56c. These are used for determining the center of gravity. And the image data scanning section 12 executes normal scanning (S24). In other words, the normal scanning target pixel 56e is determined. And processing returns to the accumulation of data value (S18).

With reference to FIG. 8A, the gradation image data recorded in the initial scanning target pixel 56b is 50. Here the accumulated total of the gradation image data value=50 is acquired by the image data accumulation section 14 (S18). Since the accumulated total is less than 255 (No in S20), the initial scanning target pixel 56b is incorporated into the quantizing pixel group 56c (see FIG. 8B), then the center of gravity of the quantizing pixel group 56c is determined (S22). The center of gravity is the center of the pixel (n, m). The pixels closest to the center of gravity are the pixels (n+1, m) and (n, m+1). As mentioned above, the distance from the center of gravity is used to search the next pixel to be incorporated into the quantized pixel group 56a, so the shape of the quantizing pixel group 56c to be finally generated is grown to be roughly circular, dots are formed with a uniform distance from one another, and the dispersion of dots improves. Here the normal scanning target pixel 56e is selected at random, and the pixel (n+1, m) becomes the normal scanning target pixel 56e (S24) (see FIG. 8B). By selecting the scanning target pixel at random as described above, the shapes of the quantized pixel group 56a to be finally generated do not always become a same shape, where periodic patterns of dots do not appear.

Then processing returns to the accumulation of data value (S18), and the accumulated total of the data value=50+ 50=100 is determined. Since the accumulated total is less than 255 (No in S20), the normal scanning target pixel 56e is incorporated into the quantizing pixel group 56c (see FIG. 8C), then the center of gravity of the quantizing pixel group 56c is determined (S22). The center of gravity 56d is the mid-point on the border line of the pixel (n+1, m) and the pixel (n, m+1). Hereafter scanning is repeated in this way.

If the accumulated total of the data value is the threshold value or more (Yes in S20), the pixel which was scanned last is incorporated into the quantizing pixel group 56c. Then the pixel group center of gravity determination section 20 determines the return data (S30). And the pixel group center of gravity determination section 20 determines the center of gravity of the quantizing pixel group 56c (S32). The pixel group center of gravity determination section 20 receives the position and gradation image data value of each pixel of the quantizing pixel group 56c from the image data scanning section 12 before determining the center of gravity of the quantizing pixel group 56c. These are used for determining the center of gravity. The return data is not considered when the center of gravity is determined. The threshold value comparison section 18 requests the quantized image data providing section 22 to provide the quantized image data. The pixel group center of gravity determination section 20 sends the position of the center of gravity to the quantized image data providing section 22. The image data scanning section 12 sends the information on whether black density is used or white density is used to the quantized image data providing section 22. The quantized image data providing section 22 receives the quantized image data providing request, and provides the quantized image data to the pixel where the center of gravity of the quantizing image group 56c positions (S34). The quantized image data to be provided is 255 if black density is used, and is 0 if white density is used. And the quantized image data providing section 22 requests initialization to the image data scanning section 12, and processing returns to determination of whether an unscanned pixel exists (S10).

Figure 9A:
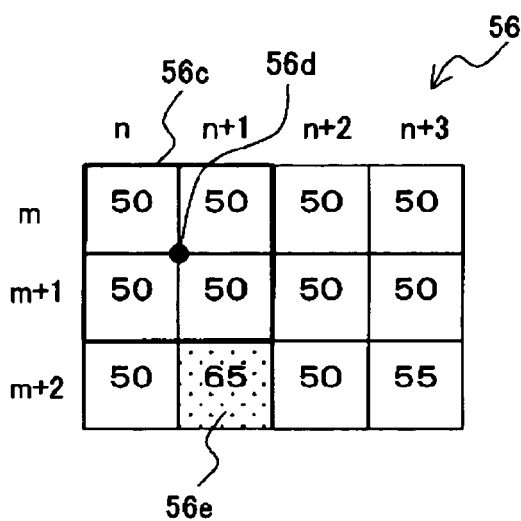
FIG. 9A to 9D are diagrams depicting the last normal scanning (FIG. 9A), quantizing pixel group $56c$ (FIG. 9B), determination of return data (FIG. 9C), and determination of center of gravity $65d$ and providing quantized image data (FIG. 9D)
Figure 9B:
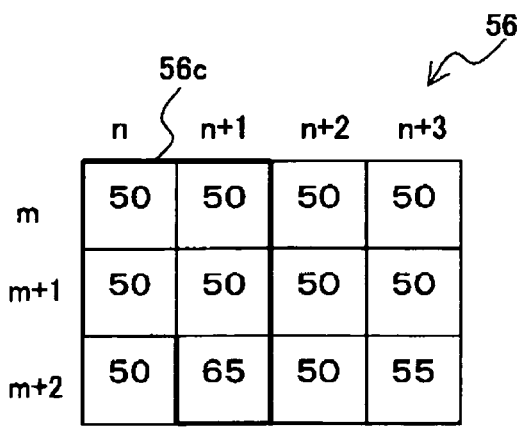
Figure 9C:
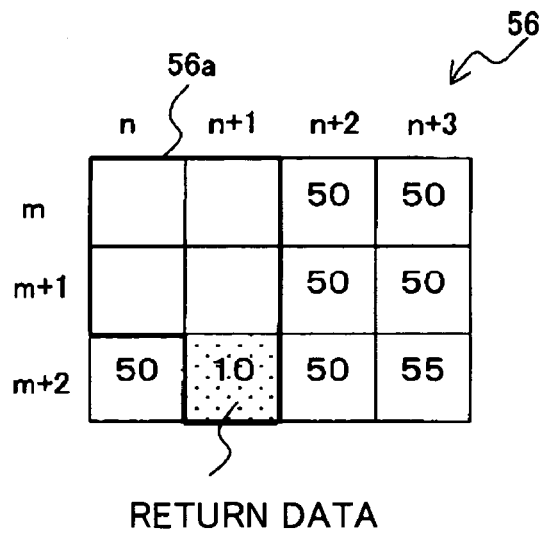
Figure 9D:
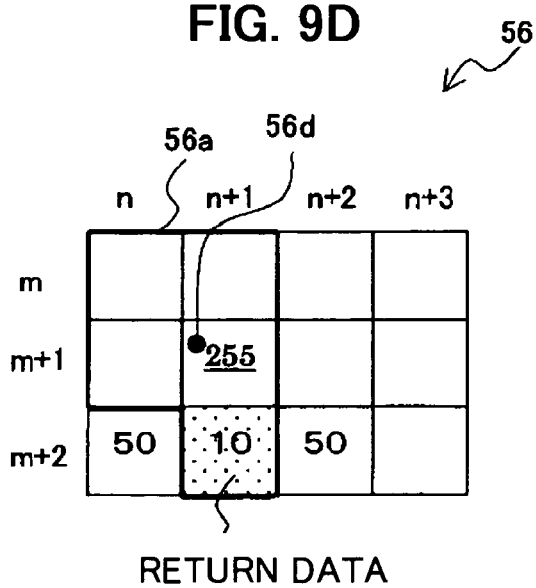

With reference to FIG. 9A, the quantizing pixel group 56c is comprised of the pixels (n, m), (n+1, m), (n, m+1) and (n+1, m+1). The quantizing pixel group 56c is generated by scanning the pixels in the sequence of (n, m), (n+1, m), (n+1, m+1) and (n, m+1), for example. The center of gravity 56d is at the lower right corner of the pixel (n, m). The pixels closest to the center of gravity 56d are the pixel (n+1, m+2) and the pixel (n, m+2). Here the normal scanning target pixel 56e is selected at random, and the pixel (n, m+2) is selected as the normal scanning target pixel 56e (S24).

Then processing returns to the accumulation of data value (S18), and the accumulated total of the data value=50+50+ 50+50+65=265 is determined. Since the accumulated total is more than 255 (Yes in S20), the normal scanning target pixel 56e is incorporated into the quantizing pixel group 56c (see FIG. 9B), then return data is determined (S30). The return data is calculated for the pixel (n, m+2) which was scanned last. That is, the accumulated total of the data value−threshold value=265−255=10. Therefore the return data is 10, which is returned to the pixel (n, m+2) (see FIG. 9C). The gradation image data of the pixel (n, m+2) is regarded as the value from which the return data is subtracted, that is 65−10=55, and the center of gravity 56d of the quantizing pixel group 56c is determined [with this gradation image data] (S32). The position of the center of gravity is the same as in FIG. 5C (see FIG. 9D). And the quantized image data providing section 22 provides the quantized image data 255 to the pixel (n+1, m+1) where the center of gravity 56d is positioned (S34).

According to the embodiment of the present invention, the quantized image data is provided to the pixel where the center of gravity 56d of the quantized pixel group 56a is positioned. By this, the quantized image data matches the density distribution of the gradation image data of the quantized pixel group 56a. Also the value of the quantized image data is equal to the threshold value (=255) and the total (excluding return data) of the gradation image data of each pixel in the quantized pixel group 56a is also equal to the threshold value, so there is no quantization error in the units of the quantized pixel group 56a.

In this way quantization which does not have a quantize error and which matches the density distribution of the gradation image data becomes possible. Therefore the problem of a worm, due to the mismatch of the data (density) of each pixel after error diffusion with the data (density) near each pixel before error diffusion, is solved.

The return data in the quantized pixel group 56a is ignored and returned to the pixel when the center of gravity 56d is determined, so quantization error does not occur even if the total of the gradation image data of each pixel in the quantized pixel group 56a exceeds the threshold value.

Here the return data is returned to the original pixel and the pixel is not incorporated into the quantized pixel group 56a, but is incorporated into the quantizing pixel group 56c in the scanning from the initial pixel, so dot distribution accurately matching the input gradation values can be created.

If the black density is high, a radical decrease of the number of pixels to be incorporated into the quantized pixel group 56a can be prevented by using white density (see FIG. 6).

When there is a plurality of pixels which are closest to the center of the gravity of the quantizing pixel group 56c, the pixel to be the normal scanning target pixel 56e is determined at random, so the image quality of the image after quantization improves.

Various variant forms of the embodiment of the present invention are possible.

For example, in the case when the main scanning direction is from left to right, if the quantizing pixel group 56c is generated near the right end of the gradation pixel data 56, more pixels may not be able to be incorporated into the quantizing pixel group 56c before the total of the gradation image data value of each pixel reaches the threshold value. In this case, the quantized image data closest to the total of the gradation image data value of each pixel is provided to the center of gravity of the quantizing pixel group 56c. Since the quantized image data cannot have so many grayscales as 256, an error may occur between the quantized image data and the total, but this is ignored.

Figure 10A:
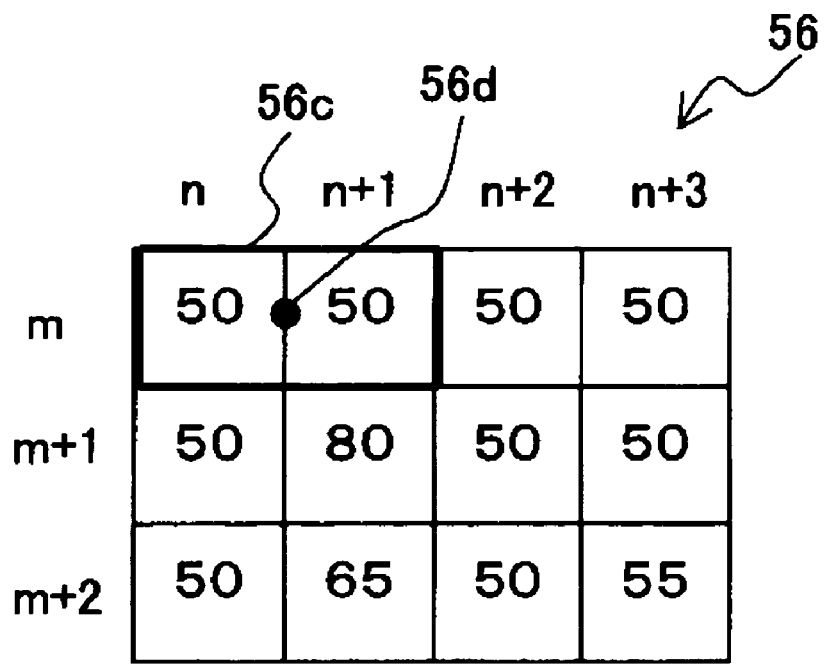
FIGS. 10A, 10B are diagrams depicting a variant form of the selection method for the normal scanning target pixel $56e$, where
Figure 10B:
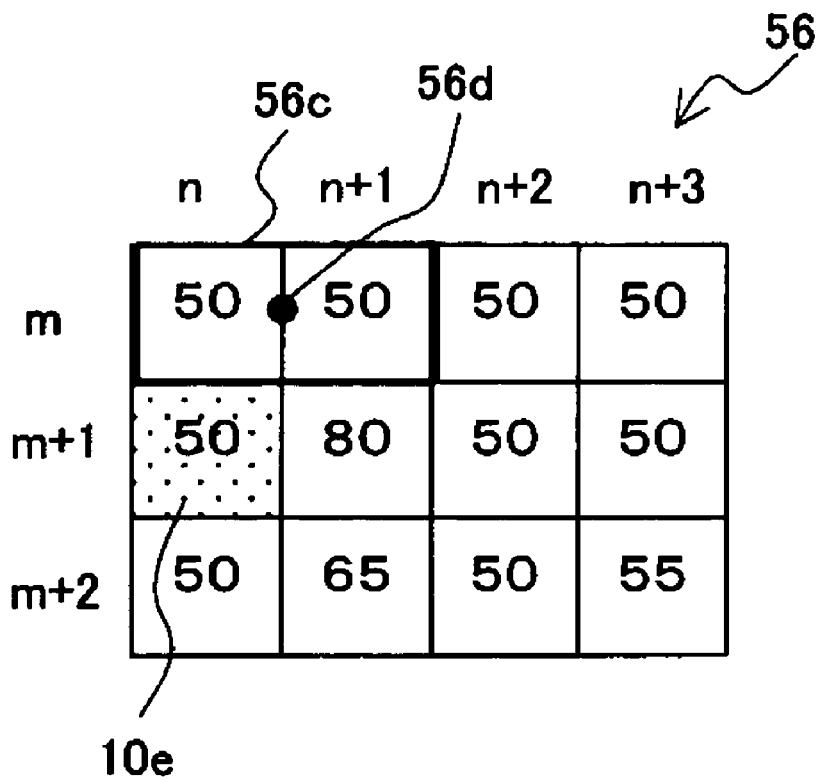

With reference to FIGS. 10A, 10B, a variant form of a method for selecting a normal scanning target pixel 56e will be described. As FIG. 10A shows, in the case when the quantizing pixel group 56c is comprised of the pixels (n, m) and (n+1, m) (both have gradation pixel data value=50), the center of gravity 56d is at the mid-point of the border line of the pixel (n, m) and the pixel (n+1, m). So the pixels closest to the center of gravity 56d are the pixel (n, m+1) and the pixel (n+1, m+1). In this variant form, the normal scanning target pixel 56e is not selected at random, but the pixel of which the gradation pixel data value is smaller is selected as the normal scanning target pixel 56e. In FIGS. 10A, 10B, the gradation pixel data value of the pixel (n, m+1) is 50, and the gradation pixel data value of the pixel (n+1, m+1) is 80. Since the gradation pixel data value of the pixel (n, m+1) is smaller, the pixel (n, m+1) is selected as the normal scanning target pixel 56e (see FIG. 10B). By this, reproducibility of the edge of the quantized image improves. In other words, in the portion of the edge where color changes considerably, a pixel of which the gradation value is low, and not a pixel of which the gradation value is high, is selected and is incorporated into the quantizing pixel group 56c, and the pixel of which the gradation value is high is not incorporated, so dots can be generated accurately matching the input gradation value without creating dots with the total of the gradation values suddenly exceeding the threshold value.

The density of each pixel in FIGS. 10A, 10B may be white density. If the density of each pixel in FIGS. 10A, 10B is white density, a pixel of which the white density is lower is selected. This means that a pixel of which the black density is higher is selected. The white density is used in the case when the black density of the initial scanning target pixel 56b exceeds 127. Therefore if the black density of the initial scanning target pixel 56b exceeds 127, a pixel of which the black density is higher is selected as the normal scanning target pixel 56e.

With reference to FIGS. 11A, 11B, 11C, a variant form involving the threshold value will be described. When the gradation image data 56 is as shown in FIG. 11A, the total of the gradation image data value has difficulty reaching the threshold value even if the number of pixels of the quantizing pixel group 56c is increased. In the case of the gradation image data 56 as shown in FIG. 11A, the total of the gradation image data values of the entire pixels is 10×12=120, which does not reach the threshold value (=255). So the threshold value is changed. For example, the threshold is set to 50. Then if the quantizing pixel group 56c is comprised of the pixels (n, m), (n+1, m), (n, m+1), (n+1, m+1), and (n+1, m+2), as shown in FIG. 11B, the total of the gradation image data values reaches the threshold value (=50). In this case, the quantized image data "50" is provided to the pixel (n+1, m+1) where the center of gravity 56d positions (see FIG. 1C). This means that compared with the case of the quantized image data "255", about a 20% (50/255) sized dot is printed in the pixel (n+1, m+1).

An example of a threshold value change method is as follows. At first, a plurality of threshold value candidates are recorded in the threshold value recording section 16 in advance. For example, 255 and 50 are recorded as the threshold value candidates. Here the highest one (e.g. 255) of the threshold value candidates is used as the threshold value. And if the total of the gradation data values does not reach the threshold value, even if the number of pixels of the quantizing pixel group 56c reaches a predetermined value (e.g. 12), the threshold value candidate which is highest next to the highest value is read from the threshold value recording section 16, and is used as the threshold value. If the total of the gradation image data values still does not reach the threshold value, even if the number of pixels of the quantizing pixel group 56c reaches a predetermined value, the threshold value comparison section 18 reads the threshold value candidate which is the next highest from the threshold value recording section 16, and is used as the threshold value. In this way, the threshold value to be used is gradually decreased. For example, if the total of the gradation image data values does not reach 255, even if the number of pixels of the quantizing pixel group 56c becomes 12, the threshold value comparison section 18 reads the threshold value candidate which is the next highest (=50) from the threshold value recording section 16, and is used as the threshold value.

If the threshold value is decreased as the total of the gradation image data values decreases in this way, black dots can be printed at a certain density even for an area where the gradation image data value is low. Therefore in the gradation image data 56, black dots which hardly print in an area where the gradation image data value is low can be prevented. This means that the interval of the dots to be printed becomes almost a constant. Therefore the dispersion of dots improves. By this, the generation of low frequency noise is suppressed.

In an area where the gradation values of the input image are continuous at an intermediate value (e.g. the case when the gradation value "120" continues), the quantized image group 56a is comprised of almost two pixels if the threshold value is a constant. And if the number of pixels included in the quantized pixel group 56a is small (if the size of the quantized pixel group 56a is small), the number of dots to be printed increases, and dots stand out. So by changing the threshold value, as mentioned above, and by maintaining the size of the quantized pixel group 56a to be constant, dots are generated at a predetermined density. The position where the dot is generated in the quantized pixel group 56a generated in this way is the center of gravity of this pixel group 56a. Therefore output dots accurately matching the input distribution of the input image can be acquired, and a pleasant print output can be acquired.

With reference to FIGS. 12A, 12B, 12C, a variant form of providing the quantized data to a plurality of pixels will be described for one quantized pixel group 56a. Referring to FIG. 12A, the quantizing pixel group 56c is comprised of the pixels (n, m), (n+1, m), (n, m+1), (n+1, m+1) and (n+1, m+2). Here the total of the gradation image data values of each pixel of the quantizing pixel group 56c is 255 which reaches the threshold value (=255). So according to the above described embodiment, the quantized image data "255" is provided to the pixel (n+1, m+1), where the center of gravity 56d of the quantizing pixel group 56c positions (see FIG. 12B). In the case of this variant form, however, the quantized image data of 85=255/3 is provided to the pixels (n+1, m), (n, m+1) and (n+1, m+2), as shown in FIG. 12C). In this case, the center of gravity of these entire pixels, to which the quantized image data is provided, is the center of gravity of the rectangular equilateral triangle of which the vertexes are the center of the pixel (n+1, m), the center of the pixel (n, m+1) and the center of the pixel (n+1, m+2), and is located at the pixel (n+1, m+1). Also the total of the quantized pixel data of the pixels, to which the quantized image data is provided, is 85×3=255.

According to such a variant form as well, the entire pixels, to which the quantized image data is provided, match the density distribution of the gradation image data of the quantized pixel group 56a, and quantization error is not generated. Even if the quantized data is provided to a plurality of pixels in this way, printing is possible by using the pulse width modulation section 68.

It is also possible that the center of gravity already determined by the quantized pixel group 56a and the pixel positioned at the center of gravity currently determined by the quantized pixel group 56a match. FIG. 13 shows this example. As FIG. 13 shows, the quantized pixel group 56a is comprised of 20 peripheral pixels outside the five pixels (n+2, m+1), (n+1, m+2), (n+2, m+2), (n+3, m+2) and (n+2, m+3), and the pixel (n+2, m+2), which positions at the center of gravity of the pixel group 56a matches the pixel (n+2, m+2), which positions at the center of gravity of the quantized pixel group 56a, which is comprised of the five pixels. This is because if the quantized pixel group 56a is created using the final remaining pixels in the stage of constituting the quantized pixel group 56a (in the case of the example in FIG. 13, the pixel group comprised of the 20 peripheral pixels), the center of gravity may match the center of gravity of the quantized pixel group of which the center of gravity has already been computed (in the case of the example in FIG. 13, the pixel group of five pixels which position almost at the center). In such a case, a dot is created at the position which is closest to the position of the pixel where a dot has already been created and where a dot has not yet been created. In the case of the example in FIG. 13, a dot is created at the position of (n+2, m+2) by the five pixels which exist almost at the center, so "255" is provided to a position which is closest to the position of the center of gravity (n+2, m+2) of the 20 peripheral pixels, and where a dot has not yet been created, such as (n+3, m+2), (n+2, m+1), (n+1, m+2) or (n+2, m+3). It is possible not to create a dot at all, but creating a dot in this way is preferable in order to acquire dot distribution which accurately matches the input gradation values.

Figure 14:
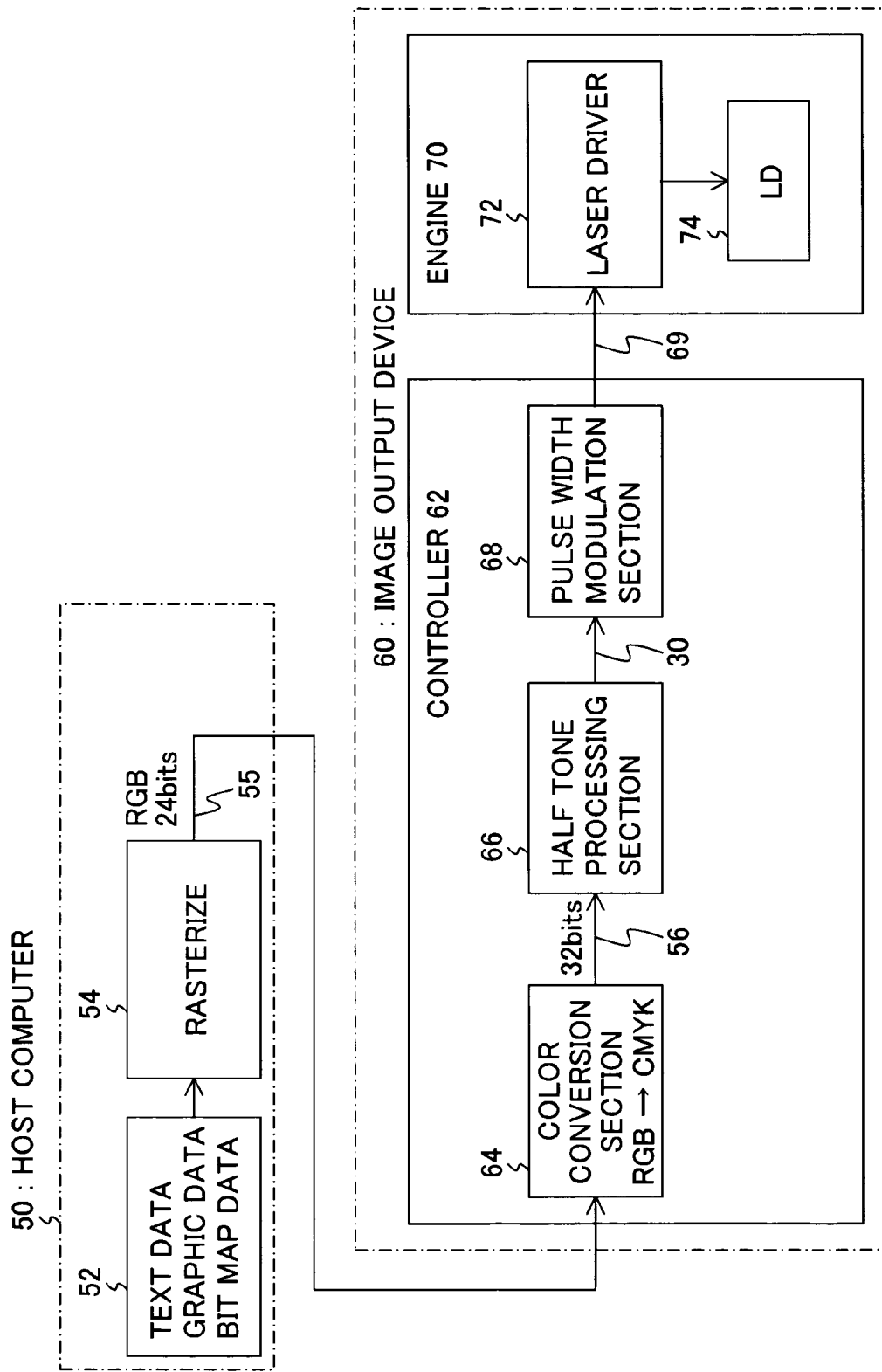
FIG. 14 is a block diagram when the image output system according to the present invention is applied to a color input image.

So far, the embodiments of the present invention have been described assuming that the image output system according to the present invention is applied to a monochrome input image. However the image output system according to the present invention may be applied to a color input image. FIG. 14 is a block diagram when the image output system according to the present invention is applied to a color input image.

In this example, the RGB color image data 55 is generated in a host computer 50, and is sent to such an image output device 60 as a page printer. The image output device 60, such as a page printer, reproduces the color image based on the supplied RGB color image data 55. The image output device 60 is comprised of a controller 62, which executes image processing and supplies laser driving data 69 to the engine 70, and the engine 70, which regenerates the image according to the laser driving data 69.

The host computer 50 generates text data, graphic data and bit map data using such application programs 52 as a word processor and graphic tools. Each data generated by these application programs 52 is rasterized by the driver for the image output device 54 which is installed on the host computer 50, and is converted into RGB color image data 55 which is comprised of pixels or RGB data for each dot. The RGB color image data 55 is, for example, an aggregate of RGB data where each color (red, green, blue) in each pixel is indicated by an 8-bit value, that is 0 to 255, respectively.

The image output device 60 has a microprocessor, which is not illustrated, and a controller 62, which is comprised of a color conversion section 64, a half tone processing section 66, and a pulse width modulation section 68 is implemented by the microprocessor and an installed control program.

The color conversion section 64 receives the RGB color image data 55, and generates a total 8×4=32 bits of gradation image data 56, where four colors, C (cyan), M (magenta), Y (yellow) and K (black) are represented by 8-bits respectively. The gradation image data 56 is the same as shown in FIG. 3A, 3B, 3C, for example. In each pixel, the density of one color out of C (cyan), M (magenta), Y (yellow) and K (black), instead of the density of black, is recorded. If the density of such a color as cyan is too high, it is converted into white density, which is the same as the case of a monochrome image.

The half tone processing section 66 receives the gradation image data 56 and generates the quantized image data 30. The configuration of the half tone processing section 66 (corresponds to the image processing device shown in FIG. 2) is as described above. The quantized image data 30 is provided to the pulse width modulation section 68. The pulse width modulation section 68 generates the driving data 69, which is information on whether a laser driving pulse exists or not for each dot.

The laser driver 72 in the engine 70 drives the laser diode for image drawing 74 based on the driving data 69. The engine 70 includes a photosensitive drum, transfer belt and driving section thereof, which are omitted in FIG. 14.

The half tone processing section 66 (corresponds to the image processing device shown in FIG. 2) may be constructed such that the half tone processing program is executed by the image output device 60. This half tone processing program is normally distributed by being recorded on such a recording medium as a floppy (registered trademark) disk and CD-ROM in a format which allows the image output device 60 to read. This program is read by the medium reading device (e.g. CD-ROM drive, floppy (registered trademark) disk drive), and is installed on the hard disk. And the CPU reads the desired program from the hard disk when necessary and executes the desired processing. The image output device 60 may have such a recording medium as a ROM, so that the half tone processing program is recorded in the ROM.

In the above example, when the initial pixels are searched by initial scanning, the pixel at the most left in the highest row in the scanning direction, out of the unprocessed pixels excluding the quantized pixel group 56a, is the scanning target and the selection target. In FIG. 5D, for example, the quantized pixel group 56a is created with the initial pixel as the pixel (n, m), then initial scanning is performed and the quantized pixel group 56a is created with the initial pixel as the pixel (n+2, m). By repeating this sequentially, the plurality of quantized pixel groups 56a shown in FIG. 15A is finally created in one image.

Figure 15A:
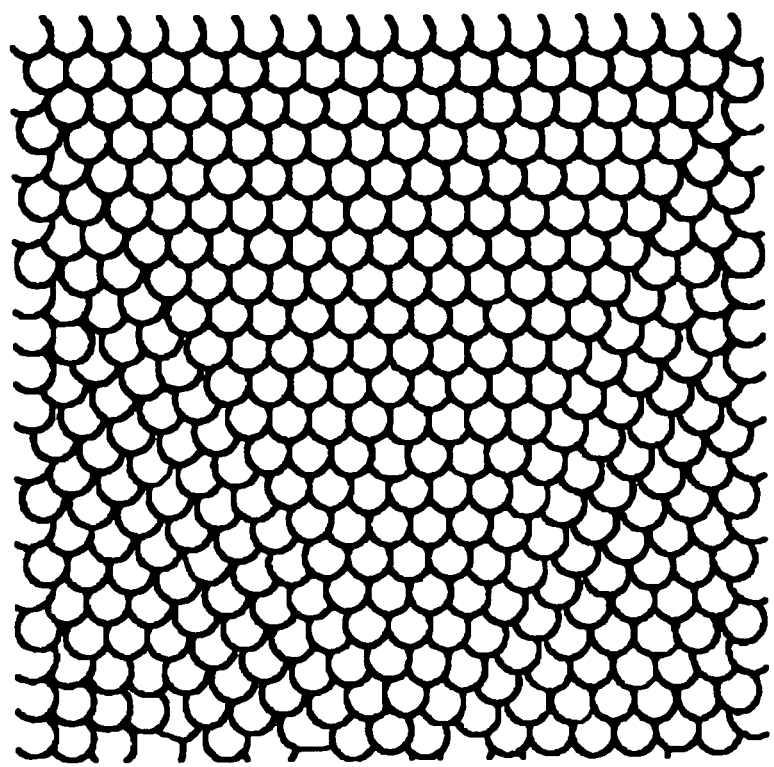
FIG. 15A, 15B depicts an example when the initial pixel is searched in the main scanning direction.

As FIG. 15A shows, the plurality of quantized pixel groups 56a positioned at the highest row and the plurality of quantized pixel groups 56a positioned at the row below are arranged with a shift. And the quantized pixel group 56a positioned at the row below that are also arranged with a shift. This is because when a quantized pixel group 56a is created to be a circular shape, and a pixel positioned at the most left in the highest row is selected among the unprocessed pixels, it is highly possible that the initial pixel is selected between the adjacent quantized pixel groups 56a (gap between circles) in one row.

Figure 15B:
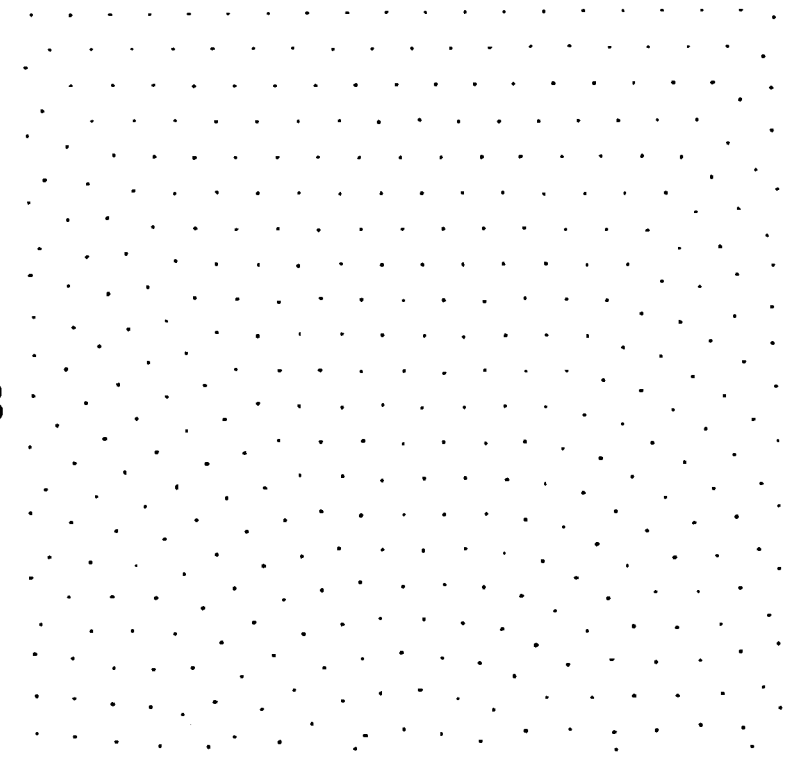

If a dot is generated in the center of gravity of the quantized pixel group 56a created as above, dots are created as shown in FIG. 15B. In this way, a dot of the next row is generated at the mid-position of the dots in the above row. By this, dots look as if they are generated diagonally, and since the diagonal direction is difficult to recognize by human sight, a visually pleasant print output can be acquired.

Now the case of selecting initial pixels in initial scanning by searching in the diagonal direction sequentially will be considered. For example, the case when the quantized pixel group 56a is created as shown in FIG. 5C will be described. To search in the diagonal direction sequentially, the pixels are searched sequentially from the initial pixel (n, m) to the lower left with respect to the scanning direction, and when eventually the pixels to be scanned run out, this process is repeated by sequentially searching the lower left pixel with the very last unprocessed pixel in the highest row (first row) as the reference. If there is no unprocessed pixel in the first row, this process is repeated by sequentially searching the lower left pixel with the unprocessed pixel at the highest position in the right end (last pixel in right row) of the image as the reference. If an already searched pixel is incorporated into the quantized pixel group 56a, this pixel is excluded. In the case of FIG. 5C, applicable pixels do not exist if the lower left pixels are searched from the pixel (n, m), so the pixel (n+1, m) at the right of the pixel (n, m) is searched. This has already been incorporated into the quantized pixel group 56a, so this pixel is excluded, and the pixel (n, m+1) at the lower left of this pixel is searched. Since this is also incorporated into the quantized pixel group 56a, the next pixel at the lower left is searched, and if applicable pixels do not exist, the pixel (n+2, m) is searched, and since this pixel is not incorporated into the quantized pixel group 56a, a quantized pixel group 56a is created with this pixel as the initial pixel.

Figure 16A:
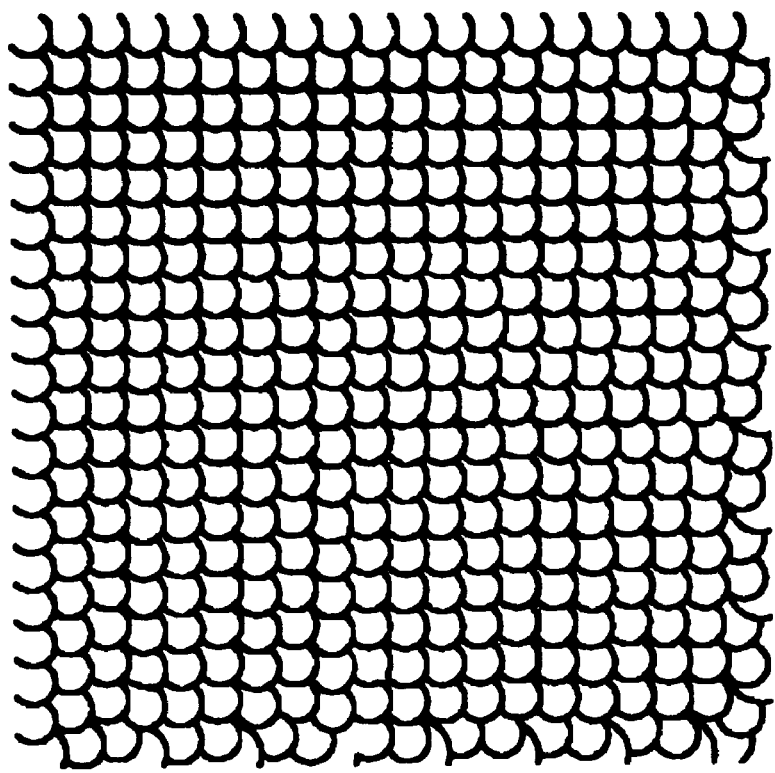
FIG. 16A, 16B depicts an example when the initial pixel is searched in the diagonal direction.
Figure 16B:
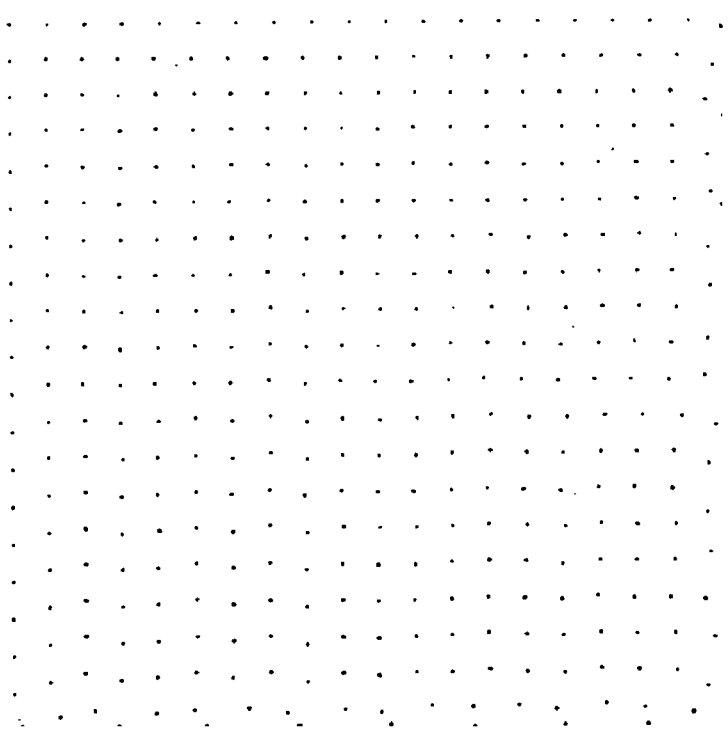

Repeating this, the quantized pixel groups 56a, finally acquired in one image, are created as shown in FIG. 16A. The circular quantized pixel groups 56a, with a predetermined size, are created in the diagonal direction. If a dot is generated at the center of gravity position of a quantized pixel group, however, dots are arranged roughly in a straight line in each row and each column, as shown in FIG. 16B. Such a dot creation is not really a pleasant print output since dots are more visually outstanding compared with FIG. 15B.

Therefore an unprocessed pixel positioned at the very left in the highest row is searched, then a pleasant print output can be acquired. Certainly another method may be used only if the initial pixel is searched by executing initial scanning in the scanning direction. Also the same exact effect can be acquired if the initial scanning is executed in the sub-scanning direction. In such a case, the unprocessed pixel positioned at the highest in the far left column, for example, is selected.

Second Embodiment

The second embodiment of the present invention will now be described with reference to FIG. 17 to FIG. 29.

Figure 17:
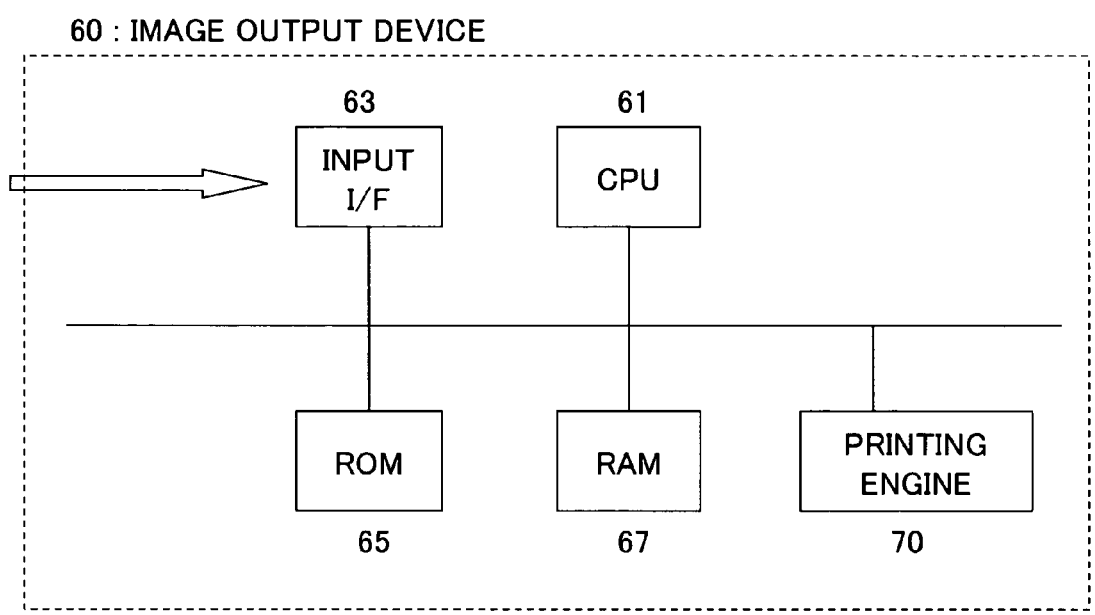
FIG. 17 depicts an example of a block diagram of an image output device to which the present invention is applied.

FIG. 17 is a block diagram depicting the hardware of the image output device 60 to which the present invention is applied. The image output device 60 is comprised of the CPU 61, input interface (input I/F) 63, ROM 65, RAM 67 and printing engine 70. In correspondence with FIG. 1, the half tone processing section 66 is comprised of the CPU 61, input I/F 63, ROM 65 and RAM 67, and the pulse modulation section 68 is comprised of the CPU 61, ROM 65 and RAM 67. The engine 70 corresponds to the printing engine 70.

The CPU 61 is inter-connected with the input I/F 63, ROM 65, RAM 67 and printing engine 70 via the internal bus, for executing various processing including computing the center of gravity position and selecting unprocessed pixels. Details will be described later.

The input I/F 63 plays a role as an interface between the host computer 50 and the image output device 60, and in the present embodiment, the rasterized input data which has a predetermined gradation value for each pixel, which is output from the host computer, is input. The image data which is input is stored once in the RAM 67 according to the control of the CPU 61.

The ROM 65 stores various programs. According to the control of the CPU 61, the program is read and various processing is executed.

The RAM 67 plays a role of working memory when the CPU 61 executes processing, and temporarily stores the execution data.

The printing engine 70 has the same configuration as the engine 70 in FIG. 1, and is comprised of the laser driver 72 and the LD 74.

Now the operation of the image output device 60, up to creating dots from the image data which was input, will be described with reference to FIG. 16 to FIG. 26.

Figure 20A:
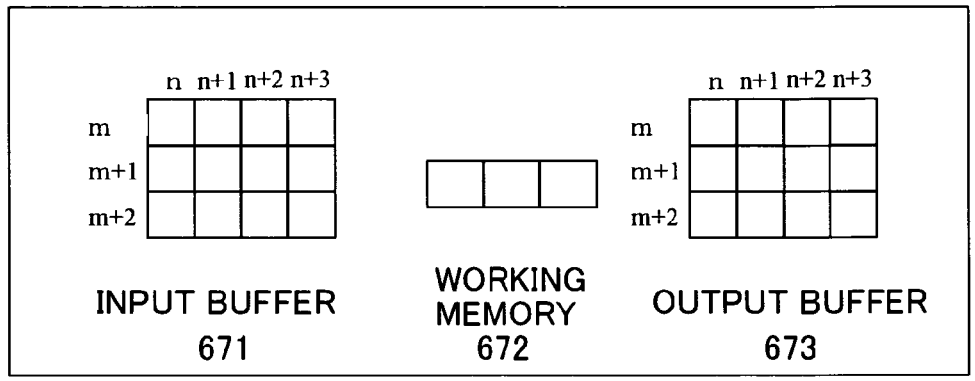
FIGS. 20A, 20B, 20C are diagrams depicting examples of the configuration of the RAM 67 and the values to be stored.

At first, the CPU 61 reads the program stored in the ROM 65, and starts processing (step S40). At this time, the input image data has already been stored in the RAM 67 via the input I/F 63. Of course, the input image data may be loaded from the host computer 50 to the RAM 67 via the input I/F 63 with the start of this processing as a trigger. In this case, the input image data is stored in an input buffer area, which is a predetermined area of the RAM 67. FIG. 20A shows this example.

Figure 20B:
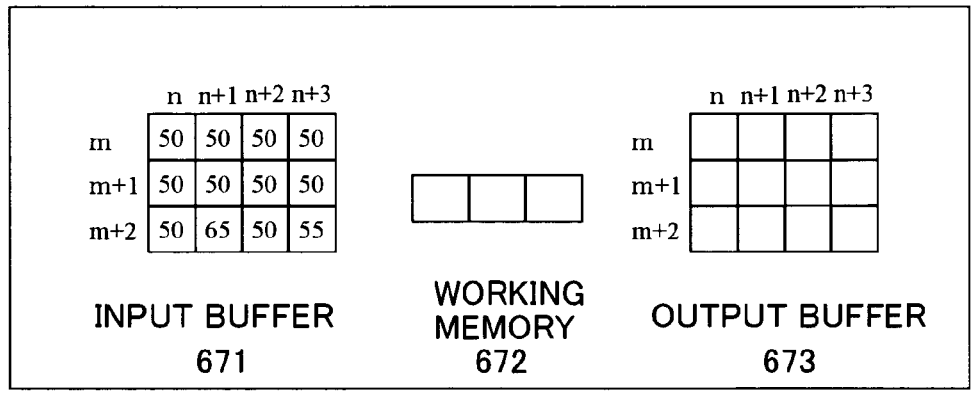

As FIG. 20A shows, the RAM 67 is comprised of an input buffer area 671, working memory area 672, and output buffer area 673. The input buffer area 671 has a two-dimensional structure, where the pixel positioned at the above mentioned input pixel (n, m), for example, is stored in the address (n, m) in the input buffer area. The input buffer area 671 is constructed so as to match the positions of the input pixels. Actually, the gradation value of the input image data is stored in this address. When the input pixels shown in FIG. 5A or FIG. 8A are input, each gradation value is stored in the input buffer 671, as shown in FIG. 20B. The working memory area 672 stores the result of computing the center of gravity position and the result of computing the gradation value, and the output buffer area 673 is constructed so as to match the input pixels, just like the case of the input buffer 671. Details will be described later.

Then the CPU 61 determines the initial pixel and computes the initial density center of gravity (step S41). To determine the initial pixel, the CPU 61 selects a pixel positioned at the left of the highest position of the input pixels, just like the first embodiment, out of the input image data stored in the input buffer 671 of the RAM 67. In other words, in the case of the example shown in FIG. 20B, the CPU 61 determines the pixel positioned at a position corresponding to (n, m) as the initial pixel. And the CPU 61 reads the gradation value of the pixel where the initial pixel locates and the address positions thereof, and computes the center of gravity. Herein below it is assumed that (n, m)=(0, 0) to simplify the explanation. The CPU 61 computes the center of gravity using the following formula.

$$x_{center\ of\ gravity} = \{\{(x\text{ coordinate of the center of gravity of the quantizing pixel group}) \times (\text{total of gradation values of the quantizing pixel group})\} + \{(x\text{ coordinate of the selected unprocessed pixel}) \times (\text{gradation value of the selected unprocessed pixel})\} / (\text{total of gradation values of the quantizing pixel group+gradation value of the selected unprocessed pixel})\quad\text{(Formula 1)}$$

$$y_{center\ of\ gravity} = \{\{(y\text{ coordinate of the center of gravity of the quantizing pixel group}) \times (\text{total of gradation values of the quantizing pixel group})\} + \{(y\text{ coordinate of selected unprocessed pixel}) \times (\text{gradation value of the selected unprocessed pixel})\} / (\text{total of gradation values of quantizing pixel group+gradation value of the selected unprocessed pixel})$$

($x_{center\ of\ gravity}$ and $y_{center\ of\ gravity}$ are coordinates of the center of gravity position.)

This formula is stored in the ROM 65, and in step S41, the CPU 61 reads this formula and computes. In the case of the initial pixel, the x and y coordinates of the center of gravity of the quantizing pixel group and the gradation value of the center of gravity of the quantizing pixel group are both assumed to be "0" for computing. If these values and the position and gradation value of the initial pixel which were read are substituted in (Formula 1), and computed, then the center of gravity position, that is ($x_{center\ of\ gravity}$, $y_{center\ of\ gravity}$) becomes (0, 0). The CPU 61 stores the computed center of gravity position and the gradation value of the initial pixel in the above mentioned working memory area 672 (see FIG. 20C). This is to make subsequent computing processing smooth.

The CPU 61 stores "−1" to the area of the input buffer 671 corresponding to the selected initial pixel. This is to prevent selecting an already selected pixel in the later mentioned selection of unprocessed pixels. When the initial pixel is judged as low density in step S41, the CPU 61 stores "0" to the area of the output buffer 273 corresponding to the initial pixel at this point, and when the initial pixel is judged as high density in step S42, the CPU 61 stores "255" to the area of the output buffer 273 corresponding to the initial pixel at this point. This is to perform correct output when a dot (black or white) is not generated in the initial pixel. That is, to execute processing to generate a dot in this pixel. "−1" is stored in the input buffer 671, but this is not limited since another negative value may be used. Also whether the selected pixel has been processed may be judged by preparing a memory area having a configuration the same as the input buffer 671 and setting a flag at a position corresponding to a selected pixel.

Then the CPU 61 judges whether the determined pixel is low density (step S42). Specifically, the CPU 61 reads the threshold value "127" stored in the ROM 65, compares this threshold value with the gradation value of the initial pixel read from the input buffer 671 of the RAM 67, and the processing moves to step S43 if the gradation value is lower than the threshold value, and moves to step S53 if the gradation value is either the same as or greater than the threshold value. The case when the determined pixel is judged as low density (Yes in step S42) is the case when the selected pixel has low black components and high white components. This step is performed for moving to the processing for generating black dots in a later processing. If it is judged that the determined pixel is not low density, on the other hand (NO in step S42), the selected pixel has high black components and low white components, so the processing moves to processing for generating white dots (step S53) in a later processing.

When it is judged that the determined pixel is low density in step S42 (YES in step S42), the CPU 61 selects an unprocessed pixel (step S43). Here an unprocessed pixel is selected using the center of gravity, as described in the first embodiment. Since the pixels are selected using the center of gravity, as mentioned above, the shape of the quantized pixel group, which is finally generated, becomes circular, and by generating a dot at the center of gravity thereof, the distance between dots becomes uniform and a visually pleasant print output can be acquired. For this selection of an unprocessed pixel, a pixel which is closest to the center of gravity, computed in step S41, is selected, but the input image data is stored in a predetermined position of the input buffer of the RAM 67, so either the image in address (1, 0) or the image data in address (0, 1) is selected. This is because both of these two pixels are at an equal distance from the address (0, 0). One pixel must be selected, and in this case, the CPU 61 selects one at random, just like the first embodiment. If a pixel is selected not at random by in a fixing sequence, the shapes of the quantized pixel groups are arranged in a regular pattern, and if a dot is created at the position of the center of gravity, the periodic pattern shown in FIG. 4B is generated. By selecting a pixel at random, a visually pleasant print output can be acquired. If the CPU 61 selects the pixel (1, 0) here, the pixel next to the selected pixel is incorporated into the quantizing pixel group 56c along with the initial pixel as shown in FIG. 8B.

In this case, the center of gravity position does not always become an integer, as the above mentioned (Formula 1) shows. So a pixel closest to the center of gravity may be selected, or a pixel closest to the pixel where the center of gravity positions may be selected. By doing this, the position of the center of gravity can be computed as an integer, which can decrease the calculation volume to be processed by the CPU 61. If the computed center of gravity position includes a decimal point, 0.5 may be added to the x and y coordinate values of the center of gravity position respectively, so that a pixel where the center of gravity positions at this position can be selected.

Figure 20C:
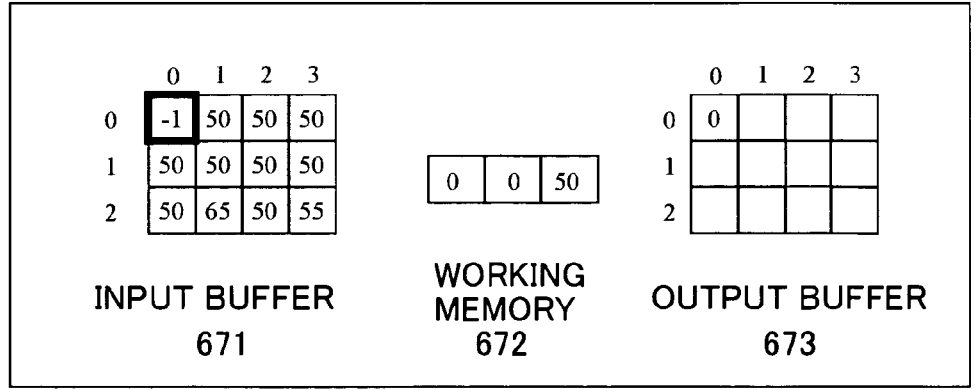
Figure 21A:
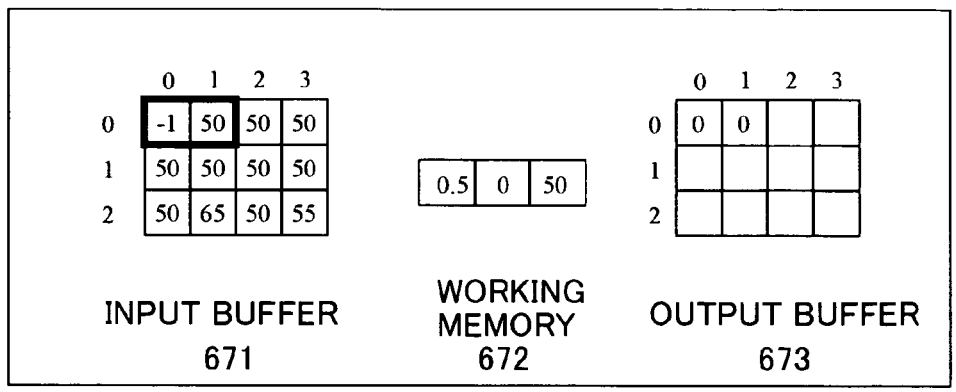
FIGS. 21A, 21B, 21C are diagrams depicting examples of the configuration of the RAM 67 and the values to be stored.

For the selected pixel, the CPU 21 stores "0" in a corresponding area of the output buffer 673 of the RAM 67, as shown in FIG. 20C and FIG. 21A.

Then the CPU 61 executes threshold value control processing (step S44). In the case when the threshold value is a constant, which will be described later, the density of the output dots becomes low in an area where the gradation value of the input image data is low, and the density of the output dots becomes high in an area where the gradation value is an intermediate value (e.g. "120"), therefore dot distribution density does not become a constant in the entire print output. In the print output, many dots are generated in some areas and few dots are generated in other areas, and a pleasant print output cannot be acquired throughout the entire image. So by changing the threshold value, the size of a quantized pixel group 56a, that is the number of pixels constituting a quantized pixel group 56a becomes constant, and dot distribution with a constant density can be acquired. In the above example, only two pixels, pixel (0, 0) and pixel (1, 0), are selected, so the threshold value is not changed, and the CPU 61 moves to the next processing. The processing in the case of changing the threshold value will be described later.

Then the CPU 61 judges whether the total of the density reached the threshold value (step S45). In other words, it is judged that the total of density, including the gradation values of the selected unprocessed pixels (total of gradation values), reached the threshold value "255". Specifically the CPU 61 reads the gradation value of the pixel written in the working memory 672 of the RAM 67 and the gradation value stored in the input buffer 671 of the pixel selected in step S43, computes the total thereof and compares with the threshold value stored in the ROM 65 (in this case value "255"). In the case of the example in FIG. 20C, for example, the gradation value stored in the working memory 672 is "50" and the gradation value stored in the address (1, 0) is "50", so the total thereof is "100". This means that the total does not reach the threshold value.

When the total of the gradation values does not exceed the threshold value (No in step S45), the CPU 61 computes the center of gravity including the selected unprocessed pixel (step S46). Specifically the CPU 61 computes it using the above mentioned (Formula 1). If the previously determined x and y coordinates of the center of gravity is (0, 0) and the gradation value of the center of gravity is "50", and the x and y coordinates of the unprocessed pixel is (1, 0) and the gradation value thereof is "50", then the center of gravity position to be computed is (0.5, 0). The center of gravity position computed in step S46 is stored in the working memory 672 of the RAM 67 according to the control of the CPU 61. In step S41, the center of gravity position of the initial pixel is stored in the working memory 672, but here the center of gravity position computed in step S41 is overwritten and stored. FIG. 21A shows an example after this storing.

Figure 21B:
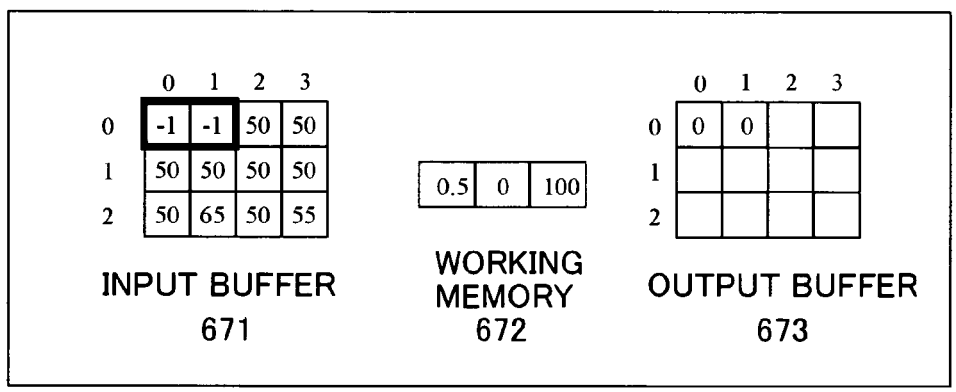

Then the CPU 61 computes the gradation value (step S47). Here the total of the gradation value written in the working memory 672 of the RAM 67 and the gradation value of the pixel selected in step S43 is computed. The computed result is again overwritten in the working memory 672 of the RAM 67. FIG. 21B shows an example.

Here the CPU 61 stores "−1" in the area of the input buffer 671 corresponding to the pixels selected in the selection of the unprocessed pixels (step S43). This is to prevent these pixels from being selected again when unprocessed pixels are selected. This processing is performed when the gradation value is computed because the gradation values stored in the input buffer 671 are stored in the working memory 672 as the total value thereof, and are not required for subsequent processing.

Then the CPU 61 judges whether the total of the gradation values computed in step S46 is equal to the threshold value (step S48). Specifically the CPU 61 reads the gradation value stored in the working memory 672 of the RAM 67 in step S47 and the threshold value stored in the ROM 65, and compares them. In the case of FIG. 21B, the total of gradation values does not reach the threshold value (No in step S48), so the unprocessed pixels are sequentially incorporated into the quantizing pixel group 56c, just like the first embodiment, and processing is repeated until the total value reaches the threshold value ("255" in this case). In other words, the total of gradation values of the pixels which have been incorporated into the quantizing pixel group 56c thus far is stored in the working memory 672 of the RAM 67, so by comparing this value with the threshold value, the quantizing pixel group 56c continues to be constructed until the total of gradation values reaches the threshold value. As described above, the CPU 21 stores "0" in the position of the output buffer 673 corresponding to the selected unprocessed pixel.

When the CPU 61 judges that the total is equal to the threshold value (Yes in step S48), processing moves to step S49, and the CPU 61 performs processing for creating a black dot in a pixel positioned in the already computed the center of gravity position. Specifically "255" is written in an address position corresponding to the position of the input pixel in the output buffer 673 of the RAM 67. The structure of the output buffer is a two-dimensional structure, just like the input buffer, and has an address space corresponding to the positions of the input pixels. When "255" is written in the address where the center of gravity positions, the dot can be actually generated at a position corresponding to that position thereafter.

The CPU 61 judges whether there is an unprocessed pixel (step S51). In other words, the CPU 61 judges whether the above mentioned processing was executed for all the gradation values written in the input buffer 671 of the RAM 67, and if there is an unprocessed pixel (in the case of Yes), processing moves to step S41 again, the above mentioned processing is repeated, and if processing has been ended for all the pixels (No), the CPU 61 moves to step S52 and processing ends (step S52).

Figure 21C:
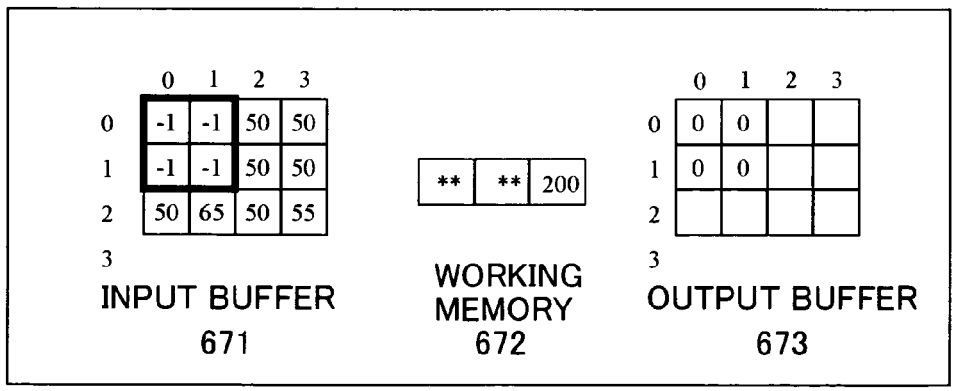
Figure 23:
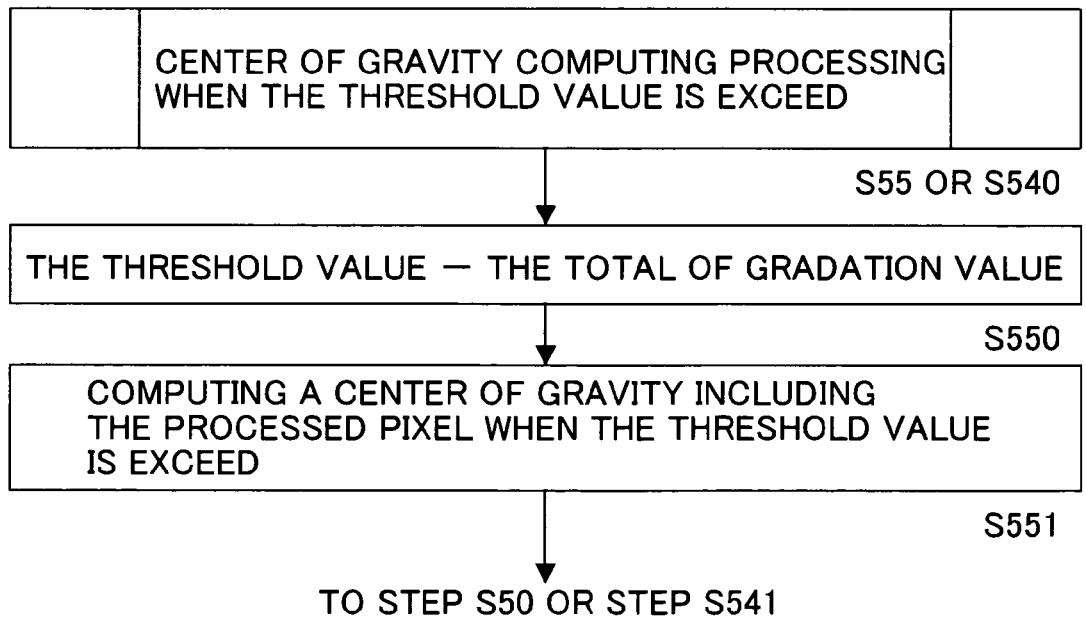
FIG. 23 is a flow chart depicting the operation of the center of gravity computing processing when the threshold value is exceeded.
Figure 24:
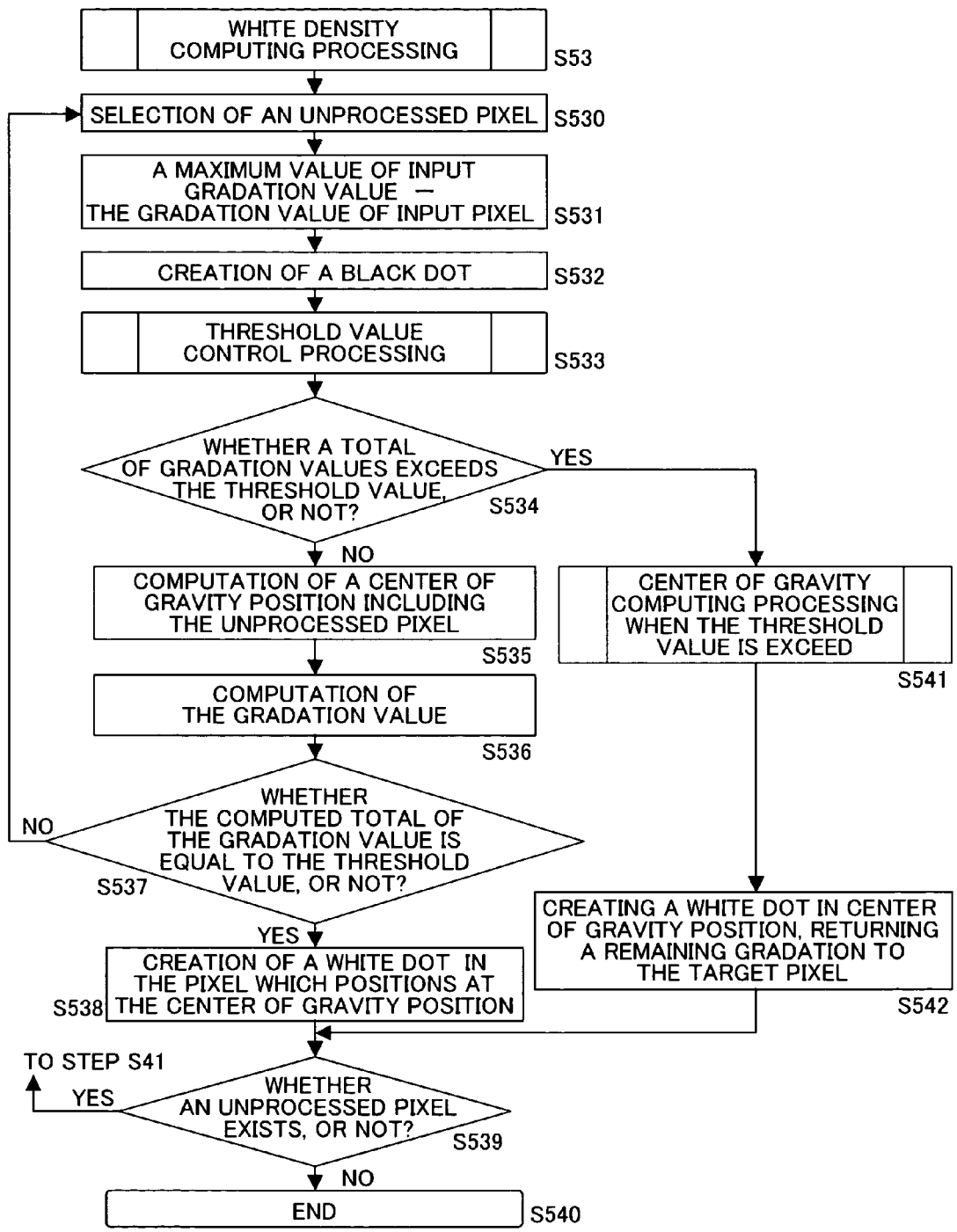
FIG. 24 is a flow chart depicting the operation of white density computing processing.
Figure 25A:
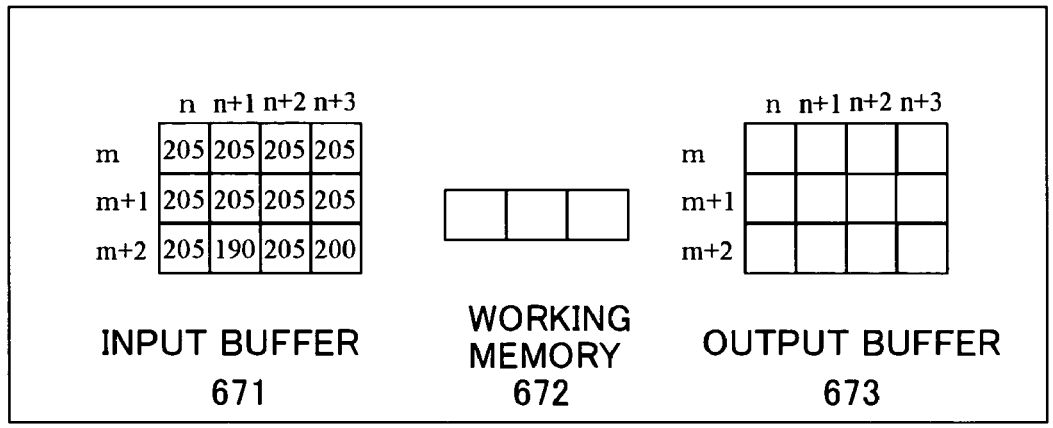
FIGS. 25A, 25B, 25C are diagrams depicting examples of the configuration of the RAM 67 and the values to be stored.
Figure 25B:
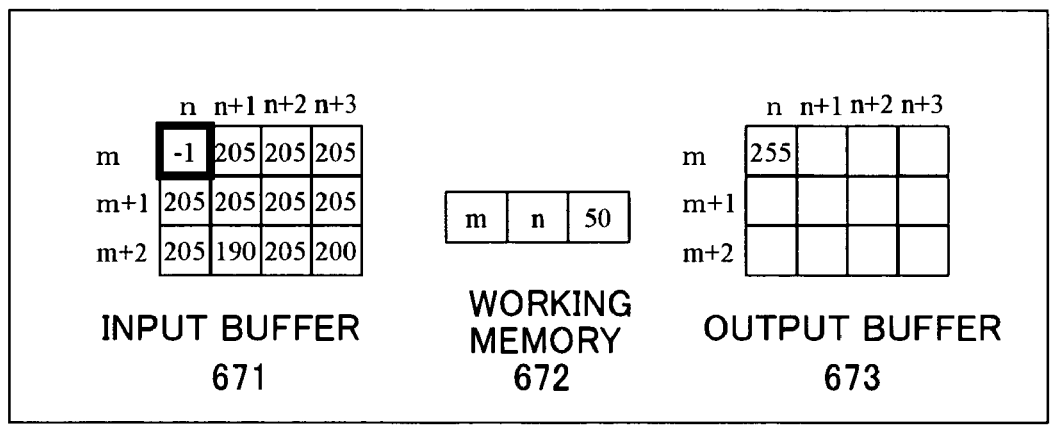
Figure 25C:
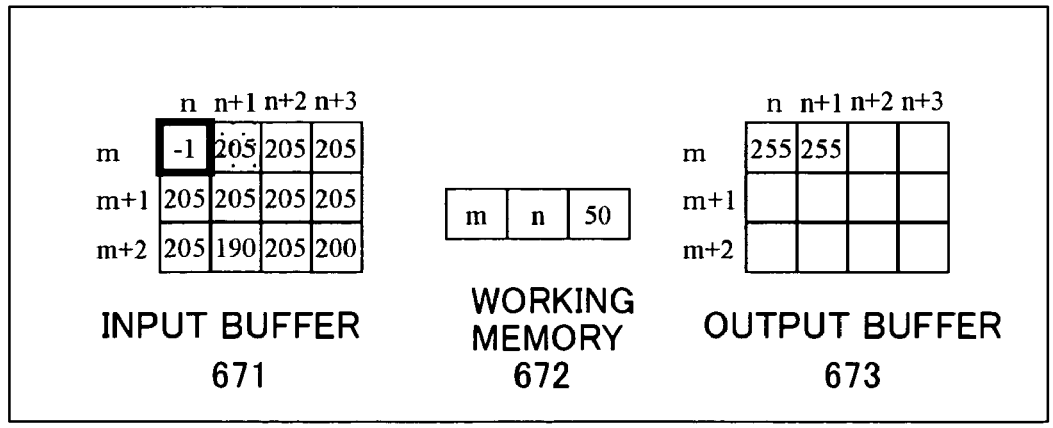

If the total of density exceeds the threshold value in step S45 (in the case of No), processing moves to step S55 and the center of gravity computing processing, if the threshold value is exceeded, is executed (step S55). As FIG. 21C shows, when the finally selected pixel is a pixel positioned at (1, 2), that is when the pixel selected in step S43 is this pixel, the total of the gradation values of the quantizing pixel group is "265", which exceeds the threshold value "255". Therefore in this case, "Yes" is selected in step S45, and processing moves to step S55. FIG. 23 shows the operation of the center of gravity computing processing when the total of the gradation values exceeded the threshold value.

At first, the CPU 61 subtracts the total of density, that is the total of the gradation values computed in step S46 thus far, from the threshold value (step S550). For example, in the case of the example in FIG. 5B, the threshold value is "255" and the total of the gradation. values computed in step S46 thus far is "200", so the CPU 61 computes 255−200=55. As described above, the total of the gradation values of the pixels selected thus far is stored in the working memory 672 of the RAM 67, and the threshold value is stored in the ROM 65, so the CPU 61 reads these values and computes.

And the CPU 61 computes the center of gravity using the value "55" as the gradation value of the pixel (1, 2) (Step S551). Specifically the CPU 61 computes the center of gravity using the following formula.

$$x_{center\ of\ gravity} = \{\{(x \text{ coordinate of the center of gravity of the quantizing pixel group}) \times (\text{total of gradation values of the quantizing pixel group})\} + \{(x \text{ coordinate of selected unprocessed pixel}) \times (\text{computed value in step S550})\}\} / \{(\text{total of gradation values of the quantizing pixel group}) + \text{computed value in step S550}\}$$

(Formula 2)

$$y_{center\ of\ gravity} = \{\{(y\ \text{coordinate of the center of gravity} \\ \text{of the quantizing pixel group}) \times (\text{total of gradation} \\ \text{values of the quantizing pixel group})\} + \{(y\ \text{coor-} \\ \text{dinate of selected unprocessed pixel}) \times (\text{computed} \\ \text{value in step S550})\}\} / \{(\text{total of gradation values} \\ \text{of the quantizing pixel group}) + \text{computed value in} \\ \text{step S550}\}$$

($x_{center\ of\ gravity}$ and $y_{center\ of\ gravity}$ are coordinates of the center of gravity position.)

Figure 22A:
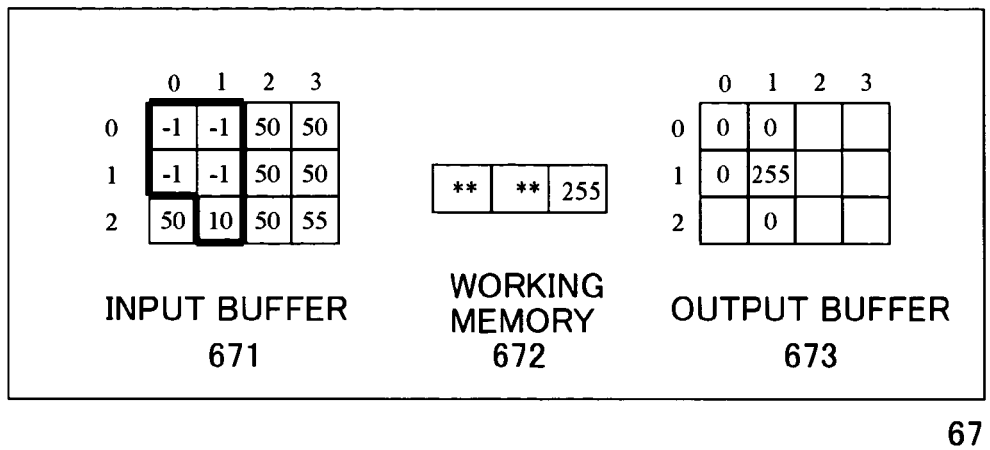
FIG. 22A is diagram depicting examples of the configuration of the RAM 67 and the values to be stored.

The difference from (Formula 1) is that the gradation value of the selected unprocessed pixel is not used as is, but a gradation value with which the total of the gradation values of the quantized pixel group 56c becomes the same as the threshold value is used. This formula has been stored in the ROM 65 in advance, just like the case of (Formula 1), and is executed by being read from the ROM 65 when the CPU 61 executes this step. Here the gradation value of the pixel finally selected in step S43 is computed by adding with the total of the gradation values computed thus far so as to be equal to the threshold value, and the position of the center of gravity is determined based on this. And the CPU 61 writes the computed center of gravity position in the working memory 672 of the RAM 67 again (see the working memory 672 in FIG. 22A). The CPU 61 subtracts the computed result computed in step S550 from the original gradation value of the finally selected pixel, and writes the value of this result in the area corresponding to the selected pixel in the input buffer again (step S50). By this, the gradation value of the pixel is stored in the return data. In the case of the example shown in FIG. 22A, "55", computed in step S550, is subtracted from the gradation value "65" of the finally selected pixel (1, 2), and writes the result "10" in the address (1, 2) of the input buffer 671 of the RAM 67 again (see the input buffer 671 in FIG. 22A). This pixel is not incorporated into the quantized pixel group 56a, but is incorporated into the quantizing pixel group in the initial scanning and is used for computing the center of gravity position. As mentioned above, the return data is not returned to a pixel other than the quantized pixel group 56a, but is stored again in the pixel where the return data generated, so that dot distribution accurately matching the input gradation value can be created. And the CPU 61 executes processing for generating a black dot at the center of gravity position determined using Formula 2. As mentioned above, this processing is executed by writing "255" in the address corresponding to the input pixel position in the output buffer. Then processing moves to step S51 and the above mentioned processing is repeated. The CPU 61 constructs the quantized pixel group 56a by setting the gradation value of the target pixel in the input buffer 671 to "0" (see the input buffer 671 in FIG. 22A). And the CPU 61 stores "255" in the address of the output buffer 673 corresponding to the pixel where the center of gravity position exists. By this, the CPU 61 can generate a dot in the pixel where the center of gravity position exists in subsequent processing. FIG. 22A shows this example.

If the pixel determined in step S42 is not low density (in the case of No), processing moves to white density processing (step S53). FIG. 22A shows the details of this processing. This processing is for generating white dots since the gradation values of the pixels have more black components than white components. In the following description, it is assumed that the data shown in FIG. 6A, 6B, 6C is input as the data of input pixels. In this case, it is assumed that the initial pixel positions at (n, m) in FIG. 6A, and the gradation values shown in FIG. 6A are stored in the input buffer 671 of the RAM 67 respectively (see FIG. 25A). It is also assumed that the position coordinates correspond to the address of the input buffer, just like the case of black density processing. It is assumed that the initial pixel is (n, m) based on step S41, which is the processing in the previous stage of white density processing, center of gravity position thereof is computed to be (n, m) using Formula 1, the position coordinates thereof have already been stored in the working memory 672 of the RAM 67, and the gradation value "205" thereof has also been stored in the memory 672. "−1" is also stored in the address of the input buffer 671 corresponding to the position of the initial pixel.

In the white density processing, the CPU 61 selects an unprocessed pixel (step S530). For the selection of unprocessed pixels in this case as well, the center of gravity is used just like the above mentioned step S43. This is to keep the distance between dots uniform. Since the initial pixel is (n, m), there are two closest pixels (n+1, m) and (n, m+1) if the center of gravity is used. The CPU 61 selects a pixel at random, just like step S43. This is to suppress the generation of periodic patterns in dots. Here it is assumed that the pixel (n+1, m) is selected. When the center of gravity is used for selecting an unprocessed pixel, a pixel closest to the pixel where the center of gravity positions may be selected, rather than using the center of gravity position itself, as mentioned above.

Then the CPU 61 subtracts the gradation value of the unprocessed pixel, selected in step S530 including the initial pixel, from the maximum value of the input gradation value (step S531). In the case of the example shown in FIG. 6A, the gradation value of the initial pixel positioned at (n, m) is "205", so this value is subtracted from the maximum value of the input gradation value "255", and the result is "50". If the unprocessed pixel selected in step S530 is (n+1, m), then the gradation value "205" thereof is subtracted from the maximum value "255", and the result "50" is acquired. This maximum value of the gradation value of the input pixel has been stored in the ROM 65, and the gradation value of the selected pixel has been stored in the input buffer 671 of the RAM 67, so the CPU 61 reads these values and computes. The computed result is stored in the working memory area 672 of the RAM 67 according to the control of the CPU 61 (see FIG. 25B).

Figure 18:
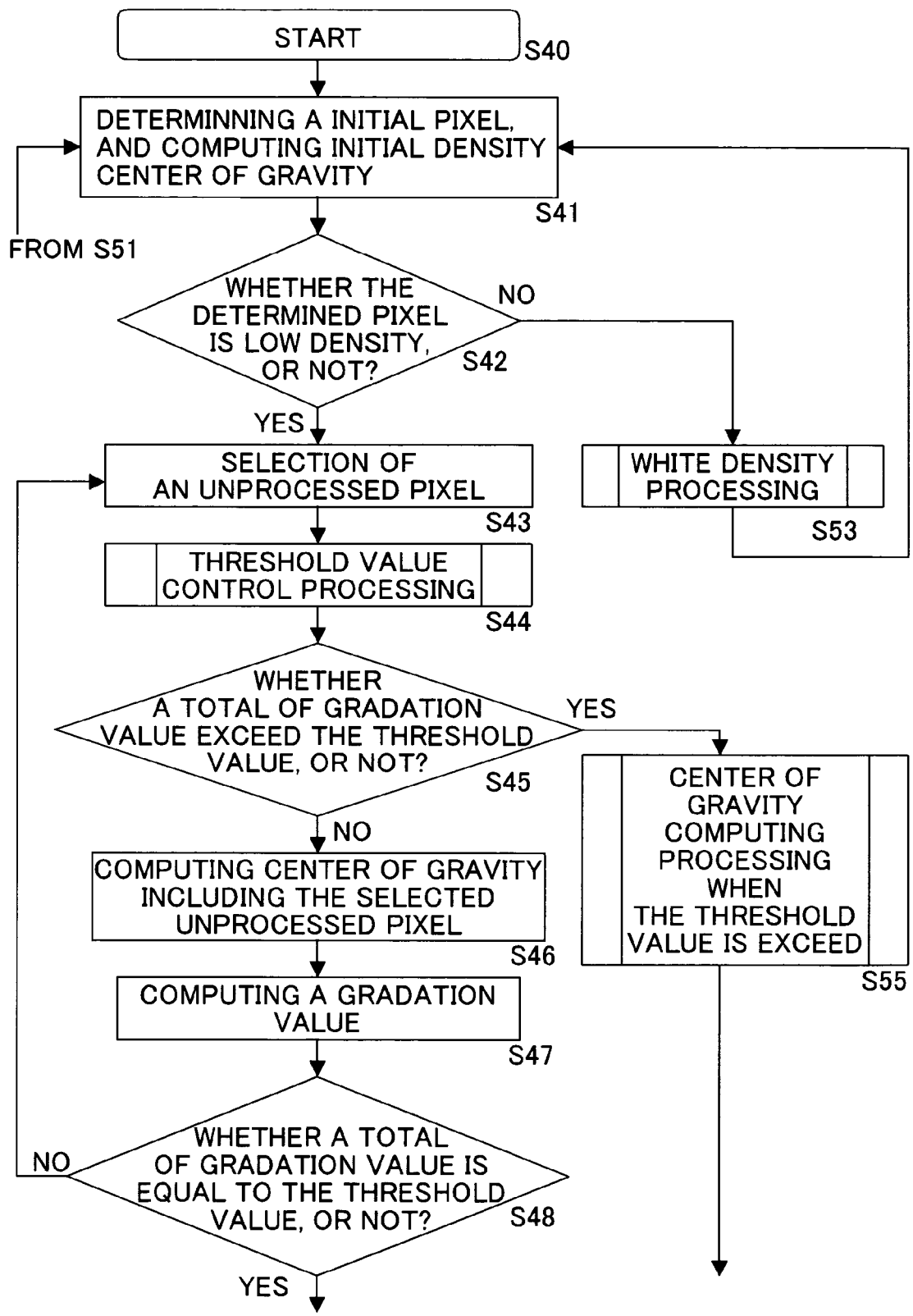
FIG. 18 is a flow chart depicting the operation of an embodiment of the present invention.
Figure 19:
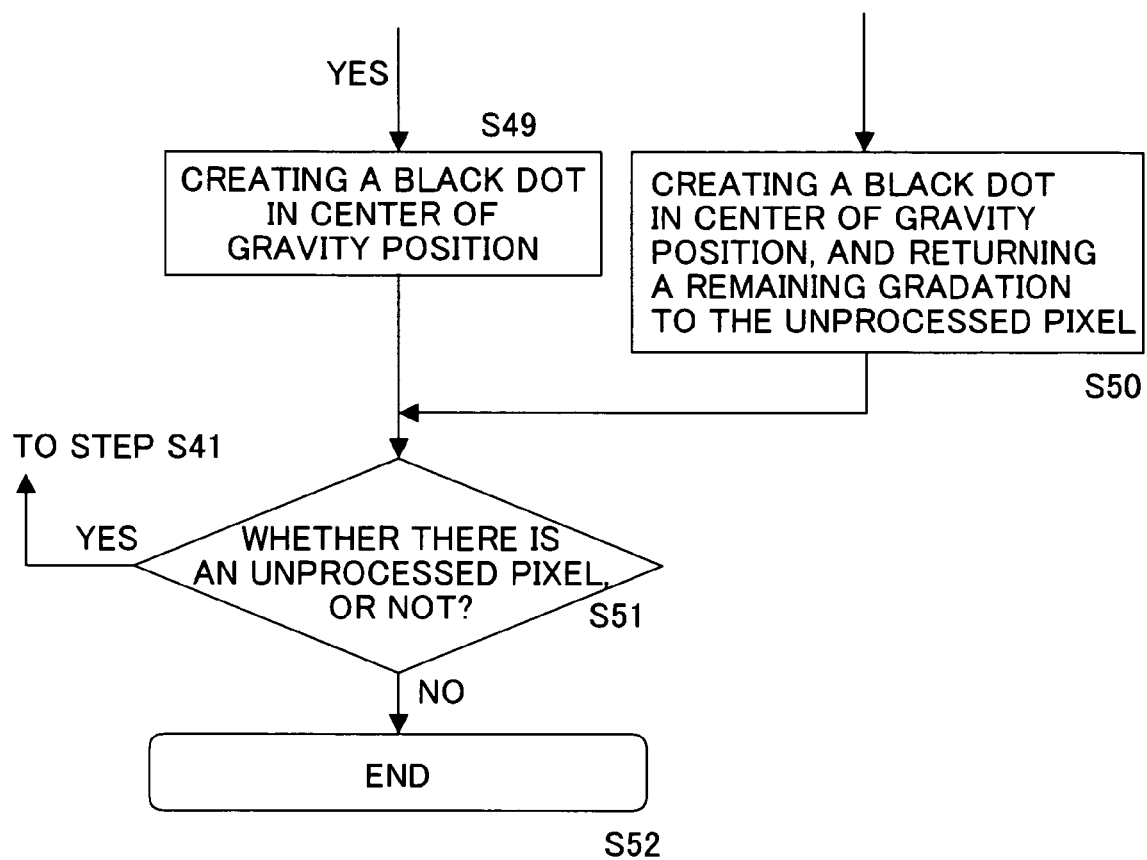
FIG. 19 is a flow chart depicting the operation of an embodiment of the present invention.

If processing similar to the case when the pixels are low density (step S43 to step S49) is performed for the pixel group which has high black components and low white components, without judging that pixels are low density or not in step S42 in the processing shown in FIG. 18, the following problem occurs. Since many pixels which have high black components exist, the quantizing pixel group quickly reaches the threshold value when the center of gravity position is determined from the quantizing pixel group from the initial pixel until reaching the threshold value. In the case of FIG. 6A, for example, the threshold value is reached when the two pixels ((n, m) and (n+1, m)) are searched. In this case, the pixel where the black dot is generated based on the center of gravity position is one of these two pixels (e.g. (n, m)). And the remaining return data is returned to (n+1, m), for example, and the quantizing pixel group including this pixel is searched again from the initial pixel (e.g. (n+1, m)), then the pixel to be selected using the center of gravity is (n+1, m), for example. If the gradation value of the initial pixel is added to this, a quantized pixel group is created by these two pixels, and a black dot is created at one of these pixels based on the center of gravity position. By repeating this, a black dot is generated at most of the pixels and a white dot is generated only when there is little remaining return data. With this, white dots created for the pixel group which has high black components and low white components are arranged in a worm shape, which is a problem of the error diffusion method, and the output result is visually unpleasant. Because of such a reason, different processing is performed depending on the white density and the black density judged in step S42.

Then the CPU 61 generates black dots (step S532). This is because the pixel selected in step S530 has high black components and low white components, and finally in the printing engine 70, a dot is generated for a pixel with high black components in the image data. And in the later mentioned white dot generation processing (step S537), image data is printed such that a dot is not generated for a pixel which is at the center of gravity position. For the pixels selected in step S530, the CPU 61 stores the maximum value of the input gradation value "255" in the case of FIG. 6A at the corresponding address position of the output buffer 673 of the RAM 67, as mentioned above (see FIGS. 25B and 25C).

Then the CPU 61 executes threshold value control processing (step S533). Just like the above mentioned step S44, white dots, which are generated with a predetermined size of the quantized pixel group 56a, are distributed at a predetermined density throughout the entire print output by changing the threshold value in an area where the input gradation value is low, including the selected unprocessed pixel (step S530). In the above mentioned example, only pixels positioned at (n, m) and (n+1, m) have been selected in this stage, so the threshold value is not changed. Details of the threshold value control processing will be described later.

Then the CPU 61 judges whether the total of the gradation values exceeds the threshold value (step S534). The total of the gradation values of the pixels selected thus far has already been stored in the working memory 672, so the CPU 61 reads the value from the memory 672, and compares with the threshold value read from the ROM 65 where the threshold value has been stored. In the case of the example in FIG. 25B, "50" is stored in the memory 672, so the CPU 61 compares it with the maximum value "255" and judges that the total has not yet reached the threshold value.

Figure 26A:
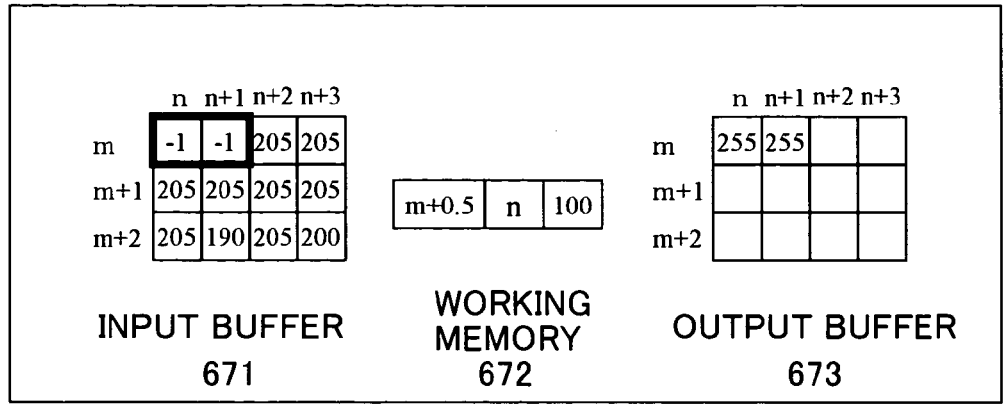
FIGS. 26A, 26B, 26C are diagrams depicting examples of the configuration of the RAM 67 and the values to be stored.
Figure 26B:
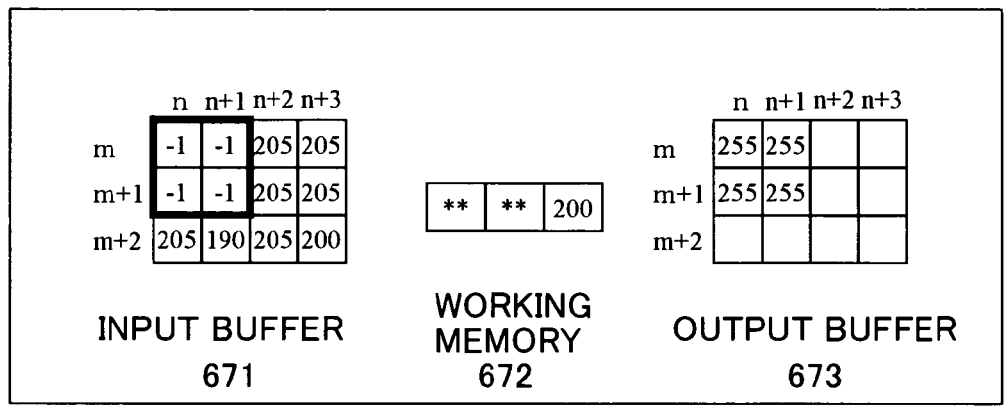

If the total does not exceed the threshold value (No in step S534), the processing moves to step S535, and the CPU 61 computes the center of gravity position including the unprocessed pixels. The computation of the center of gravity is the same as the above mentioned (Formula 1). The computed center of gravity position is stored in the working memory 672 according to the control of the CPU 61. When the center of gravity position of the initial pixel (n, m) and the selected pixel (n+1, m) is completed, it is (n+0.5, m) based on (Formula 1). This is stored in the working memory 672, just like the case of black component processing, according to the control of the CPU 61. FIG. 26A shows an example.

Then the CPU 61 computes the total of the gradation values (step S536). The total of the gradation value written in the input buffer 671 of the selected pixel and the gradation value written in the working memory 672 is computed. The computed result is stored in the working memory 672 according to the control of the CPU 61. Just like the above mentioned case of black component processing, the CPU 61 stores "-1" in the address of the input buffer 671 corresponding to the selected unprocessed pixel. This is to prevent this pixel from being selected as an unprocessed pixel in subsequent processing (see FIG. 26A).

Then the CPU 61 judges whether the computed total of the gradation values is equal to the threshold value (step S537), and if judged as equal (in the case of Yes), the CPU 61 executes the processing of generating a white dot in the pixel which positions at the center of gravity position computed in step S535 (step S538). Specifically the CPU 61 stores "0" in a predetermined address of the output buffer positioned at the center of gravity position. As described above, at this point, the maximum value ("255") of the input gradation value has been stored for the quantized pixel group, except the pixel at the center of gravity position, in the output buffer, and "0", for indicating that a dot is not generated, is stored for the pixel at the center of gravity position. These processings are repeated until the total of the values, when the maximum value is subtracted from the gradation values of the quantizing pixel group 56c, reaches the threshold value (No in step S537).

Then it is judged whether an unprocessed pixel exists (step S539), and if an unprocessed pixel exists, processing moves to step S41 again (in the case of Yes), and processing is repeated until there are no more unprocessed pixels. When there are no more processed pixels (in the case of No), processing ends (step S539).

When the total of the gradation values exceeds the threshold value in step S534 (in the case of Yes), processing moves to step S541, and the CPU 61 executes the center of gravity computing processing, which is performed in the case when the threshold value is exceeded. The center of gravity computing processing here is the same as the above mentioned computing processing in step S55, as shown in FIG. 23. In other words, the CPU 61 reads the threshold value ("255" in this case) from the ROM 65, subtracts the threshold value from the total of the gradation values which was computed in step S534 and stored in the working memory 672 in the RAM 67 (step S550), and computes the center of gravity using (Formula 2) based on that value (step S551). In the case of the example shown in FIG. 26, if (n+1, m+2) is finally selected in step S550, the total of the gradation values which were selected thus far becomes "265", since "200" is stored in the memory 672 and the value, when the gradation value of the selected pixel "190" is subtracted from the maximum value "255", is "65". This value exceeds the threshold value "255", so "Yes" is selected in step S534, and processing moves to step S541. And (threshold value)−(total of density) becomes 255−200, that is "55". Using this value as the gradation value of the selected pixel (n+1, m+2), the center of gravity position is computed in step S551.

Figure 26C:
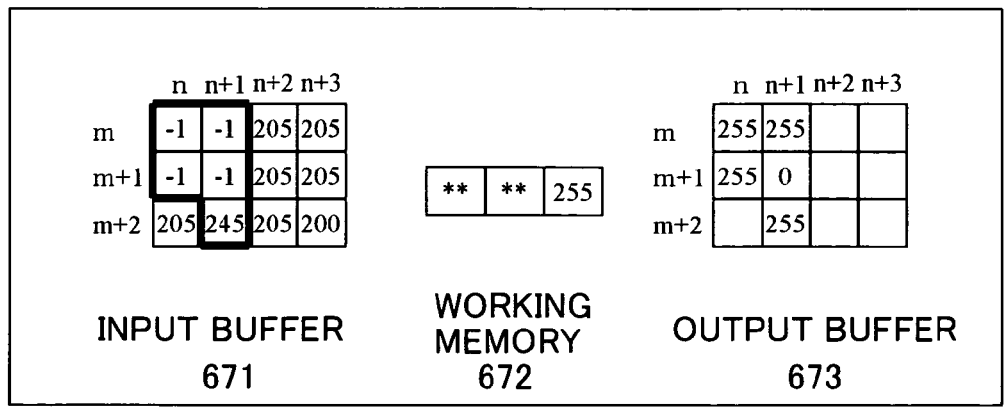

The CPU 61 stores the computed center of gravity position in the working memory area 672 of the RAM 67 again (see working memory 672 in FIG. 26C), computes the return data and overwrites the value [in the area] of the input buffer 671 of the RAM 67 corresponding to this pixel, and stores it (see working memory 672 in FIG. 26C). This is to prevent this pixel from being incorporated into the quantized pixel group. By this, white dots accurately matching the input gradation value can be created. And the CPU 61 stores "0" to the corresponding position in the output buffer so as to create a white dot at the computed center of gravity position (step S542, see output buffer in FIG. 26C). Then processing moves to step S539 again, and the above mentioned processing is repeated.

Now the threshold value control processing in step S44 and step S533 will be described with reference to the flow chart in FIG. 27.

As described above, if in the selected pixel including the initial pixel and unprocessed pixel (step S43 and step S530), low input gradation values or intermediate gradation values continue, then the size of the quantized pixel group 56a does not become constant, and the density of the black dots and the white dots to be generated does not become constant. In such a case, dot distribution in the print output does not become constant, where dots stand out in some areas and dots are few in other areas, and a pleasant print output cannot be acquired. Therefore the threshold value is changed depending on the number of pixels of the quantizing pixel group 45c, so that a predetermined size of quantized pixel group 56a is created and the dot density becomes constant.

Figure 27:
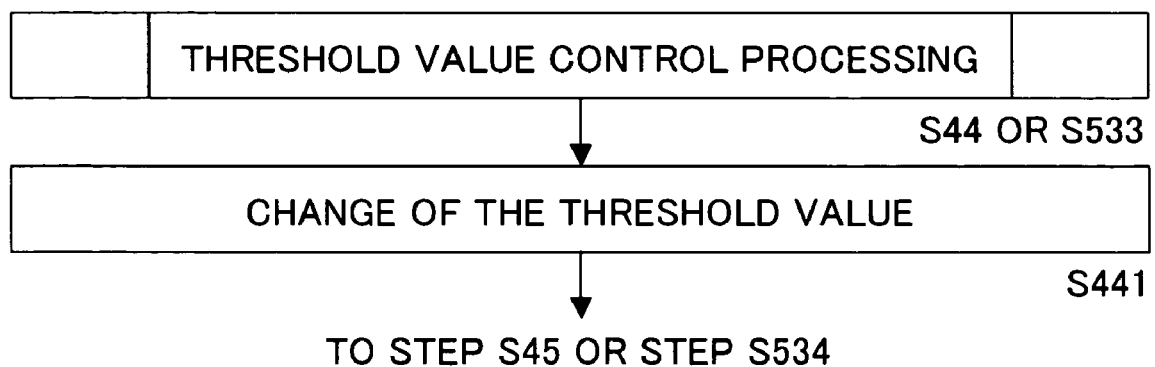
FIG. 27 is a flow chart depicting the operation of threshold value control processing.

As FIG. 27 shows, when processing moves to the threshold control processing (step S44, step S533), the CPU 61 executes processing for changing the threshold value (step S441). Here the CPU 61 changes the threshold value used for step S45 and S534 using the number of pixels including the unprocessed pixels selected each time and the total of the gradation values of the quantizing pixel group 56c. And using this changed threshold value, the CPU 61 judges whether the total of the gradation values exceeds the threshold value in step S45 and step S534. Specifically, the modified threshold value is determined using the number of pixels of the quantizing pixel group 56c and the total of the gradation values which are stored in the working memory of the RAM 67. This formula is expressed by a predetermined function, and the CPU 61 reads this function stored in the ROM 65 and inputs the number of pixels and the total of gradation values stored in the working memory 672 to this function to determine the threshold value. The modified threshold value may be stored in the ROM 65 from the beginning, so that the CPU 61 reads it in the threshold value change processing (step S441) and executes the processing.

Figure 28A:
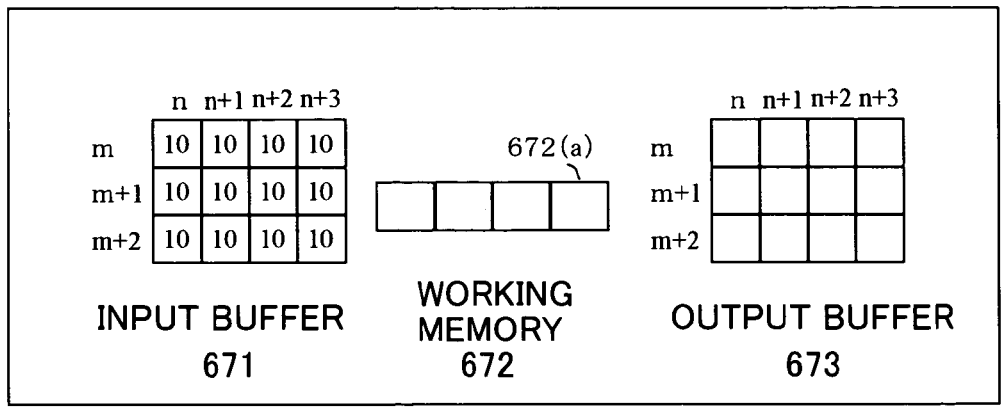
FIGS. 28A, 28B, 28C are diagrams depicting examples of the RAM 67 and the values to be stored.
Figure 28B:
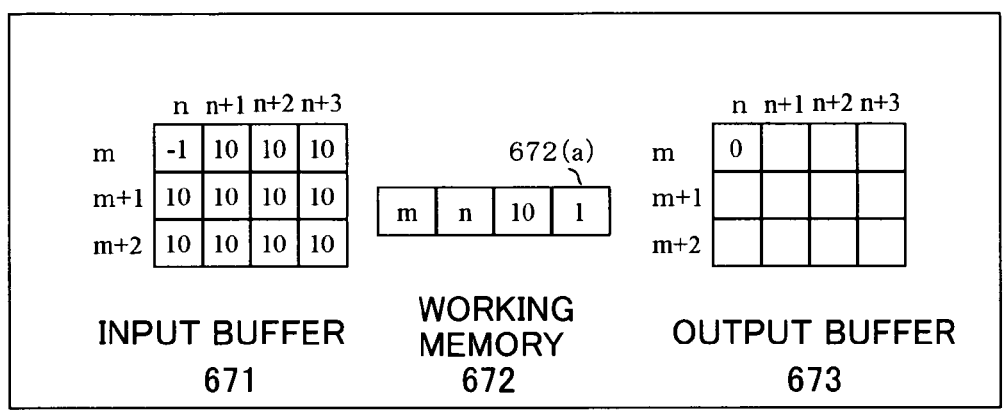
Figure 28C:
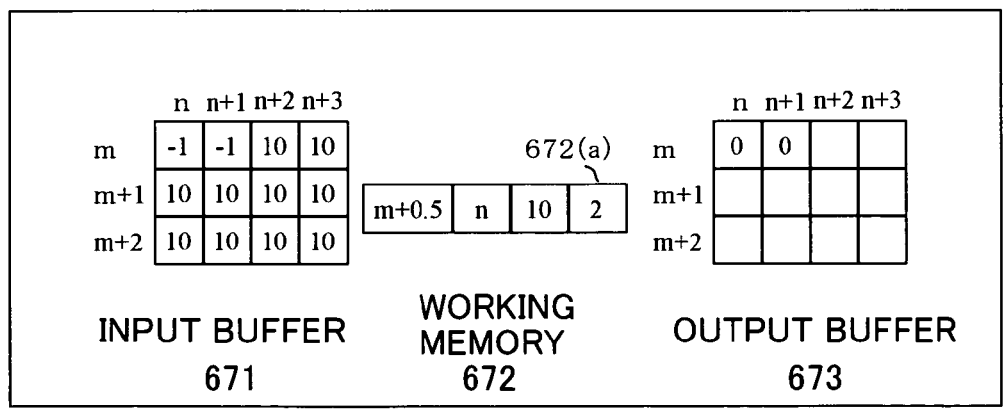

A specific example shown in FIG. 28A, 28B, 28C will be described. When the gradation values of the input image are input as FIG. 11A, that data is stored in the input buffer 671 of the RAM 67, as shown in FIG. 28A. And the pixel positioned in (n, m) is selected as the initial pixel in step S41 and the center of gravity thereof is computed to be (n, m), so the CPU 61 stores the center of gravity position and the gradation value in the working memory 672 shown in FIG. 28B. The working memory 672 also has an area 672a for storing the number of selected pixels. In step S41, only the initial pixel (n, m) has been selected, so the CPU 61 stores "1" in the area 672a (see FIG. 28B).

Then when the unprocessed pixel (n+1, m) is selected in step S43, "2", which is the total of the number of selected pixels, including the initial pixel, is stored in the number of pixels storage area 672a of the working memory 672. And the center of gravity position including the unprocessed pixels and the total of gradation values are computed in step S46 and step S47, and the values shown in FIG. 28C are stored in the working memory 672.

Then the steps S43 to S48 are repeated, and four pixels ((n, m), (n+1, m), (n, m+1) and (n+1, m+1)) are assumed to be incorporated into the quantizing pixel group 56c. And if the unprocessed pixel (n+1, m+2) is selected in step S43 again, then "5" is stored in the number of pixels storage area 672a, since 5 pixels have been selected thus far (see FIG. 29A). If the predetermined number of pixels stored in the ROM 64 in step S441 is 4, then the number of pixels (5) of the quantizing pixel group 56c exceeds the predetermined number of pixels (4), so the CPU 61 computes the threshold value change by the threshold value change processing (step S441).

Figure 29A:
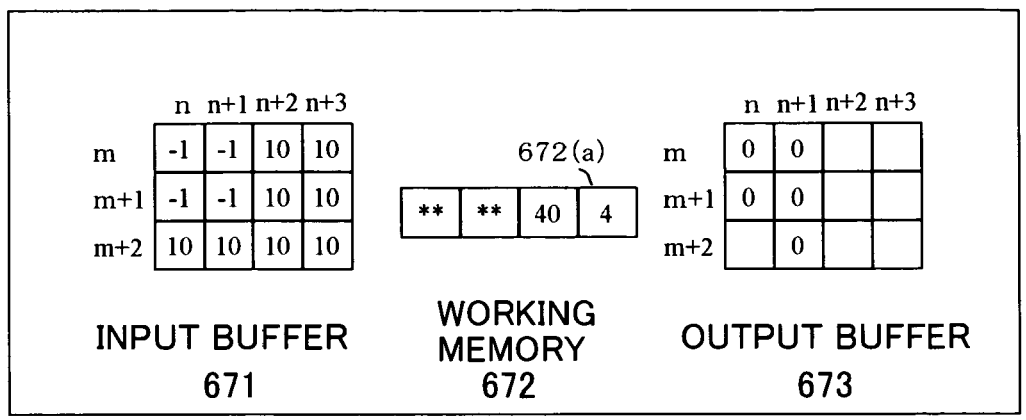
FIGS. 29A, 29B are diagrams depicting examples of the RAM 67 and the values to be stored.
Figure 29B:
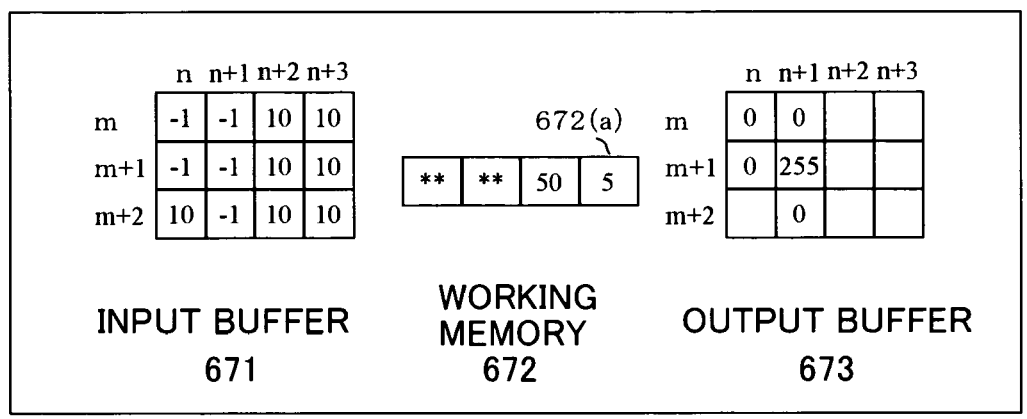

In step S442, the CPU 61 reads the functions stored in the ROM 65 using the number of quantizing pixels "5", and the total of the gradation values thus far "40", and computes the threshold value after the change. As a result, the threshold value is changed from "255" to "50". Since the total of the gradation values thus far, "40", does not exceed the threshold value "50", processing moves to steps S46 and S47, and the center of gravity position, including the pixel (n+1, m+2) which was selected last, and the total of the gradation values, are computed. The computed result is stored in the working memory 672, as mentioned above, and since the total of the gradation values "50" is equal to the threshold value "50" in step S48, processing moves to step S49 and later, "255" is stored in the output buffer, as shown in FIG. 29B, so that a dot is generated in this pixel, and a series of processing is completed. For the threshold value control processing S573 in the white density processing S53, as well, the same processing is performed.

In this example, a case when the threshold value is decreased was described, but if intermediate gradation values continue in the input gradation values, the threshold value is computed to be higher.

Since the threshold value is changed based on the number of pixels of the quantized pixel group 56c and the gradation value, the size of the quantized pixel group 56a is almost constant, and dots are generated at a constant density. Also the ON/OFF of dots are executed using the center of gravity, therefore dots accurately matching the distribution of the gradation values of the input image can be generated.

When the above mentioned series of processing ends, the CPU 61 reads "255" (in the case of generating black dots) or "0" (in the case of generating white dots) written in the output buffer 673 of the RAM 67, outputs this data to the printing engine 70, and a predetermined print output can be acquired.

As described above according to the present invention, high image quality output dots can be acquired without generating a worm, delay in dot generation, and distortion of data outside an area, which are the problems of the error diffusion method. Also according to the present invention, the image data of the pixels is quantized matching the data distribution of the image. Also according to the present invention, the dispersion of the dots is improved and a visually pleasant print output can be acquired.

Third Embodiment

The third embodiment of the present invention will now be described with reference to FIG. 30 to FIG. 45. In the third embodiment, an unprocessed pixel is selected based on a reference point for pixel selection, and a predetermined size of a cell is created and a dot is generated at the center of gravity position thereof. In the second embodiment, the reference point for pixel selection is at the center of gravity position and is updated each time a pixel is selected, but in the third embodiment the reference point is not updated each time, but is updated according to a predetermined update pattern to create a cell. By this, the center of gravity position need not be calculated each time, and the entire processing speed including other processing can be increased, and compared with the case of fixing the reference point to select an unprocessed pixel, the shape of a cell to be finally generated becomes closer to a circle, and a visually pleasant output dot can be acquired.

At first, the outline of this will be described with reference to FIG. 30A to FIG. 34C. FIG. 30A to FIG. 32C show examples when the reference point for pixel selection is at the center position of the quantizing pixel group and is updated each time an unprocessed pixel is selected, and FIG. 33A and FIG. 34C show examples when the reference point is at the center position and is updated every other time.

Here the center position is not the center of gravity position using the gradation values, but the center position based on the coordinates position, and if the coordinates of the position is (x, y), then the center position is computed according to the following formula (in the following formula, N is the number of pixels of the quantizing pixel group).

(Formula)

$$x = \Sigma_i x_i / N$$

$$y = \Sigma_i y_i / N$$

As for the input data, the case when each pixel and the gradation values shown in FIG. 30A are input will be described. FIG. 30A is an example when the image data of three pixels by four pixels is input, to simplify the explanation, but one frame of image data may be input.

When the input image data in FIG. 30A is input, the initial pixel is selected first, and for this a pixel at the highest and most left, out of the unprocessed pixels, is selected, just like the first and second embodiments. This is because it becomes more probable that the quantized pixel group (cell) to be finally generated is arranged diagonally in an image, and the dots are generated in the diagonal direction which are less recognizable for human eyes. In the case of the example in FIG. 30A, the pixel at (n, m) is selected as the initial pixel.

When the initial pixel is incorporated into the quantizing pixel group 56c and the center position thereof is computed using (Formula 3), the center position 56f comes to the position shown in FIG. 30(b). Then an unprocessed pixel 56e, which positions at the closest position to the center position, is selected, and if there are a plurality of applicable pixels, a pixel is selected at random just like the first embodiment. This is because of the suppressing generation of a periodic pattern (see FIG. 4A, 4B), as described in the second embodiment. In the case of the example in FIG. 30B, two pixels at (n+1, m) and (n, m+1) are closest to the center position 56f, and (n+1, m) is selected here.

Now the selected unprocessed pixel 56e is incorporated into the quantizing pixel group 56c, as shown in FIG. 30C, and the reference point for pixel selection, that is the center position, of the quantizing pixel group 56c is computed, then the center position is at the position 56f in FIG. 30C. Since the total of the gradation values of the quantizing pixel group 56c is "100" at this point, the unprocessed pixel 56e is continuously selected. In this embodiment as well, just like the first embodiment, the threshold value is set to "255", and an unprocessed pixel 56e is selected until the total of the gradation values reach this value.

Then a pixel closest to this reference point (center position) 56f is selected, but in the case of the example shown in FIG. 30C, two pixels (n, m+1) and (n+1, m+1) exist, so the pixel (n, m+1) is selected at random as the unprocessed pixel 56e.

Figure 31A:
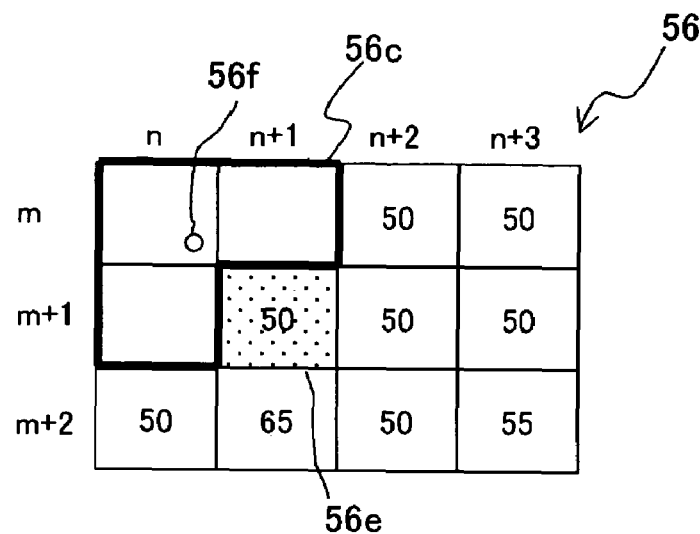
FIGS. 31A, 31B, 31C are diagrams depicting the concept of constructing a cell based on the reference point of pixel selection.

And the selected unprocessed pixel 56e is incorporated into the quantizing pixel group 56c, as shown in FIG. 31A, and the center position thereof is computed using (Formula 3), then the center position is at the position 56f. The total of the gradation values of the quantizing pixel group 56c at this point is "165", which does not reach the threshold value, so an unprocessed pixel 56e is continuously selected. Since the pixel closest to the center position 56f is a pixel at (n+1, m+1), this pixel is selected as the unprocessed pixel 56e.

Figure 31B:
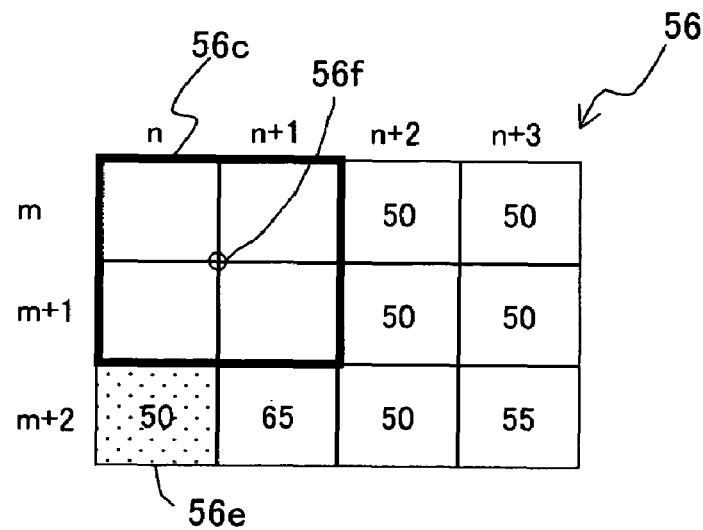

Now the selected unprocessed pixel 56e is incorporated into the quantizing pixel group 56c and the center position 56f is computed using (Formula 3), then the center position comes to the position shown in FIG. 31B. The total of the gradation values of the quantizing pixel group 56c is "215", which does not reach the threshold value. So the unprocessed pixel 56e is selected. Since there are four pixels (n, m+2), (n+1, m+2), (n+2, m) and (n+2, m+1), which are the closest to the center position 56f, a pixel positioned at (n, m+2) is selected at random in this case.

Figure 31C:
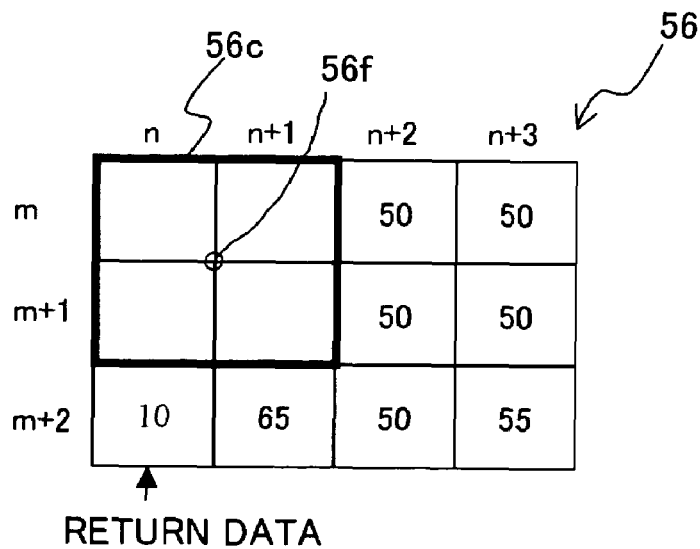

And the selected unprocessed pixel 56e is incorporated into the quantizing pixel group 56c, and the total of the gradation values thereof is "265", which exceeds the threshold value. In this case, just like the first embodiment, the gradation value for the same amount of the threshold value is incorporated into the quantizing pixel group 56c, and the remaining gradation value is returned to the unprocessed pixel 56e so that this pixel is selected as an unprocessed pixel hereafter. This is because of the generation of dots accurately matching the input gradation values, just like the case of the second embodiment. Here "10" is provided to the pixel positioned at (n, m+2) as the return data (FIG. 31C).

Figure 32A:
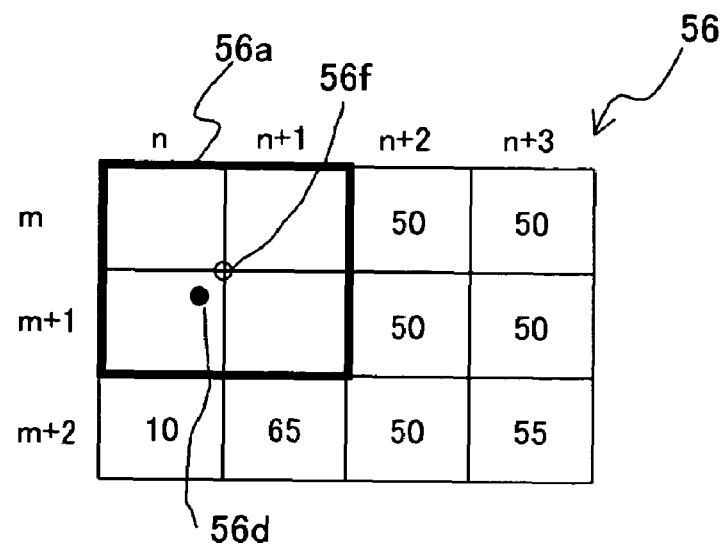
FIGS. 32A, 32B, 32C are diagrams depicting the concept of constructing a cell based on the reference point of pixel selection.

Now the total of the gradation values of the quantizing pixel group 56c created thus far has reached the threshold value, so the quantizing pixel group 56c becomes the quantized pixel group 56a and a dot is generated at the center of gravity position thereof. The center of gravity position is computed in the same way as (Formula 1) of the second embodiment, and the center of gravity position 56d in FIG. 32A is acquired.

Figure 32B:
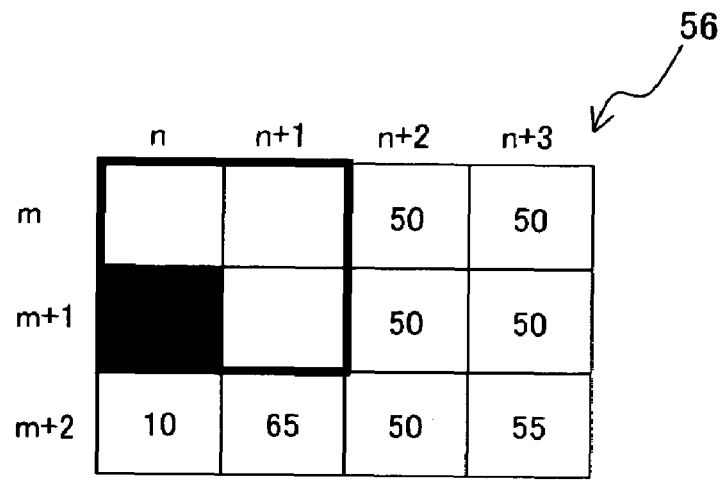
Figure 32C:
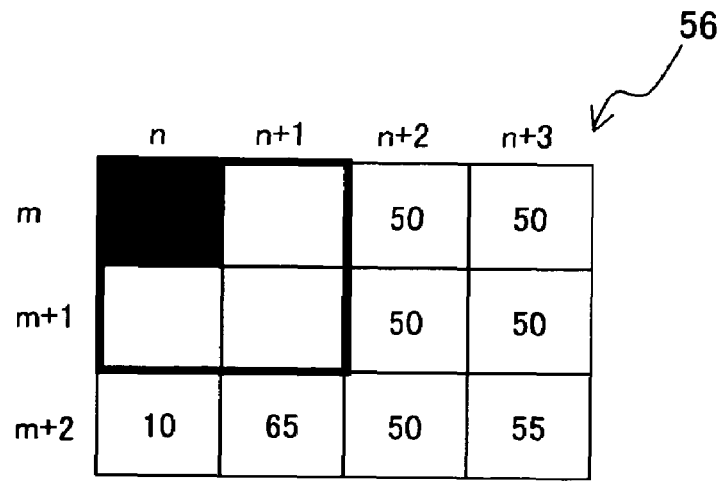

And a dot is generated in a pixel positioned at the center of gravity position 56d, that is a dot is generated at the position shown in FIG. 32B. If the center of gravity position is calculated every time, just like the first and second embodiments, processing computation increases as shown in (Formula 1) and (Formula 2), but if the reference point for pixel selection is computed as the center position and the center of gravity is computed last, then the computation amount can be decreased, and the quantized pixel group grows to be circular, the distance between dots is maintained, and a visually pleasant dot output can be acquired.

The reference point for pixel selection need not be updated each time but may be updated every other time, or at intervals of every two times, or may be updated at a predetermined number of times. An example when the reference point is updated every other time will be described with reference to FIG. 33A and FIG. 34C.

A dot may be generated in a pixel at the center position used for pixel selection without computing the center of gravity position itself. For example, in the case of the example shown in FIG. 32A, a dot is generated at a position in FIG. 32C. In this case, it is possible that the center position is located between a plurality of pixels, but in such a case one pixel may be selected at random, or one pixel may be selected from the plurality of pixels using a predetermined table.

Now the case of updating the reference point (center position in this case) every other time will be described with reference to FIG. 33A and FIG. 34C. Just like FIG. 30, the case when the input image data is input as FIG. 33A will be described. And just like FIG. 30B, the initial pixel is selected and the center position 56f thereof is computed, then [the center position] comes at the position shown in FIG. 33B. And a pixel closest to the reference point (center position 56f) is selected at random as the unprocessed pixel 56e, then the pixel positioned at (n+1, m) is selected.

Then the selected unprocessed pixel 56e is incorporated into the quantizing pixel group 56c, but an unprocessed pixel 56e to be selected next is not selected based on the center position 56f computed from the quantizing pixel group 56c after incorporation, but instead is selected based on the center position 56f before incorporation. At this point the reference point is not updated. As FIG. 33C shows, the pixel closest to the center position 56f is (n, m+1), and this pixel is selected as an unprocessed pixel 56e.

Figure 34A:
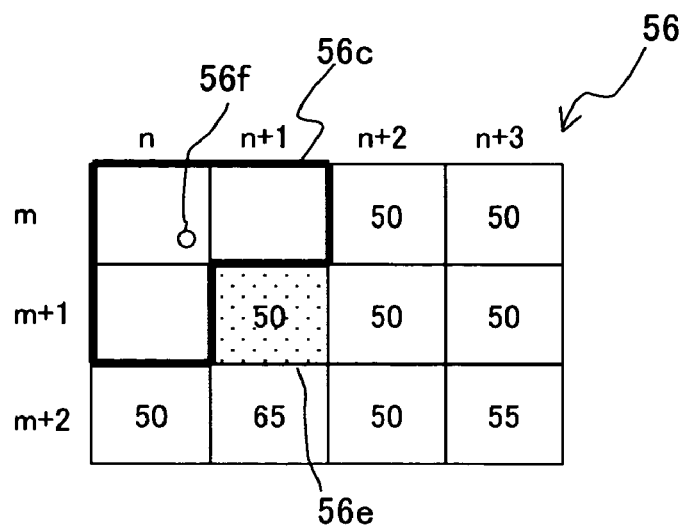
FIGS. 34A, 34B, 34C are diagrams depicting the concept of constructing a cell based on the reference point of pixel selection.

Then the quantizing pixel group 56c, after the selected unprocessed pixel 56e is incorporated, becomes like FIG. 34A. Since the reference point is updated every other time, the center position 56f of the quantizing pixel group 56c created at this point is computed, then the center position 56*f* moves to the position shown in FIG. 34A.

Figure 34B:
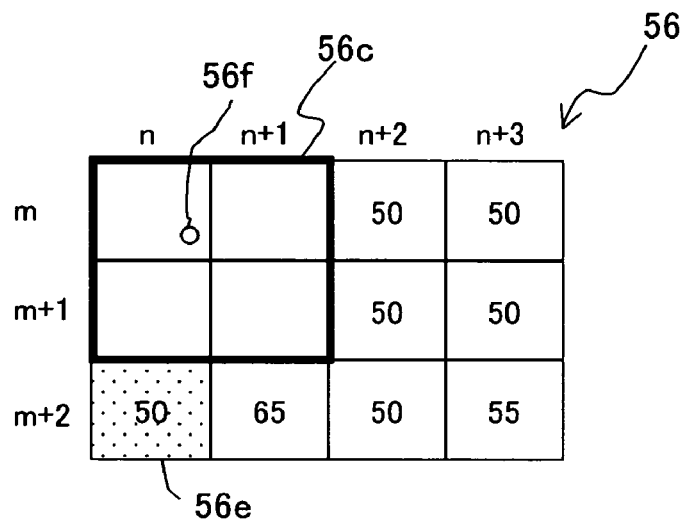
Figure 34C:
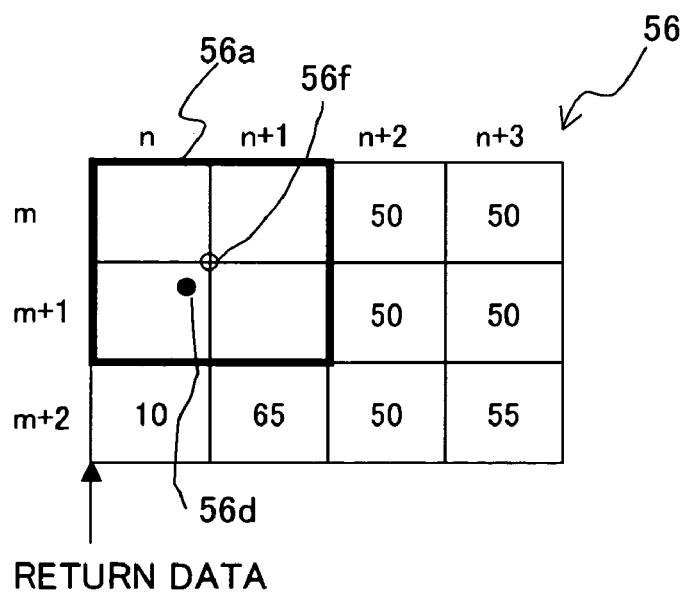

Now using this updated center position as a reference, the unprocessed pixel 56*e*, which is closest to this position, is selected, and this pixel is incorporated into the quantizing pixel group 56*c*, then the result becomes as shown in FIG. 34B. And without updating the reference point, a pixel closest to the center position 56*f* computed in the previous computation is selected as the unprocessed pixel 56*e* (the pixel at (n, m+2) is selected), and the quantizing pixel group 56*c* is created.

Just like the example in FIGS. 30A, 30B, 30C, the total of the gradation values including the selected pixel exceeds the threshold value, so the exceeded amount is returned to the selected pixel as return data. And the center of gravity position for generating the dot is computed, then the center of gravity comes at the position 56*d* in FIG. 34C, so a dot is generated at this position. And when the reference point is updated, the reference point 56*f* moves to the position shown in FIG. 34C.

By updating the reference point for pixel selection, not every time, but every other time in this way, the computation amount can be further decreased and the processing speed of the entire image processing device, including other processing, can be improved. The reference point may be updated at the fourth unprocessed pixel section from the initial pixel selection, and then may be updated at the third unprocessed pixel selection and the second unprocessed pixel section, decreasing the number of times at which the reference point is updated.

The above is an overview, and now the specific processing will be described with reference to the flow charts in FIG. 35 to FIG. 40, and the example of the RAM 67 will be described with reference to FIG. 41A to FIG. 44C. The example of this processing will be described using the case when the reference point is updated every other time.

Figure 35:
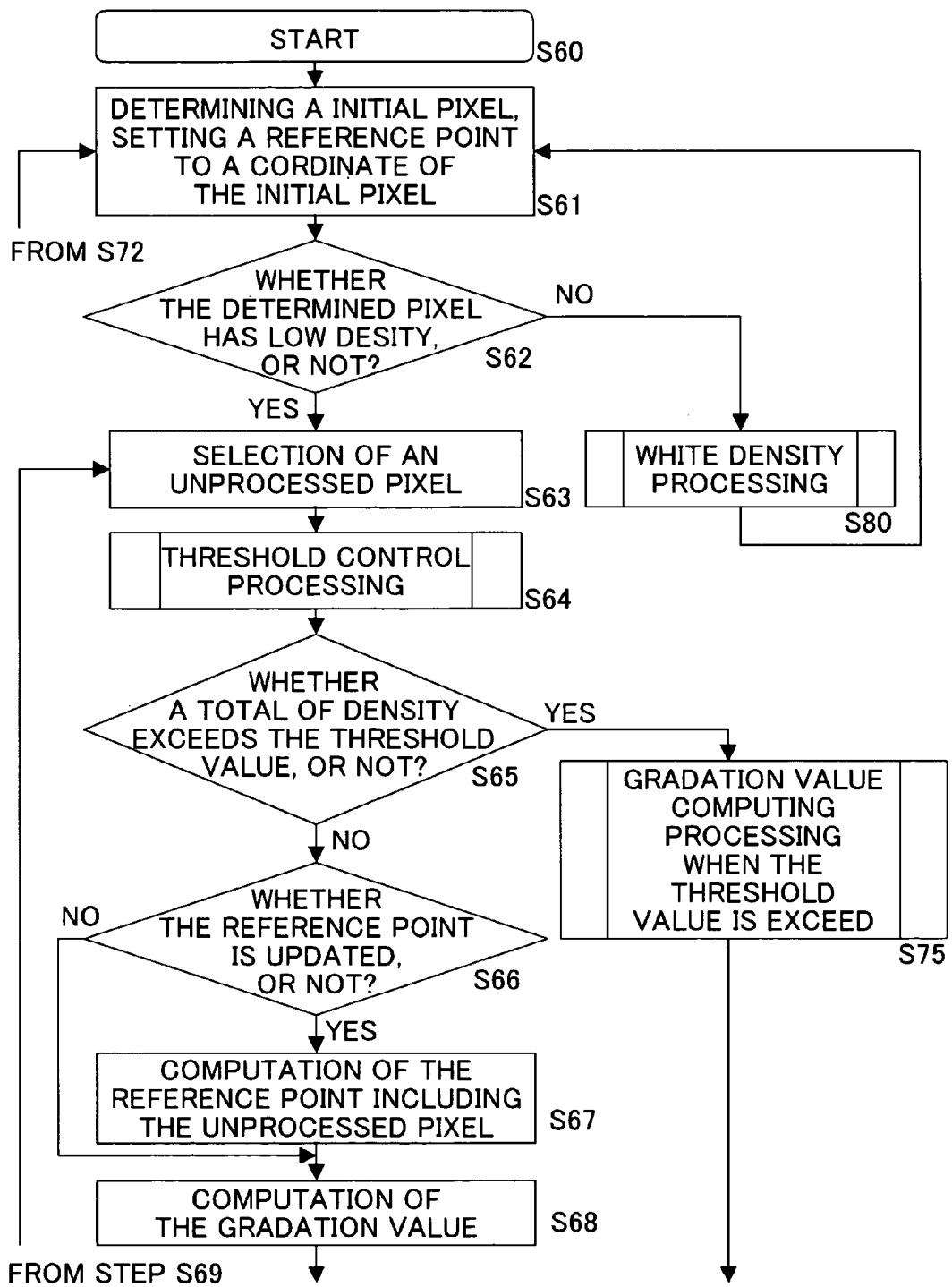
FIG. 35 is a flow chart depicting the operation of an embodiment of the present invention.
Figure 41A:
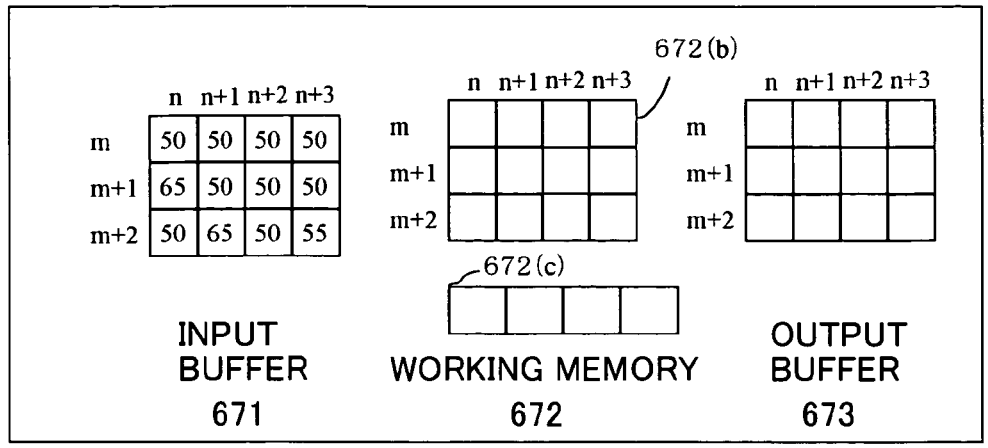
FIGS. 41A, 41B, 41C are diagrams depicting examples of the configuration of the RAM 67 and the values to be stored.

When this processing starts (step S60), as FIG. 35 shows, the CPU 61 determines the initial pixel and sets the reference point for unprocessed pixel selection to the coordinates of the initial pixel (step S61). In the case of the configuration of the RAM 67 shown in FIG. 41A, the input image data is input to the input buffer 671 as shown in FIG. 41A. The gradation value of each pixel is the same as FIGS. 30A, 30B, 30C. The configuration of the RAM 67 is similar to that in FIGS. 20A, 20B, 20C, but the working memory 672 is comprised of two areas, 672(*b*) and 672(*c*). The values stored in the RAM 67 including these areas 672(*b*) and 672(*c*) are controlled by the CPU 61, just like the second embodiment. The area 672(*b*) is constructed such that the gradation value of the selected unprocessed pixel is input so as to compute the center of gravity position later. And the area 672(*c*) is constructed such that the total of the position coordinates of the reference point and the total of gradation values and the count values of the unprocessed pixel selection are stored.

Figure 41B:
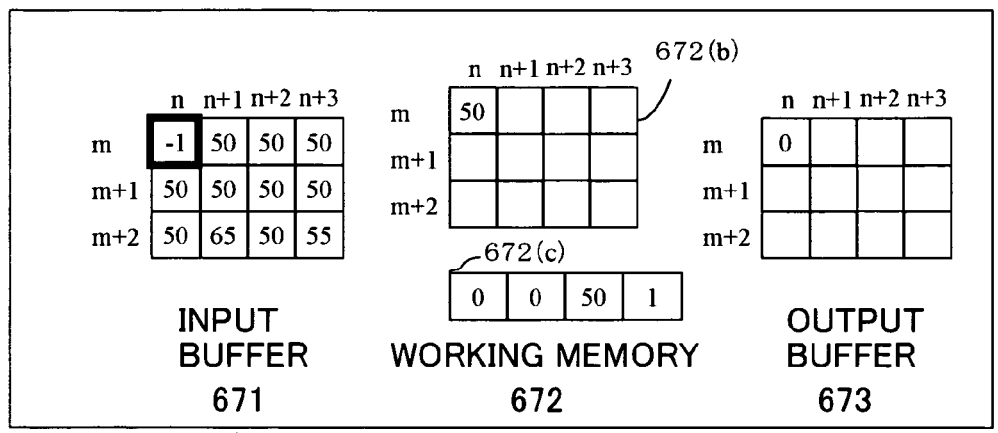

For the initial pixel, an unprocessed pixel at the highest and at the most left is selected, that is the pixel (n, m) is selected, as the input buffer 671 in FIG. 41B shows. For the selected pixel, "−1" is stored so as not to be selected as an unprocessed pixel, and the gradation value of the selected pixel is stored in the area 672(*b*). And the reference point computed using (Formula 3), that is (0, 0), the total of the gradation values "50", and the selection count, which is "1" since only the initial pixel was selected, are stored in the area 672(*c*) respectively.

Returning to FIG. 35, the CPU 61 next judges whether the determined pixel has low density or not (step S62). This is because a different processing must be executed between the processing for generating a black dot and the processing for generating a white dot, just like the second embodiment. The threshold value is "127", the same as the second embodiment, and this value stored in the ROM 65 and the gradation value of the pixel selected in step S61 are compared to make this judgment. In the case of the example shown in FIG. 41(*b*), the gradation value of the selected initial pixel is "50", so the pixel is judged as low density (Yes in step S62), and processing moves to step S63.

Figure 41C:
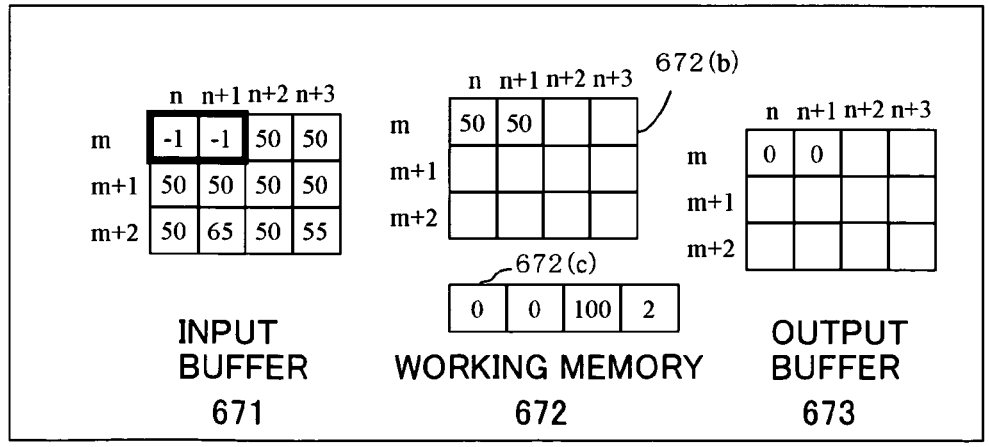

In step S63, the CPU 61 selects an unprocessed pixel. In the present embodiment, a pixel closest to the reference point, which was set in step S61, is selected. In the case of the example in FIG. 41B, the center position, which is the reference point, is (0, 0), so two pixels (n+1, m) and (n, m+1) are closest to this position, and just like the second embodiment, one of these is selected at random, and the pixel (n+1, m) is selected in this case. This is for suppressing the generation of periodic patterns. And as FIG. 41C shows, the CPU 61 stores "−1" for the positions of the selected pixels in the input buffer 671, "2" which is the number of pixels selected thus far is stored in the area 672(*c*) of the working memory 672, and "0" is stored in the corresponding pixel positions in the output buffer 673.

Then the CPU 61 executes the threshold control processing (step S64). Just like the second embodiment, in an area where pixels with low input gradation values continue, the total of the gradation values of a plurality of selected pixels does not reach the threshold value easily, and the size of the quantized pixel group cannot maintain a constant size, so to prevent this the threshold value is changed depending on the number of selected pixels.

Figure 37:
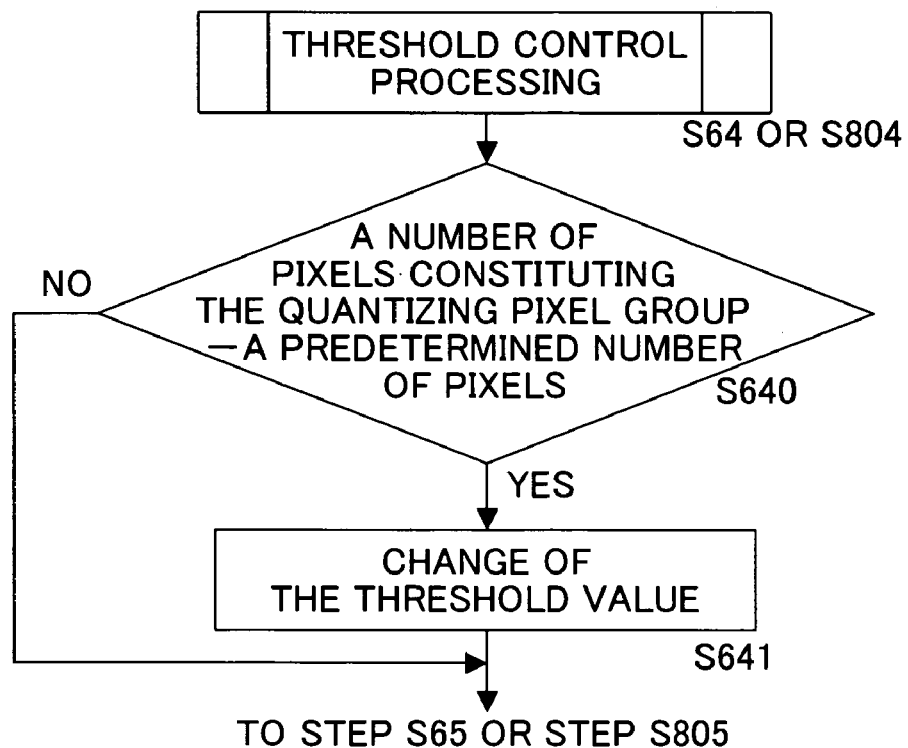
FIG. 37 is a flow chart depicting the operation of threshold value control processing.

FIG. 37 shows a flow chart depicting the operation of the threshold control processing. Just like the second embodiment, the CPU 61 first judges whether the number of pixels constituting the quantizing pixel group reached a predetermined number of pixels (step S640). If the number exceeded the predetermined number of pixels, threshold value change processing is executed (step S641), otherwise the change processing is not executed, and processing moves to step S65. In the case of the example shown in FIG. 41C, the number of pixels of the quantizing pixel group does not reach the predetermined number of pixels (e.g. "4" as seen in the Second Embodiment), so the threshold value is not changed, and processing moves to step S65.

Returning to FIG. 35, the CPU 61 judges whether the total of density exceeds the threshold value (step S65). Just like the second embodiment, the CPU 61 compares the total of the gradation value stored in the area 672(*c*) of the working memory 672 and the gradation value of the unprocessed pixel selected in step S62 with the threshold value "255" stored in the ROM 65. If the result is that the threshold value is exceeded, processing moves to step S75, and if not, processing moves to step S66. In the case of the example shown in FIG. 41B, the gradation value of the initial pixel is "50", and the gradation value of the selected unprocessed pixel is "50", so the total thereof is "100", which does not reach the threshold value "255", therefore processing moves to step S66.

In step S66, the CPU 61 judges whether the reference point is updated or not. Here the reference point is updated every other time, so the reference point is updated when the selection count, stored in the area 672(*c*), is an odd count (3, 5, 7, . . . ). If the reference point is updated every third time, the reference point is updated when the selection count is 4, 7, 10, . . . . If the count [when the reference point is updated] is fixed, the value stored in the area 672(*c*) is read, and the reference point is updated when the selection count reaches the stored value. For the update pattern, the reference point may be updated at the fourth selection from the initial pixel selection at first, then is updated at the third selection the next time, decreasing the selection count at which the reference point is updated from the first update, and the reference point is updated when this count comes. In the case of the example in FIG. 41C, the selection count in the area 672(c) is "2", which is not an odd count, so the reference point is not updated (No in step S66), and processing moves to step S68. The selection counts at an update is stored in the ROM 65 in advance, and the CPU 61 compares these values and the count stored in the area 672(c) to execute processing.

In step S68, the CPU 61 computes the gradation value. The CPU 61 computes the total of the gradation value written in the working memory area 672(b) and the gradation value selected in step S63, and stores the value in a position for storing the total of the gradation value in the area 672(c). Here the total of the gradation value of the initial pixel and the gradation value of the selected unprocessed pixel is "100", so this value is stored.

Figure 36:
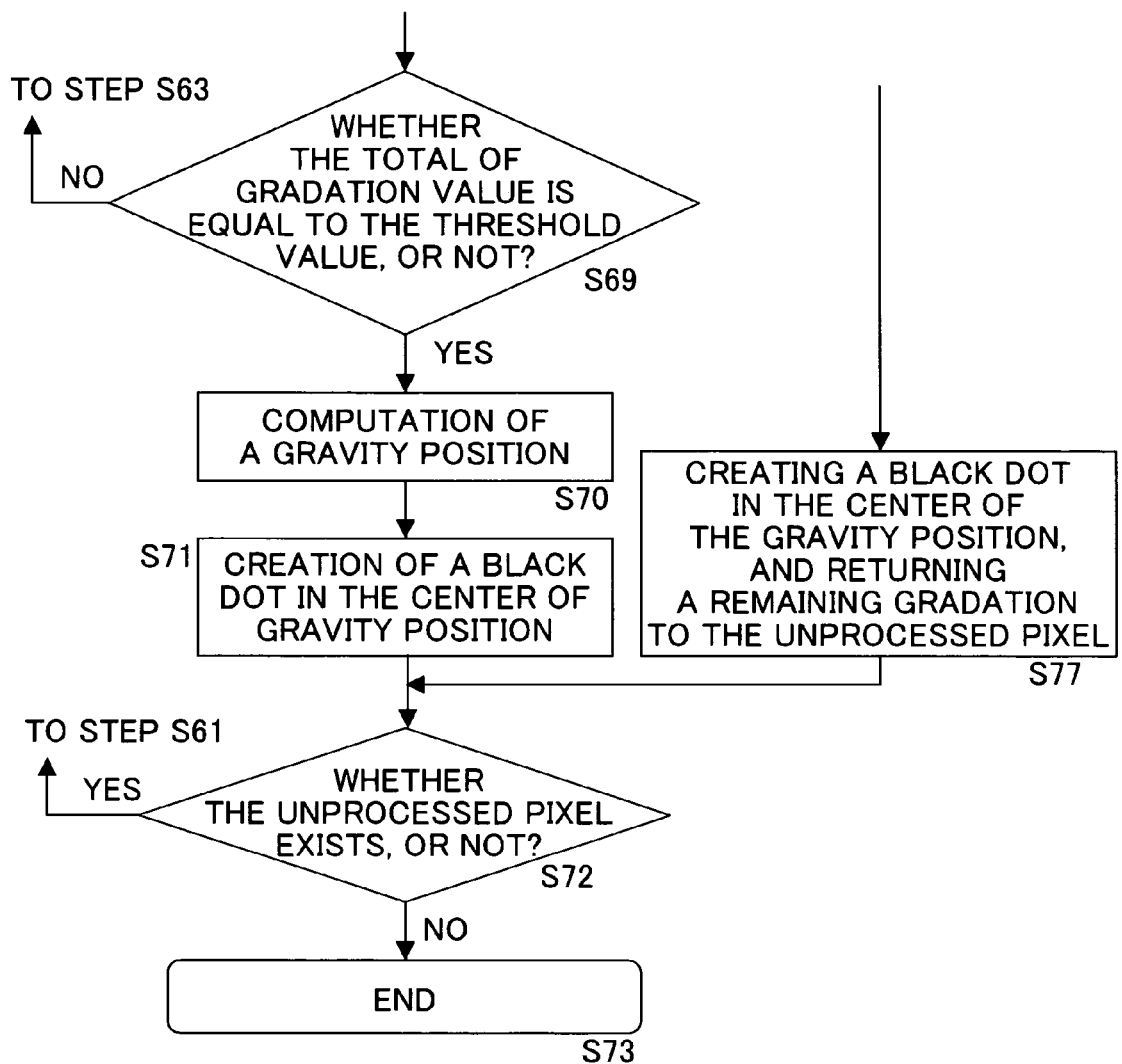
FIG. 36 is a flow chart depicting the operation of an embodiment of the present invention.

Then the CPU 61 judges whether the total of the gradation values is equal to the threshold value "255", as shown in FIG. 36 (step S69). In the case of the example shown in FIG. 41C, "100" is stored in the area 672(c) of the working memory 672 as the total of the gradation values, which does not reach the threshold value, so "No" is selected, and processing moves to step S63.

Figure 42A:
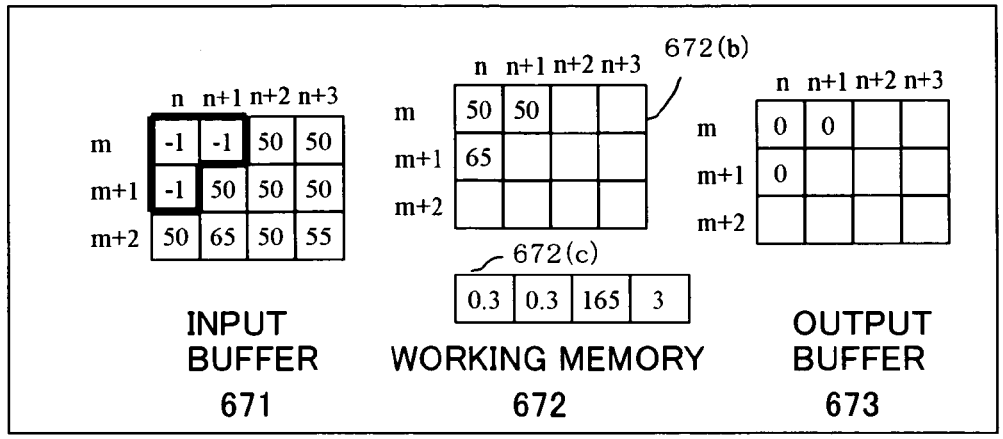
FIGS. 42A, 42B, 42C are diagrams depicting examples of the configuration of the RAM 67 and the values to be stored.

And an unprocessed pixel is selected again (step S63). An unprocessed pixel is selected using the center position as a reference, and if a plurality of pixels are selected, one pixel is selected at random. As FIG. 42A shows, the pixel positioned at (n, m+1) is selected. The gradation value of the selected pixel is stored at a corresponding position in the area 672(b), and "0" is also stored in the output buffer 673. And the selection count "3" is stored in the area 672(c). Also "−1" is stored at the selected pixel of the input buffer 671.

Then the CPU 61 moves into the threshold processing (step S64). Since the number of pixels have not yet reached a predetermined number of pixels (e.g. "4", just like the second embodiment), processing moves to step S65 without changing the threshold value. In the case of the example in FIG. 42A, the computed total of density is "165", which does not reach the threshold value, just like the above mentioned case, so "No" is selected in step S65, and processing moves to step S66.

Then the CPU 61 judges whether the reference point is updated (step S66). In the case of the example in FIG. 42A, the selection count stored in the area 672(c) is "3", which matches the update count "3", so "Yes" is selected and the reference point is computed. The reference point is computed by the CPU 61 using the above mentioned (Formula 3). The result (0.3, 0.3) (decimals rounded off) is stored in the area 672(c), as shown in FIG. 42A. In the next selection of an unprocessed pixel, this reference point is used for computation.

Figure 42B:
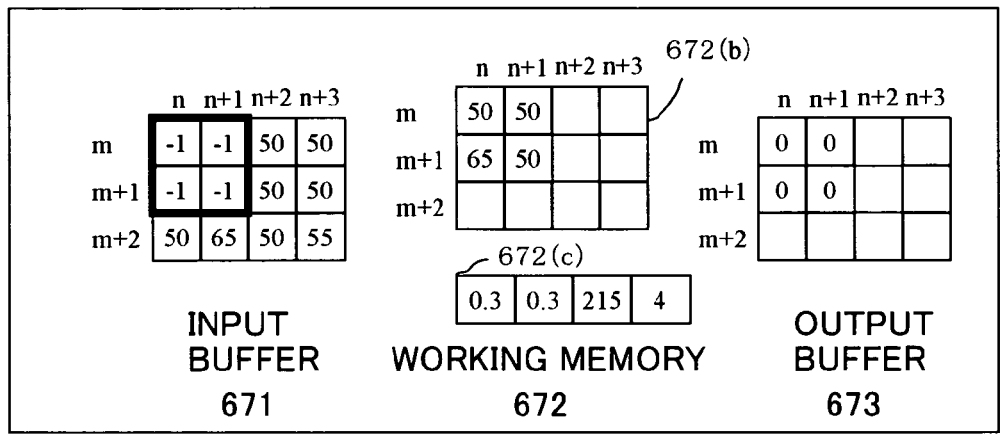
Figure 42C:
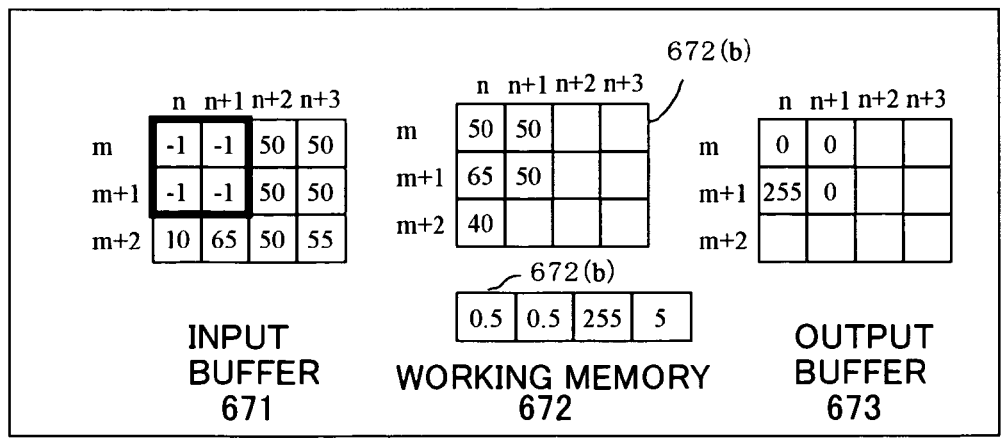

Then the total "165" of the gradation values is stored in the area 672 (2) (step S68), and whether the value is the same as the threshold value is judged (step S69). Since the total does not reach the threshold value, processing moves to step S63 again and an unprocessed pixel is selected. As FIG. 42B shows, (n+1, m+1) is selected as the unprocessed pixel, then the above mentioned processing is performed, and the computed value is stored in the areas 672(b) and 672(c). However, the unprocessed pixel selection count is "4", so the reference point is not updated, and the next unprocessed pixel is selected using the center position used in FIG. 42A.

Then processing from step S64 to step S69 is executed, and if the stored values of the RAM 67 are in the status in FIG. 42B when processing moves to step S63 again, (processing moves to step S63 since the total of the gradation value "215" does not reach the threshold value), and an unprocessed pixel is selected using the reference point at this point, then the pixel at position (n, m+2) is selected in step S63. In this case, the total value of density is "265", which exceeds the threshold value "255", so "Yes" is selected in step S65, and processing moves to step S75.

Figure 38:
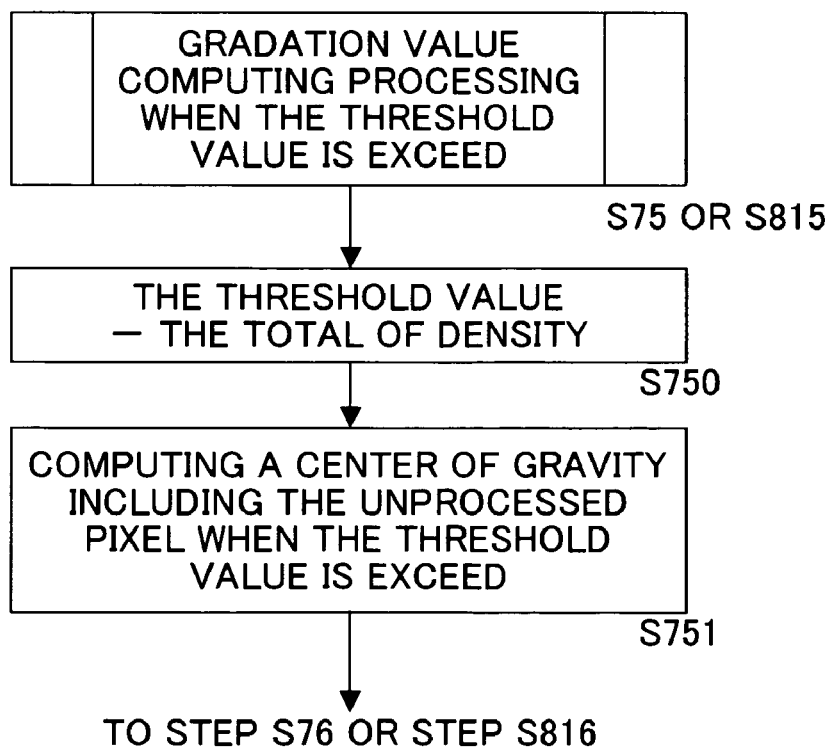
FIG. 38 is a flow chart depicting the operation of gradation value computing processing when the threshold value is exceeded.

FIG. 38 shows a flow chart depicting the gradation value computing processing when the threshold value is exceeded. Just like the second embodiment, processing for subtracting the total of density from the threshold value is executed first (step S750). In the example shown in FIG. 42B, the total of the gradation value stored in the area 672(c) is "215", and the threshold values is "255", so "40" is the result. Then regarding the gradation value of the unprocessed pixel (n, m+2), which was selected last, as "40", the center of gravity is computed including this pixel (step S751). This is for generating dots accurately matching the input gradation values.

The center of gravity is computed using (Formula 2), just like the case of the second embodiment. And "255", which indicates to generate a dot, is stored at a position of the output buffer 673 corresponding to the pixel at the computed center of gravity position (see the output buffer 673 in FIG. 43C), and the remaining gradation value is returned to the selected pixel (n, m+1) (step S77 in FIG. 36). The pixel (n, m+2), of which the gradation value is regarded as having this return data, becomes an unprocessed pixel selection target hereafter.

And if an unprocessed pixel exists ("Yes" in step S72), processing returns to step S61, and the above processing is repeated. If there are no more unprocessed pixels ("No" in step S72), the series of processing completes.

When the threshold value and the total of the gradation values (the value stored in the area 672(c) of the working memory 672) are the same in step S69, on the other hand, "Yes" is selected in step S69, and the CPU 61 moves to step S70 and computes the center of gravity position. The center of gravity positioned is computed by substituting each gradation value stored in the working memory 672(b) in (Formula 1).

And the CPU 61 stores "255", which indicates to generate a dot for a pixel positioned at the computed center of gravity position in the corresponding area of the output buffer 673 (step S71). Then the above mentioned processing is repeated until there are no more unprocessed pixels.

Figure 39:
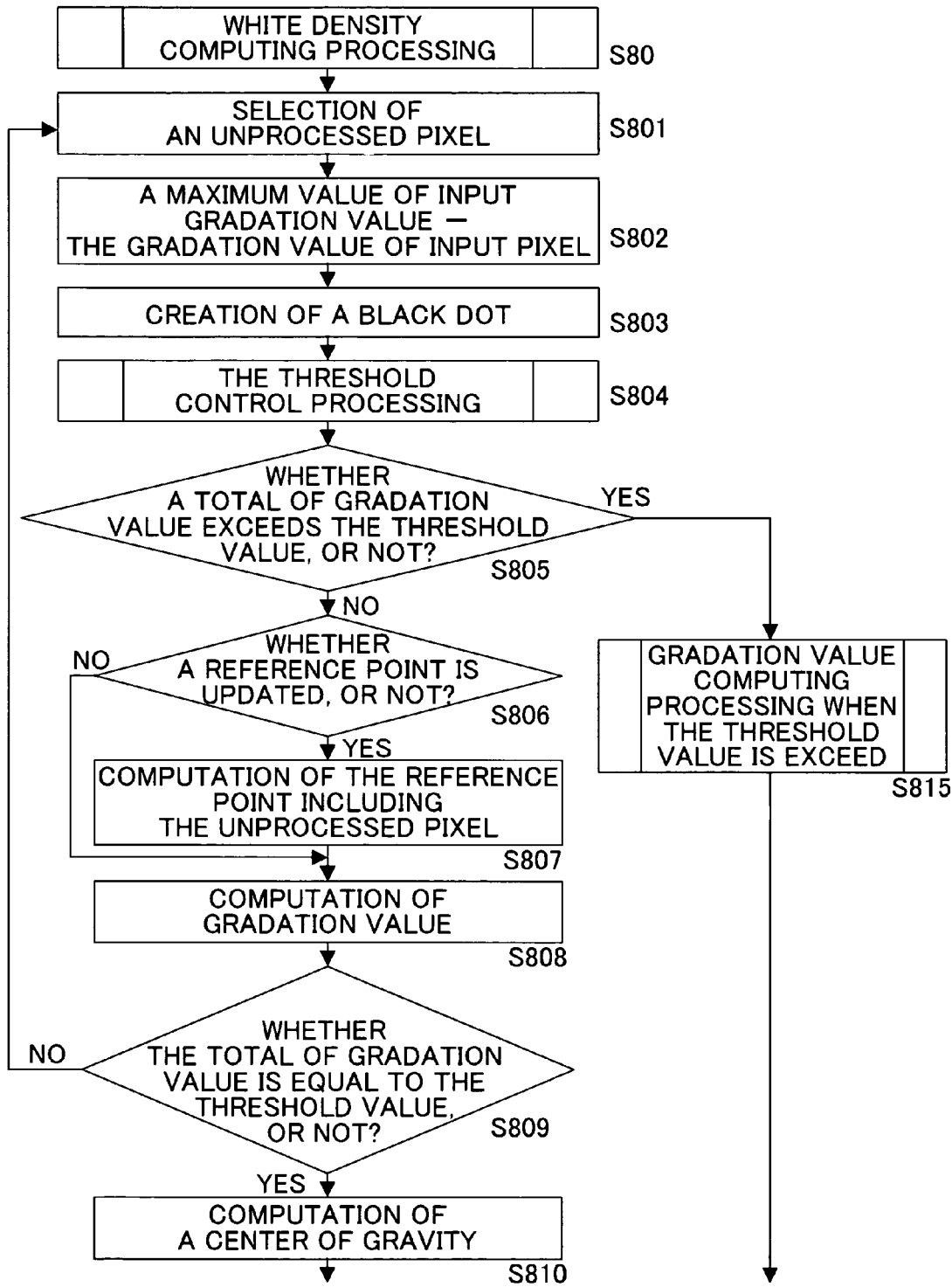
FIG. 39 is a flow chart depicting white density computing processing.
Figure 40:
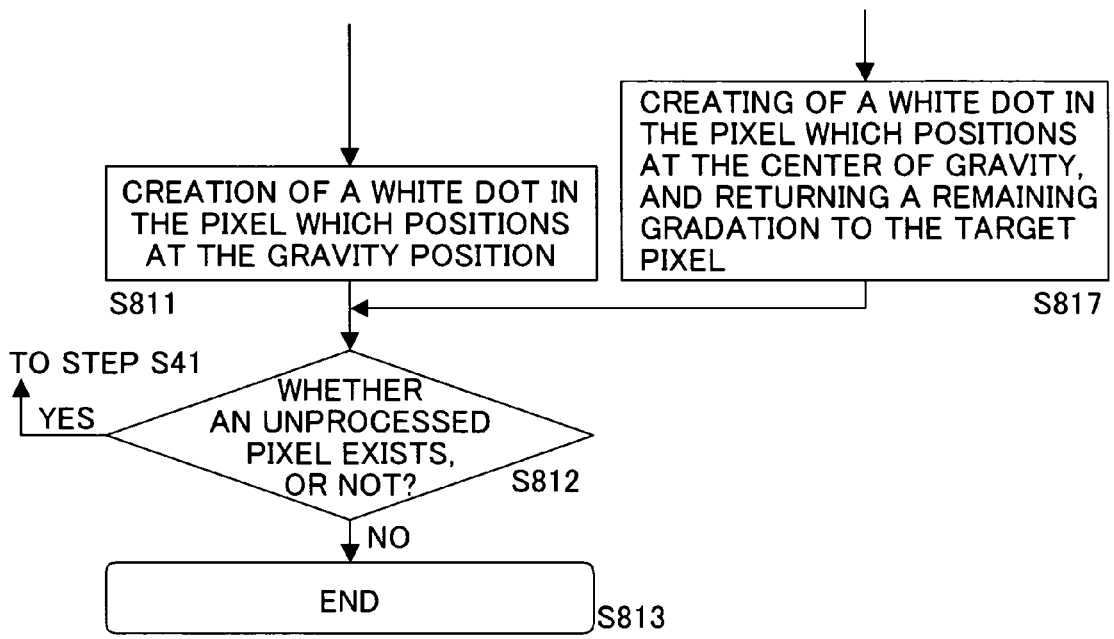
FIG. 40 is a flow chart depicting white density computing processing.
Figure 43A:
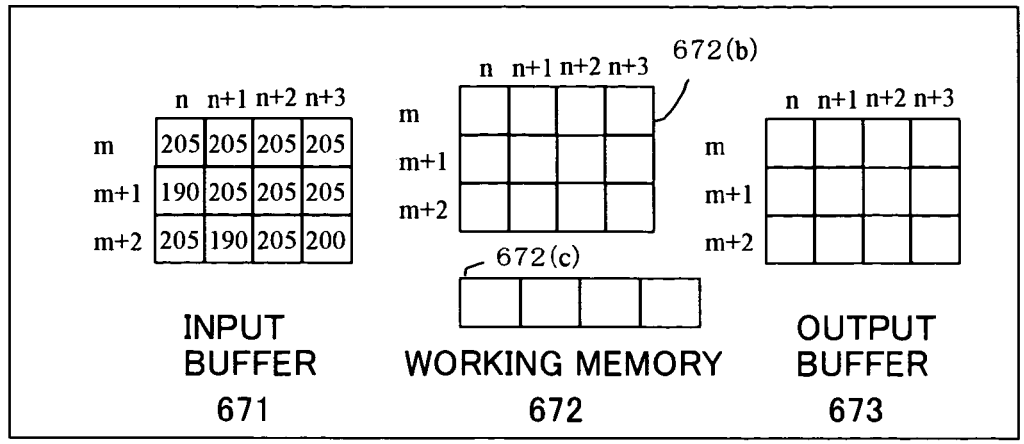
FIGS. 43A, 43B, 43C are diagrams depicting examples of the configuration of the RAM 67 and the values to be stored.

Returning to FIG. 35, if the determined pixel is not low density in step S62 (No), processing moves to step S80, and white density processing is executed. FIG. 39 shows the flow chart depicting this processing. This is also for executing processing to generate a white dot at the center of gravity position when the gradation value of the pixel has more black components than white components, just like the case of the second embodiment. Here as well, the case when the reference point for the unprocessed pixel selection is updated every other time will be described. Also the case when the input image data shown in the input buffer 671 in FIG. 43A is stored will be described, where (n, m) selected as the initial pixel in step S61, (0, 0) for the reference point, and "1" for the unprocessed pixel selection count are stored in each area 672(b) and 672(c).

Figure 43B:
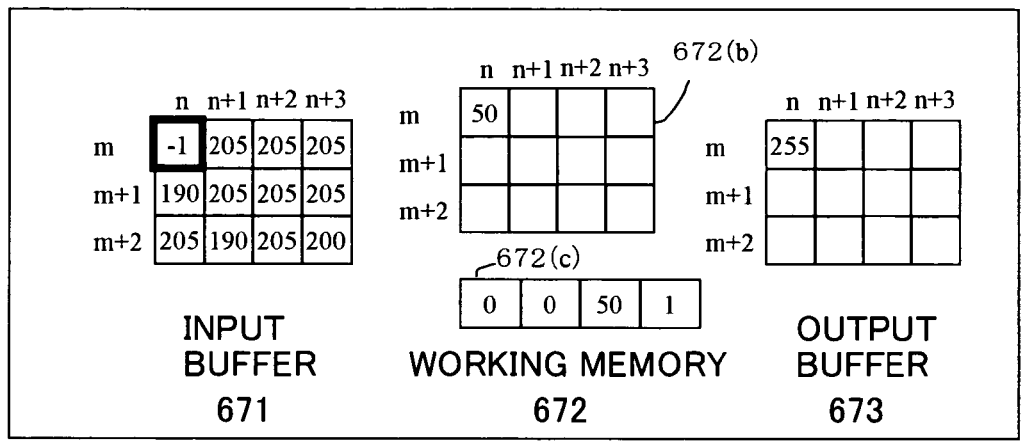

When it is judged that the determined pixel is not low density in step S62, on the other hand, not the input gradation value "205" but the value "50", when the input gradation value is subtracted from the maximum value of the input gradation value, is stored for the gradation value in the area 672(b), and "255" is stored in the corresponding area of the output buffer 673 (see FIG. 43B).

Figure 43C:
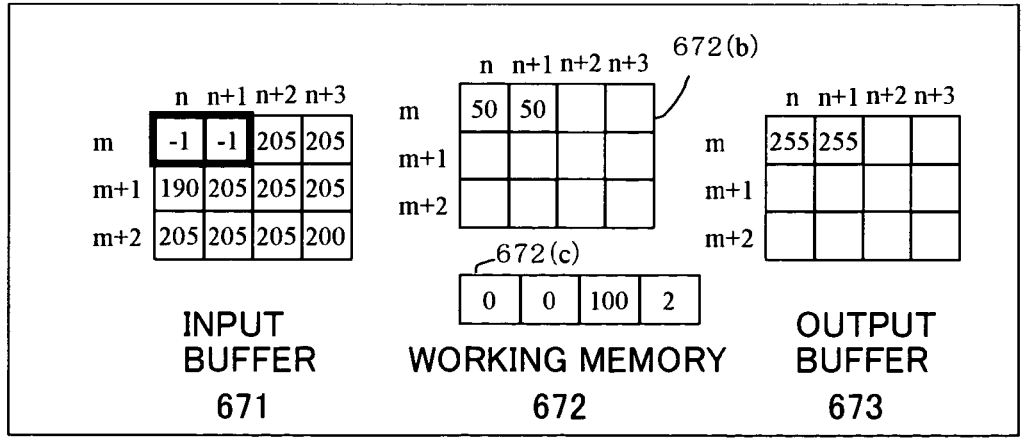

Returning to FIG. 39, the CPU 61, which entered white density processing (step S80), first selects an unprocessed pixel (step S801). For this selection, a pixel closest to the center position as the reference point is selected, just like the processing in FIG. 35. If there are a plurality of such pixels, a pixel is selected at random. As FIG. 43C shows, a pixel at (n+1, m) is selected as an unprocessed pixel. For the selected pixel, "−1" is stored in the input buffer 671 so that this pixel is not selected as an unprocessed pixel hereafter, and the selection count "2" is stored in the area 672(c) of the working memory 672.

Then the CPU 61 moves to step S802 and subtracts the input gradation value of the selected pixel from the maximum value of the input gradation value. The gradation value of the unprocessed pixel selected in step S801 is "205", and the maximum value is the threshold value "255", so the subtraction result is "50". This value is stored in the corresponding position of the area 672(b) (see FIG. 43C).

Then the CPU 61 moves to step S803 and performs black dot generation processing. Just like the second embodiment, "255" is stored in the output buffer 673 at a position corresponding to the unprocessed pixel selected in step S802 (see FIG. 43C).

Then the CPU 61 moves to threshold value control processing (step S804). In the example shown in FIG. 43C, the number of selected pixels has not reached the predetermined number of pixels, so the threshold value is not changed. Details of the threshold value control processing are the same as that in the above mentioned FIG. 37. This is for maintaining the size of the quantized pixel group to be a predetermined size, just like the second embodiment.

Then the CPU 61 judges whether the reference point is updated or not (step S806). This is judged by whether the count, when the unprocessed pixels were selected thus far, reached the predetermined count, just like the processing in FIG. 35. In this example as well, the reference point is updated every other time, that is, updated when the selection count is 3, 5, 7, . . . . At the point shown in FIG. 43C, the selection count "2" is stored in the area 672(c), so the reference point is not updated, "No" is selected, and processing moves to step S808.

The CPU 61 computes the gradation value in step S808. Just like the above mentioned example, the CPU 61 computes the total of the gradation value of the unprocessed pixel selected in step S801 and the gradation value stored in the area 672(c) of the working memory 672. In the case of the example shown in FIG. 43C, the gradation value of the selected unprocessed pixel is "50", and only the gradation value "50" of the initial pixel is stored in the area 672(c), so the total thereof is "100". And this value is stored in the area 672(c) again (see FIG. 43C)).

Then the CPU 61 moves to step S809, and judges whether the total of the gradation values is equal to the threshold value "255". If judged as equal (Yes), processing moves to step S810, and if judged as not equal (No), processing moves to step S801 again, and an unprocessed pixel is selected.

Figure 44A:
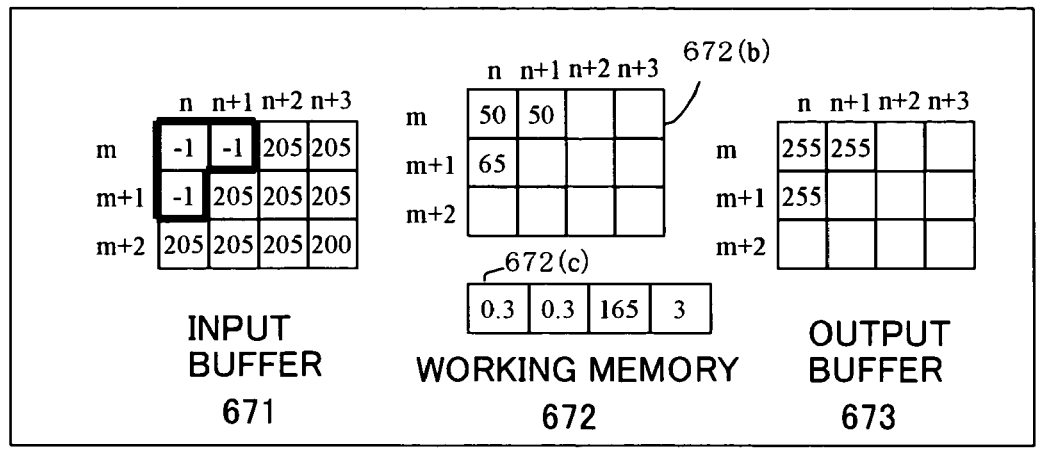
FIGS. 44A, 44B, 44C are diagrams depicting examples of the configuration of the RAM 67 and the values to be stored.

In the case of the example shown in FIG. 43C, the total of the gradation values is "100", so "No" is selected, and an unprocessed pixel is selected again (step S801). For the selection of an unprocessed pixel, an unprocessed pixel is selected based on the reference point (value stored in the area 672(c)), then (n, m+1) is selected, as shown in FIG. 44A. And as FIG. 44A shows, the selection count "3" is stored in the area 672(c). And the gradation value of the selected pixel is subtracted from the maximum value, and the result "65" (=255− 190) is stored in the area 672(b) of the working memory 672 (step S802). "255" is stored in the corresponding area of the output buffer 673 (step S804), and whether the total of the gradation values, including the selected pixel, reached the threshold value or not is judged (step S805), and since the total is "165", "No" is selected, and processing moves to step S806.

In step S806, "3" is stored in the area 672(c), which matches the predetermined count for update "3", so "Yes" is selected, and the reference point is computed including the unprocessed pixel (step S807). Using the above mentioned (Formula 3), the reference point is computed based on the previously selected three pixel positions, and (0.3, 0.3) (rounded off decimals) is acquired. This value is stored in the area 672 of the working memory 672(c). An unprocessed pixel is selected in step S801 based on this reference point.

Figure 44B:
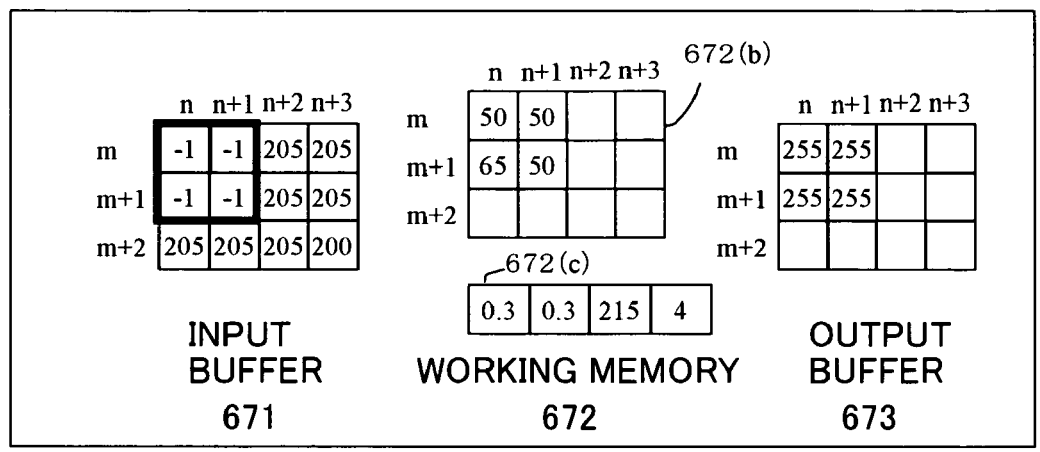

Then the CPU 61 computes the total of the gradation values "165" and stores it in the area 672(c) (step S808), and judges whether this value is equal to the threshold value (step S809). Since the total of the gradation values has not reached the threshold value "255", an unprocessed pixel is selected again. After the processing from step S801 to step S808, each value is stored in the RAM 67, as shown in FIG. 44B. Since the total of the gradation values is "215" at this point, which has not reached the threshold value, an unprocessed pixel is selected again (step S801).

Figure 44C:
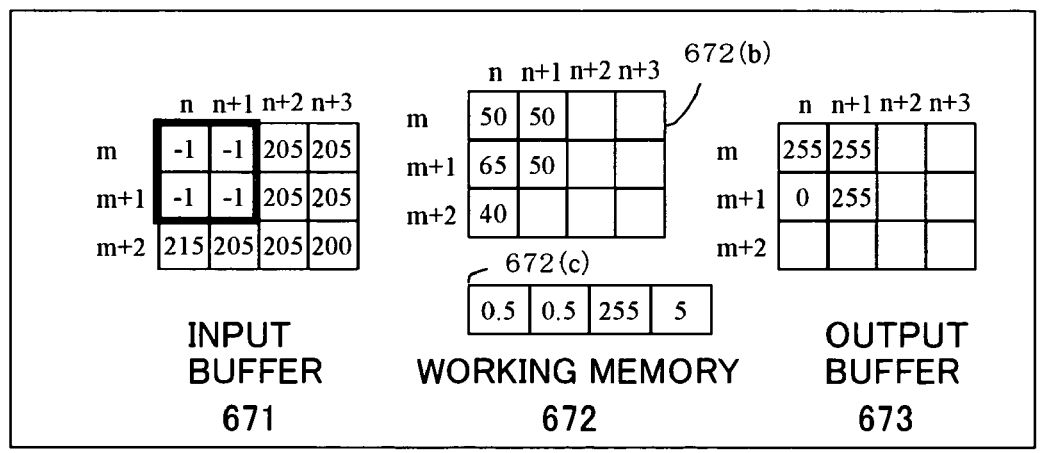

Now the CPU 61 selects an unprocessed pixel using the center position stored in the area 672(c) as the reference point, and selects the pixel (n, m+2) (see FIG. 44C). In this case as well, an unprocessed pixel is selected based on the non-updated reference point.

Then the CPU 61 performs the above mentioned processing from step S802 to step S804, and judges whether the total of the gradation values including the selected unprocessed pixel exceeds the threshold value (step S805). The total of the gradation values is "265" in the example in FIG. 44C, which exceeds the threshold value, so "Yes" is selected, and processing moves to step S815.

For the gradation value computing processing in white density processing when the threshold value is exceeded (step S815), processing the same as the processing in FIG. 35 is executed (see FIG. 38). In this processing, the CPU 61 subtracts the total of density (total of the gradation values stored in the area 672(c)) from the threshold value, and stores this value "40" (=255−215) in the corresponding position of the area 672(b) as the gradation value of the pixel selected last (step S750, see FIG. 44C).

Then the center of gravity is computed using the value stored in the area 672(b) (step S751). The center of gravity is computed using (Formula 2) of the second embodiment. And "0" for generating a white dot is stored in the area of the output buffer 673 corresponding to the pixel at the center of gravity position (see FIG. 44C), and the remaining density, that is the gradation value, is returned to the pixel which was selected last (step S817 in FIG. 40).

And processing moves to step S812, and if there is an unprocessed pixel (in the case of Yes), processing moves to step S61 in FIG. 35, where the above mentioned processing is repeated until there are no more unprocessed pixels. If there are no more unprocessed pixels in step S812 (in the case of No), the above mentioned series of processing completes, and dots are generated on the printing medium by the print engine 70 based on the values stored in the output buffer 673, and the print output is acquired.

As described above, an unprocessed pixel is selected using the reference point, and the reference point is updated according to a predetermined update pattern (count, in the case of the present embodiment), so compared with the case of computing the center of gravity each time, the calculation amount decreases, and the processing efficiency of the entire image output device 60, including this processing, improves. Also the shape of the finally generated quantized pixel group becomes circular, and visually pleasant output dots can be acquired.

If the reference point is the center of gravity, the quantized pixel group is created by updating the reference point, so compared with the case of creating the quantized pixel group by selecting an unprocessed pixel with the reference point fixed, the reference point moves to the area which has a higher gradation value at the edge part where images change. In other words, the center of gravity moves to a pixel which has a large gradation value, since the gradation value of each pixel is used for computing the center of gravity. Because of this, the reference point moves so as to approach the border at the edge part, and dots are created at pixels close to the border. This makes the print output at the border of the edge clear, and a pleasant print output can be acquired.

Also if the reference point is the center of gravity, the reference point moves to a position closer to the fine line in the part where fine lines are drawn. This is also because the fine line part has a high gradation value, and the center of gravity moves to that direction. Also the reference point which once moved on a fine line continues creating quantizing pixel groups without deviating from the fine line, unless a pixel with a higher gradation value exists in the peripheral fine area. This generates dots on pixels closers to the line, or on the fine line, and a print output expressing clear lines can be acquired.

In the above mentioned example, the center of gravity position is computed last, and a dot is created at a pixel which exists at that position, but a dot may be generated at the center position used for unprocessed pixel selection without computing the center of gravity position. In this case, in step S70 in FIG. 36, in step S751 in FIG. 38 and in step S810 in FIG. 39, not the center of gravity position but the center position is computed, and finally "255", or "0" is stored in a position of the output buffer 673 corresponding to the pixel at the center position, and a dot is generated there.

Figures 45A, 45B:
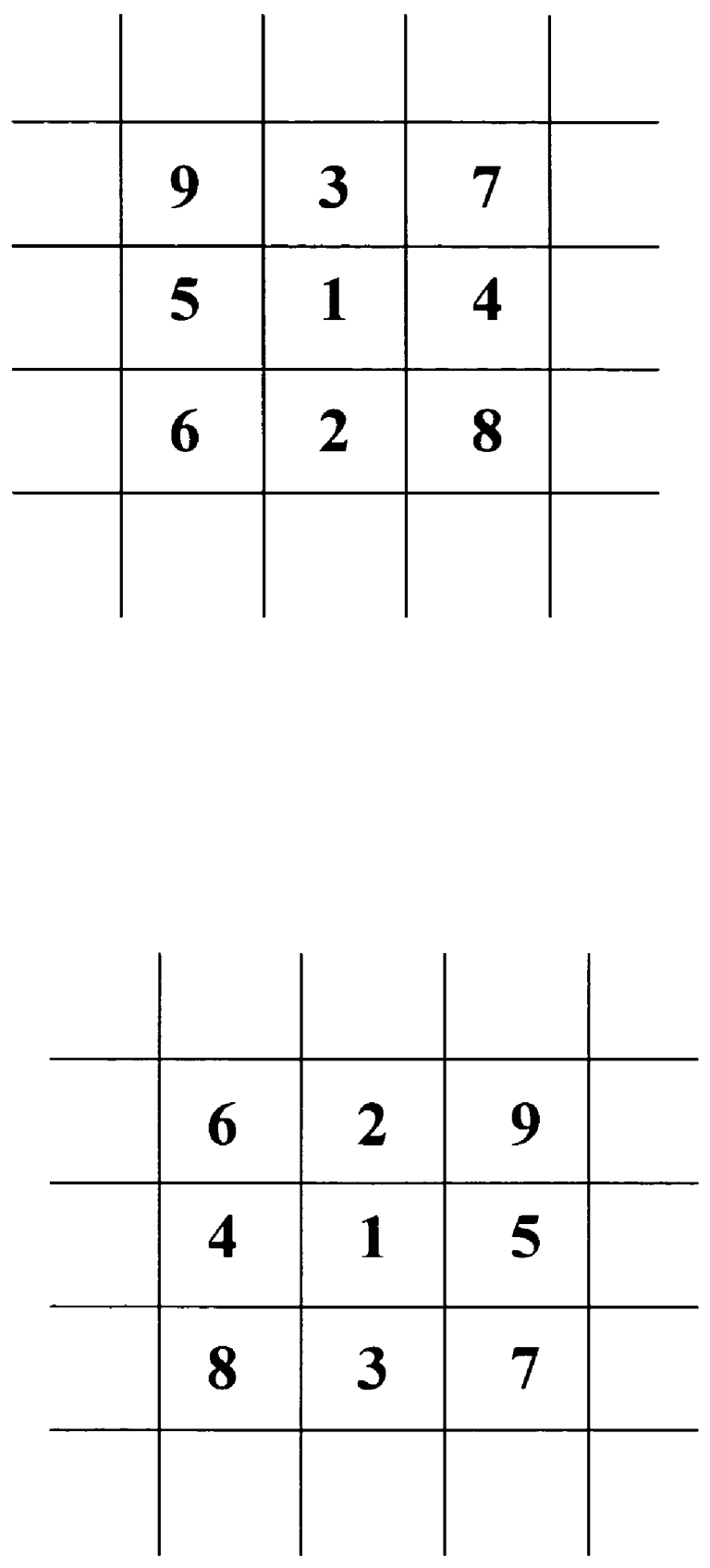

For the selection of an unprocessed pixel, a table for unprocessed pixel selection, as shown in FIGS. 45A, 45B, may be prepared, and an unprocessed pixel is selected using this table. In other words, an unprocessed pixel is selected using "1" as the reference point, as shown in FIG. 45A. Specifically, the coordinates of "1" in FIG. 45A is (0, 0), the coordinates of "2" is (0, −1), the coordinates of "3" is (0, 1), "4" is (1, 0), "5" is (−1, 0), "6" is (−1, 1), "7" is (1, 1), "8" is (1, −1), and "9" is (−1, 1), and an unprocessed pixel is selected in the sequence of the number shown in the table using the pixel positioned at "1" as the reference point. These position coordinates show a relative position with the reference point as the reference, and is stored in the ROM 65, for example, and the CPU 61 reads it when necessary and determines the position.

In the case of the example of updating the reference point every other time, shown in FIGS. 33A, 33B, 33C, for example, the initial pixel (n, m) is set as a pixel positioned at "1" in the table, and for an unprocessed pixel to be selected next, the pixel positioned at "2" in the table, that is the pixel (n, m+1) in FIG. 33 is selected. Then the pixel positioned at "3" in the table is selected, but in this case, a corresponding pixel does not exist in FIGS. 33A, 33B, 33C, so the pixel positioned at "4", that is the pixel (n+1, m) is selected. When the selection count reaches a predetermined count, the reference point is moved, and the pixel at "1" in the table is regarded as (n+1, m) in FIGS. 33A, 33B, 33C, for example, and the pixel positioned at "2" is selected.

This makes it unnecessary to compute the center position each time (or at every predetermined count), which further decrease the computing amount. Also it is unnecessary to compute for selecting a pixel closest to the reference point for pixel selection, so the calculation amount can be further decreased. However, the reference point must be updated, even in this case, according to a predetermined update pattern. This is because the quantized pixel group grows into a circular shape, and if a dot is generated at the center (or center of gravity) thereof, the distance between dots is maintained as constant, and a pleasant print output can be acquired. Exactly the same effect can be acquired even if the table with another pattern, as shown in FIG. 45B, is used. These tables may be switched for each quantized pixel group.

In the above embodiment, count is used for the update pattern, but the reference point may be updated when the total of the gradation values of the pixels constituting the quantizing pixel group reaches a predetermined value. For example, the same effect can be acquired by updating the reference points when the total of the gradation values is 50, 100, 150, . . . with a predetermined interval, or by updating the reference point when the total gradation values is 127, 190, 221 and 236, where the initial value is large and the interval [of the values] is gradually decreased.

What is claimed is:

1. An image processing device, comprising:
   pixel group generation means for generating a pixel group by selecting pixels until an accumulated total of gradation image data values of the selected pixels becomes a threshold value or more;
   pixel group center of gravity determination means for determining a position of a center of gravity of the pixel group generated by said pixel group generation means; and
   quantized image data providing means for providing quantized image data to a pixel positioned at the center of gravity determined by said pixel group center of gravity determination means,
   wherein said pixel group generation means generates said pixel group by continuously selecting pixels closest to the center of gravity determined by said pixel group center of gravity determination means until the accumulated total of the gradation image data values of the selected pixels becomes the threshold value or more.

2. The image processing device according to claim 1, wherein, when there are a plurality of pixels which are closest to the center of gravity determined by said pixel group center of gravity determination means, said pixel group generation means randomly selects a pixel to be selected among the plurality of pixels.

3. An image processing device, comprising:
   pixel group generation means for generating a pixel group by selecting pixels until an accumulated total of gradation image data values of the selected pixels becomes a threshold value or more;
   pixel group center of gravity determination means for determining a position of a center of gravity of the pixel group generated by said pixel group generation means; and
   quantized image data providing means for providing quantized image data to a pixel positioned at the center of gravity determined by said pixel group center of gravity determination means,
   wherein said pixel group generation means continuously selects pixels closest to the center of gravity determined by said pixel group center of gravity determination means until the accumulated total of the gradation image data values of the selected pixels becomes the threshold value or more, and when the accumulated total of the gradation image data value in said selected pixel group exceeds said threshold value, the exceeded amount of said gradation image data value is returned to said pixel selected last by said image group generation means.

4. An image processing method, comprising:

a pixel group generation step of generating a pixel group by selecting pixels until an accumulated total of gradation image data values of the selected pixels becomes a threshold value or more;

a pixel group center of gravity determination step of determining a position of a center of gravity of the pixel group generated in said pixel group generation step; and a quantized image data providing step of providing quantized image data to a pixel positioned at the center of gravity determined in said pixel group center of gravity determination step, wherein said pixel group generation step generates said pixel group by continuously selecting pixels closest to the center of gravity determined in said pixel group center of gravity determination step until the accumulated total of the gradation image data values of the selected pixels becomes the threshold value or more.

5. A computer readable medium including a program for having a computer execute;

a pixel group generation processing for generating a pixel group by selecting pixels until an accumulated total of gradation image data values of the selected pixels becomes a threshold value or more;

a pixel group center of gravity determination processing for determining a position of a center of gravity of the pixel group generated by said pixel group generation processing; and a quantized image data providing processing for providing quantized image data to a pixel positioned at the center of gravity determined by said pixel group center of gravity determination processing, wherein said pixel group generation processing generates said pixel group by continuously selecting pixels closest to the center of gravity determined by said pixel group center of gravity determination processing until the accumulated total of the gradation image data values of the selected pixels becomes the threshold value or more.

6. An image processing device, comprising:

pixel group generation means for generating a pixel group by selecting pixels until an accumulated total of gradation image data values of the selected pixels becomes a threshold value or more based on a first reference point for pixel selection;

pixel group reference point determination means for determining a second reference point of the pixel group generated by said pixel group generation means; and quantized image data providing means for providing quantized image data to a pixel positioned at said second reference point determined by said pixel group reference point determination means, wherein said pixel group generation means update said first reference point and selects pixels based on this first reference point, and wherein said group generation means update said first reference point each time said pixel is selected.

7. The image processing device according to claim 6, wherein said pixel group generation means update said first reference point each time said pixel is selected for a predetermined number of times.

8. The image processing device according to claim 6, wherein said pixel group generation means refer to a table storing relative positions of the pixels from the first reference point, and selects pixels until the accumulated total of the gradation image data values of the selected pixels becomes the threshold value or more in the sequence of being stored in said table.

* * * * *